(12) United States Patent
Wahadaniah et al.

(10) Patent No.: US 10,602,184 B2
(45) Date of Patent: *Mar. 24, 2020

(54) IMAGE CODING METHOD, IMAGE DECODING METHOD, IMAGE CODING APPARATUS, IMAGE DECODING APPARATUS, AND IMAGE CODING AND DECODING APPARATUS

(71) Applicant: Sun Patent Trust, New York, NY (US)

(72) Inventors: Viktor Wahadaniah, Singapore (SG); Chong Soon Lim, Singapore (SG); Sue Mon Thet Naing, San Jose, CA (US); Hai Wei Sun, Singapore (SG); Takahiro Nishi, Nara (JP); Hisao Sasai, Osaka (JP); Youji Shibahara, Tokyo (JP); Toshiyasu Sugio, Osaka (JP); Kyoko Tanikawa, Osaka (JP); Toru Matsunobu, Osaka (JP); Kengo Terada, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,415

(22) Filed: Dec. 26, 2018

(65) Prior Publication Data

US 2019/0132610 A1 May 2, 2019

Related U.S. Application Data

(63) Continuation of application No. 15/911,756, filed on Mar. 5, 2018, now Pat. No. 10,390,043, which is a
(Continued)

(51) Int. Cl.
*H04N 19/58* (2014.01)
*H04N 19/105* (2014.01)
(Continued)

(52) U.S. Cl.
CPC .......... *H04N 19/58* (2014.11); *H04N 19/105* (2014.11); *H04N 19/124* (2014.11); *H04N 19/15* (2014.11);
(Continued)

(58) Field of Classification Search
None
See application file for complete search history.

(56) References Cited

U.S. PATENT DOCUMENTS 7,782,943 B2   8/2010   Jeon et al.
8,040,949 B2   10/2011  Cosman et al.
(Continued)

FOREIGN PATENT DOCUMENTS

CN   1574948   2/2005
CN   1759610   4/2006
(Continued)

OTHER PUBLICATIONS

Office Action dated Apr. 15, 2019 in Indian Patent Application No. 6384/CHENP/2013.
(Continued)

*Primary Examiner* — Christopher Braniff
(74) *Attorney, Agent, or Firm* — Wenderoth, Lind & Ponack, L.L.P.

(57) ABSTRACT

An image coding method includes: writing, into a coded bitstream, buffer description defining information for defining a buffer description; constructing a default reference list; reorder pictures included in the default reference list; writing, into the coded bitstream, reference list reordering information for indicating details of the reordering; and coding an image using the buffer description and a reference list resulting from the reordering, and in the reference list reordering information, among the pictures, a picture to be reordered is specified using an index which is used in other processing in the image coding method.

4 Claims, 48 Drawing Sheets

Related U.S. Application Data continuation of application No. 15/333,393, filed on Oct. 25, 2016, now Pat. No. 10,021,415, which is a continuation of application No. 13/654,854, filed on Oct. 18, 2012, now Pat. No. 9,578,346.

(60) Provisional application No. 61/548,842, filed on Oct. 19, 2011.

(51) Int. Cl.
| | |
|---|---|
| *H04N 19/124* | (2014.01) |
| *H04N 19/15* | (2014.01) |
| *H04N 19/159* | (2014.01) |
| *H04N 19/39* | (2014.01) |
| *H04N 19/61* | (2014.01) |
| *H04N 19/70* | (2014.01) |
| *H04N 19/433* | (2014.01) |
| *H04N 19/172* | (2014.01) |
| *H04N 19/176* | (2014.01) |
| *H04N 19/184* | (2014.01) |

(52) U.S. Cl.
CPC ........... *H04N 19/159* (2014.11); *H04N 19/39* (2014.11); *H04N 19/433* (2014.11); *H04N 19/61* (2014.11); *H04N 19/70* (2014.11); *H04N 19/172* (2014.11); *H04N 19/176* (2014.11); *H04N 19/184* (2014.11)

(56) References Cited

U.S. PATENT DOCUMENTS

| | | |
|---|---|---|
| 8,615,038 B2 | 12/2013 | Wang |
| 8,638,847 B2 | 1/2014 | Wang |
| 8,855,208 B2 | 10/2014 | Wahadaniah et al. |
| 8,913,665 B2 | 12/2014 | Wahadaniah et al. |
| 8,971,406 B2 | 3/2015 | Wahadaniah et al. |
| 9,088,799 B2 | 7/2015 | Wahadaniah et al. |
| 9,232,233 B2 | 1/2016 | Zhou et al. |
| 9,319,679 B2 | 4/2016 | Ramasubramonian et al. |
| 9,432,665 B2 | 8/2016 | Wang et al. |
| 9,584,825 B2 | 2/2017 | Ramasubramonian et al. |
| 9,654,771 B2 | 5/2017 | Wahadaniah et al. |
| 9,681,148 B2 | 6/2017 | Wahadaniah et al. |
| 9,756,355 B2 | 9/2017 | Wang et al. |
| 9,900,592 B2 | 2/2018 | Wahadaniah et al. |
| 2003/0138043 A1 | 7/2003 | Hannuksela |
| 2004/0255063 A1 | 12/2004 | Crinon et al. |
| 2005/0276500 A1 | 12/2005 | Nakayama et al. |
| 2006/0083298 A1 | 4/2006 | Wang et al. |
| 2006/0098738 A1 | 5/2006 | Cosman et al. |
| 2006/0120451 A1 | 6/2006 | Hannuksela |
| 2006/0120463 A1 | 6/2006 | Wang |
| 2006/0120464 A1 | 6/2006 | Hannuksela |
| 2007/0030911 A1 | 2/2007 | Yoon |
| 2007/0110390 A1 | 5/2007 | Toma |
| 2008/0084930 A1 | 4/2008 | Sekiguchi et al. |
| 2008/0279280 A1 | 11/2008 | Iguchi et al. |
| 2009/0216964 A1 | 8/2009 | Palladino et al. |
| 2009/0262804 A1 | 10/2009 | Pandit et al. |
| 2010/0020870 A1 | 1/2010 | Jeon et al. |
| 2010/0020885 A1 | 1/2010 | Yuan et al. |
| 2010/0021143 A1 | 1/2010 | Toma et al. |
| 2010/0034254 A1 | 2/2010 | Wang |
| 2010/0118944 A1 | 5/2010 | Tanaka et al. |
| 2010/0189173 A1 | 7/2010 | Chen et al. |
| 2010/0238822 A1 | 9/2010 | Koyabu et al. |
| 2011/0032991 A1 | 2/2011 | Sekiguchi et al. |
| 2011/0080949 A1 | 4/2011 | Takahashi et al. |
| 2012/0224774 A1 | 9/2012 | Lim et al. |
| 2013/0077681 A1 | 3/2013 | Chen et al. |
| 2013/0094585 A1 | 4/2013 | Misra et al. |
| 2013/0114687 A1 | 5/2013 | Kim et al. |
| 2013/0215975 A1 | 8/2013 | Samuelsson et al. |
| 2014/0072038 A1 | 3/2014 | Samuelsson et al. |
| 2014/0126640 A1 | 5/2014 | Samuelsson et al. |

FOREIGN PATENT DOCUMENTS

| | | |
|---|---|---|
| CN | 1941913 | 4/2007 |
| CN | 101304530 | 11/2008 |
| CN | 101449585 | 6/2009 |
| CN | 101529914 | 9/2009 |
| CN | 101637028 | 1/2010 |
| CN | 101841708 | 9/2010 |
| CN | 101911706 | 12/2010 |
| CN | 102025992 | 4/2011 |
| CN | 102036066 | 4/2011 |
| EP | 1 381 238 | 1/2004 |
| EP | 1 802 126 | 6/2007 |
| EP | 2 290 985 | 3/2011 |
| EP | 2 393 296 | 12/2011 |
| KR | 10-2009-0006094 | 1/2009 |
| KR | 10-2010-0033445 | 3/2010 |
| KR | 10-2010-0033446 | 3/2010 |
| KR | 10-2010-0033447 | 3/2010 |
| RU | 2 402 886 | 10/2010 |
| TW | 200627962 | 8/2006 |
| WO | 2005/076613 | 8/2005 |
| WO | 2007/114610 | 10/2007 |
| WO | 2008/051381 | 5/2008 |
| WO | 2010/087157 | 8/2010 |

OTHER PUBLICATIONS

ISO/IEC 14496-10 (MPEG-4 Part10: Advanced Video Coding), Oct. 1, 2004.
Rickard Sjöberg, Jonatan Samuelsson, "*Absolute signaling of reference pictures*", Joint Collaborative Team on Video Coding (JCT-VC) of ITU-T SG16 WP3 and ISO/IEC JTC1/SC29/WG11 6$^{th}$ Meeting: Torino, Jul. 18, 2011, [JCTVC-F493].
Benjamin Bross et al., "WD4: Working Draft 4 of High-Efficiency Coding", Joint Collaborative Team on Video Coding (JCT-VC) of ITU-T SG16 WP3 and ISO/IEC JTC1/SC29/WG11, JCTVC-F803_d2, Ver.4, 6th Meeting: Torino, IT, Jul. 14-22, 2011.
International Search Report dated Dec. 11, 2012 in International (PCT) Application No. PCT/JP2012/005676.
International Search Report dated Dec. 11, 2012 in International (PCT) Application No. PCT/JP2012/005608.
Preliminary Report on Patentability dated Feb. 4, 2014 in International (PCT) Application No. PCT/JP2012/006235.
International Search Report dated Nov. 27, 2012 in International (PCT) Application No. PCT/JP2012/005329.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1, Version 2, 6th Meeting: Torino, IT, Jul. 14-22, 2011.
Benjamin Bross et al., "WD4: Working Draft 4 of High-Efficiency Coding", Joint Collaborative Team on Video Coding (JCT-VC) of ITU-T SG16 WP3 and ISO/IEC JTC1/SC29/WG11, JCTVC-F803_d0, Version 1, 6th Meeting: Torino, IT, Jul. 14-22, 2011.
International Preliminary Report on Patentability dated Dec. 24, 2013 in International (PCT) Application No. PCT/JP2012/005329.
Office Action dated Dec. 9, 2013 in U.S. Appl. No. 13/605,043.
Office Action dated Sep. 23, 2013 in U.S. Appl. No. 13/622,046.
Extended European Search Report dated Jan. 5, 2015 in European Application No. 12825464.6.
Extended European Search Report dated Feb. 3, 2015 in European Applicant No. 12829722.3.
Extended European Search Report dated Feb. 27, 2015 in European Application No. 12841179.0.
ISO/IEC 14496-10 (MPEG-4, Information technology—Coding of audio-visual objects—Part 10: Advanced Video Coding), Second edition, Oct. 1, 2004, pp. 31, 32, 35, 36, 39, 54-59, 61-67, and 69-71.

(56) References Cited

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, Ver. 1, 6$^{th}$ Meeting: Torino, IT, Jul. 14-22, 2011, pp. 34, 35, 38-40, 60-66, and 68-70.
Rickard Sjöberg et al., "Absolute signaling of reference pictures", Joint Collaborative Team on Video Coding (JCT-VC) of ITU-T SG16 WP3 and ISO/IEC JTC1/SC29/WG11, JCTVC-F493, 6$^{th}$ Meeting: Torino, Jul. 18, 2011, XP003031157.
Rickard Sjöberg et al., "Proposed changes to the HEVC Working Draft", Joint Video Team (JVT) of ISO/IEC MPEG and ITU-T VCEG (ISO/IEC JTC1/SC29/WG11 and ITU-T SG16 Q6), Jul. 22, 2011, pp. 1-28. XP007922938.
Rickard Sjöberg et al., "Absolute signaling of reference pictures", Joint Collaborative Team on Video Coding (JCT-VC) of ITU-T SG16 WP3 and ISO/IEC JTC1/SC29/WG11, JCTVC-F493, 6$^{th}$ Meeting: Torino, IT, Jul. 22, 2011. XP007922937.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5$^{th}$ Meeting: Geneva, CH, Mar. 16-23, 2011. XP030009014.
Stephan Wenger, "Parameter set updates using conditional replacement", Joint Collaborative Team on Video Coding (JCT-VC) of ITU-T SG16 WP3 and ISO/IEC JTC1/SC29/WG11, JCTVC-E309, 5$^{th}$ Meeting: Geneva, CH, Mar. 16-23, 2011. XP030008815.
Gary Sullivan et al., "Proposal on Decoded Picture Buffer Description Syntax Relating to AHG21 and JCTVC-F493", Joint Collaborative Team on Video Coding (JCT-VC) of ITU-T SG16 WP3 and ISO/IEC JTC1/SC29/WG11, JCTVC-G788, 7$^{th}$ Meeting: Geneva, CH, Mar. 21-30, 2011. XP030110772.
Rickard Sjöberg et al., "Absolute signaling of reference pictures", Joint Collaborative Team on Video Coding (JCT-VC) of ITU-T SG16 WP3 and ISO/IEC JTC1/SC29/WG11, JCTVC-F493, 6$^{th}$ Meeting, Torino, IT, Jul. 1, 2011. XP030009516.
Viktor Wahadaniah et al., "AHG21: Construction and modification of predefined reference sets and reference picture lists", Joint Collaborative Team on Video Coding (JCT-VC) of ITU-T SG16 WP3 and ISO/IEC JTC1/SC29/WG11, JCTVC-G548, 7$^{th}$ Meeting: Geneva, CH, Nov. 21-30, 2011. XP030110532.
Chih-Wei Hsu et al., "Unified Syntax of Reference Picture List Reordering", Joint Collaborative Team on Video Coding (JCT-VC) of ITU-T SG16 WP3 and ISO/IEC JTC1/SC29/WG11, JCTVC-E053, 5$^{th}$ Meeting: Geneva, CH, Mar. 16-23, 2011. XP030008559.
Extended European Search Report dated Mar. 9, 2015 in European Application No. 12832999.2.
Rickard Sjöberg et al., "Absolute signaling of reference pictures", Joint Collaborative Team on Video Coding (JCT-VC) of Itu-T SG16 WP3 and ISO/IEC JTC1/SC29/WG11, JCTVC-F493, WG11 No. m20923, 6th Meeting: Torino, IT, Jul. 22, 2011, XP030049486.
Ying Chen et al., "Support of lightweight MVC to AVC transcoding", Joint Video Team (JVT) of ISO/IEC MPEG & ITU-T VCEG (ISO/IEC JTC1/SC29/WG11 and ITU-T SG16 Q.6), JVT-AA036, 27th Meeting: Geneva, CH, Apr. 24-29, 2008.
Chih-Wei Hsu et al., "Unified Syntax of Reference Picture List Reordering", Joint Collaborative Team on Video Coding (JCT-VC) of ITU-T SG16 WP3 and ISO/IEC JTC1/SC29/WG11, JCTVC-E053, 5th Meeting: Geneva, CH, Mar. 16-23, 2011, XP030048128.
Official Communication dated Jul. 22, 2016 in European Patent Application No. 12841179.0.

Wiegand et al., "Proposed editorial changes to H.263++ Annex U," 10. VCEG, No. Q15-J-49 ITU Telecommunication Standardization Sector, Meeting May 16-18, 2000, Osaka, Japan, XP030003075.
Hsu et al., "Unified Syntax of Reference Picture List Reordering," Joint Collaborative Team on Video Coding (JCT-VC) of ITU-T SG16 WP3 and ISO/IEC JTC1/SC29/WG11, JCTVC-E053, 5th Meeting: Geneva, CH, Mar. 16-23, 2011.
Wahadaniah et at, "AHG21: Construction and modification of predefined reference picture sets and reference picture lists," Joint Collaborative Team on Video Coding (JCT-VC) of ITU-T SG16 WP3 and ISO/IEC JTC1/SC29/WG11, JCTVC-G548, 7th Meeting: Geneva, CH, Nov. 21-30, 2011.
Extended European Search Report dated Sep. 28, 2016 in European Patent Application No. 16176917.9.
Shen et al., "Buffer Requirement Analysis and Reference Picture Marking for Temporal Scalable Video Coding", IEEE, 2007, p. 1-7.
Peter Borgwardt, "Multi-picture Buffer Semantics for Interlaced Coding", Joint Video Team (JTV) of ISO/IEC MPEG & ITU-T VCEG, document JVT-0049, May 2002, pp. 1-18.
Sjoberg et al., "Absolute Signaling of Reference Pictures", Joint Collaborative Team on Video Coding (JCT-VC) of ITU-T SG16 WP3 and ISO/IEC JTC/SC29/WG11, Torino, 2011.
Notice of Allowance dated Jul. 27, 2016 in U.S. Appl. No. 14/603,769.
Office Action dated Aug. 5, 2016 in U.S. Appl. No. 14/239,662.
Chih-Wei Hsu et al., "Unified Syntax of Reference Picture List Reordering" Joint Collaborative Team on Video Coding (JCT-VC) of ITU-T SG16 WP3 and SO/IEC JTC1/SC29/WG11 JCTVC-E053 5th Meeting: Geneva, CH, Mar. 16-23, 2011.
Wahadaniah et al. "AHG21: Construction and modification of predefined reference picture sets and reference picture lists", Joint Collaborative Team on Video Coding (JCT-VC) of ITU-T SG16 WP3 and ISO/IEC JTC1/SC29/WG11 JCTVC-G548 7th Meeting: Geneva, CH Nov. 21-20, 2011, p. 1-p. 4.
Decision on grant dated Mar. 22, 2017 in Russian Patent Application No. 2014113564, with English-language translation.
International Search Report dated Jan. 8, 2013 in International Application No. PCT/JP2012/006235, with English-language translation.
Notice of Allowance dated Jan. 13, 2017 in U.S. Appl. No. 15/336,075.
Office Action dated Apr. 21, 2017 in U.S. Appl. No. 14/239,662.
Office Action dated Nov. 16, 2017 in European Patent Application No. 12 825 464.6.
Office Action dated Jun. 30, 2017 in U.S. Appl. No. 15/486,479.
Office Action dated Jul. 13, 2017 in Canadian Patent Application No. 2,845,548.
Office Action dated Sep. 18, 2017 in U.S. Appl. No. 15/473,934.
Rickard Sjöberg et al., "Overview of HEVC High-Level Syntax and Reference Picture Management", IEEE Transactions on Circuits and Systems for Video Technology, vol. 22, No. 12, Dec. 2012.
Office Action issued for European Patent Application No. 12 841 179.0 dated Jan. 25, 2018.
Notice of Allowance and Notice of Allowability dated Feb. 20, 2018 in U.S. Appl. No. 15/486,479.
Office Action dated May 4, 2017 in U.S. Appl. No. 15/333,393.
Office Action dated Mar. 8, 2018 in Canadian Patent Application No. 2,827,278.
Office Action dated Jul. 29, 2019 in Indian Patent Application No. 6555/CHENP/2013.
Office Action dated Jun. 28, 2019 in Indian Patent Application No. 2604/CHENP/2014.
Office Action dated Jun. 5, 2019 in European Patent Application No. 12841179.0.
Notice of Allowance dated Sep. 18, 2019 in U.S. Appl. No. 15/984,470.

FIG. 9

| slice_header() {   /* alternative:SPU header or picture header*/ | Descriptor |
|---|---|
| /* other syntax elements */ <br> ... | |
| /* buffer description defining ("BD define") parameters */ <br>     if( PredictionType == P \|\| PredictionType == B ) { | |
|         number_of_bes_minus1 | ue(v) |
|         first_delta_poc_sign_flag | u(1) |
|         first_delta_poc_minus1 | ue(v) |
|         first_temporal_id | u(v) |
|         for ( j = 0; j < number_of_bes_minus1; j++ ) { | |
|             delta_poc_minus1[j] | ue(v) |
|             temporal_id[j] | u(v) |
|         } | |
|     } | |
| /* other syntax elements */ <br> ... | |
| /* reference picture list description defining ("RLD define") parameters */ <br>     if( PredictionType == P \|\| PredictionType == B ) { | |
|         ref_pic_list_modification_flag_l0[i] | u(1) |
|         if( ref_pic_list_modification_flag_l0[i] ) { | |
|             num_ref_idx_l0_active_minus1[i] | ue(v) |
|             do { | |
|                 more_modification_flag | u(1) |
|                 if( more_modification_flag == 1 ) { | |
|                     be_idx_in_ref_pic_list | ue(v) |
|                 } | |
|             } while ( more_modification_flag == 1 ) | |
|         } | |
|     if( PredictionType == B ) { | |
|         ref_pic_list_modification_flag_l1 | u(1) |
|         if( ref_pic_list_modification_flag_l1 ) { | |
|             num_ref_idx_l1_active_minus1 | ue(v) |
|             do { | |
|                 more_modification_flag | u(1) |
|                 if( more_modification_flag == 1 ) { | |
|                     be_idx_in_ref_pic_list | ue(v) |
|                 } | |
|             } while ( more_modification_flag == 1 ) | |
|         } | |
|     } | |
| /* other syntax elements */ <br> ... | |
| } | |

FIG. 12

| sequence_parameter_set () { /* alternative: picture parameter set*/ | Descriptor |
|---|---|
| /* other syntax elements */<br>... | |
| /* buffer description defining ("BD define") parameters */<br>    bits_for_temporal_id | u(2) |
|     number_of_bds | ue(v) |
|     if( number_of_bds > 0 ) { | |
|         for ( i = 0; i < number_of_bds; i++ ) { | |
|             number_of_bes_minus1[i] | ue(v) |
|             first_delta_poc_sign_flag[i] | u(1) |
|             first_delta_poc_minus1[i] | ue(v) |
|             first_temporal_id[i] | u(v) |
|             for ( j = 0; j < number_of_bes_minus1; j++ ) { | |
|                 delta_poc_minus1[i][j] | ue(v) |
|                 temporal_id[i][j] | u(v) |
|             } | |
|         } | |
|     } | |
| /* other syntax elements */<br>... | |
| } | |

FIG. 13

| slice_header() {   /* alternative:SPU header or picture header*/ | Descriptor |
|---|---|
| /* other syntax elements */ ... | |
| /* buffer description updating ("BD update") parameters */     if( PredictionType == P \|\| PredictionType == B ) { | ue(v) |
| bd_select | |
| do { | |
| bd_modification_operation | ue(v) |
| if( bd_modification_operation == 1 ) { | |
| be_idx_in_bd_update | ue(v) |
| delta_poc_sign_flag | u(1) |
| delta_poc_minus1 | ue(v) |
| temporal_id | u(v) |
| } | |
| } while( bd_modification_operation == 1) | |
| } | |
| /* other syntax elements */ ... | |
| /* reference picture list description defining ("RLD define") parameters */     if( PredictionType == P \|\| PredictionType == B ) { | |
| ref_pic_list_modification_flag_l0 | u(1) |
| if( ref_pic_list_modification_flag_l0 ) { | |
| num_ref_idx_l0_active_minus1 | ue(v) |
| do { | |
| more_modification_flag | u(1) |
| if( more_modification_flag == 1 ) { | |
| be_idx_in_ref_pic_list | ue(v) |
| } | |
| } while ( more_modification_flag == 1 ) | |
| } | |
| if( PredictionType == B ) { | |
| ref_pic_list_modification_flag_l1 | u(1) |
| if( ref_pic_list_modification_flag_l1 ) { | |
| num_ref_idx_l1_active_minus1 | ue(v) |
| do { | |
| more_modification_flag | u(1) |
| if( more_modification_flag == 1 ) { | |
| be_idx_in_ref_pic_list | ue(v) |
| } | |
| } while ( more_modification_flag == 1 ) | |
| } | |
| } | |
| /* other syntax elements */ ... | |
| } | |

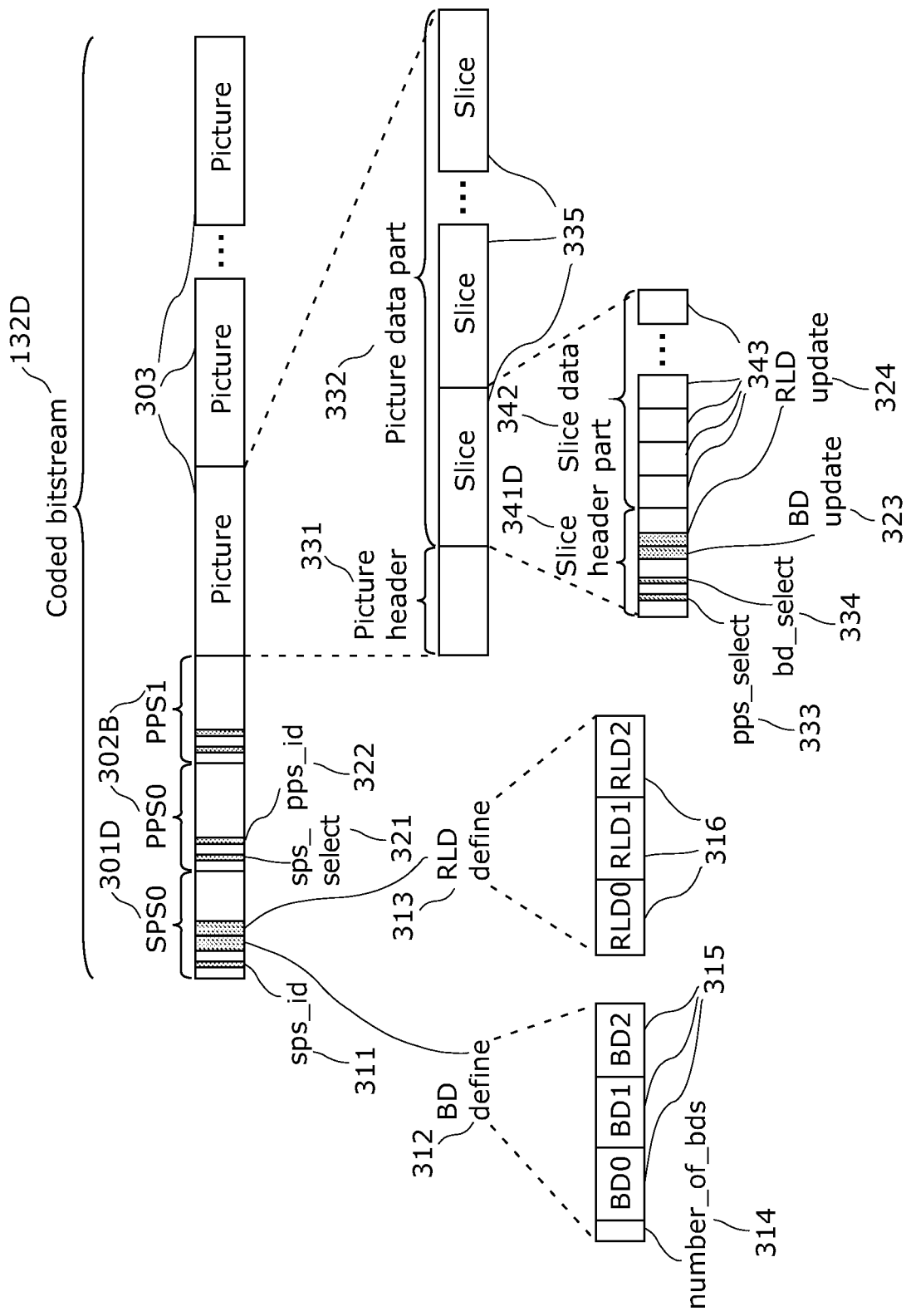

FIG. 16

| sequence_parameter_set () {   /* alternative:picture parameter set*/ | Descriptor |
|---|---|
| /* other syntax elements */<br>... | |
| /* buffer description defining ("BD define") parameters */<br>    bits_for_temporal_id | u(2) |
|     number_of_bds | ue(v) |
|     if( number_of_bds > 0 ) { | |
|         for( i =0; i < number_of_bds; i++) { | |
|             number_of_bds_minus1[i] | ue(v) |
|             first_delta_poc_sign_flag[i] | u(1) |
|             first_delta_poc_minus1[i] | ue(v) |
|             first_temporal_id[i] | u(v) |
|             for( j =0; j < number_of_bds_minus1; j++) { | |
|                 delta_poc_minus1[i][j] | ue(v) |
|                 first_temporal_id[i][j] | u(v) |
|             } | |
|         } | |
|     } | |
| /* other syntax elements */<br>... | |
| /* reference picture list description defining ("RLD define") parameters */<br>    if( number_of_bds > 0 ) { | |
|         for( i =0; i < number_of_bds; i++) { | u(1) |
|             ref_pic_list_modification_flag_l0[i] | |
|             if( ref_pic_list_modification_flag_l0[i] ) { | ue(v) |
|             num_ref_idx_l0_active_minus1[i] | |
|                 do { | u(1) |
|                     more_modification_flag | |
|                     if( more_modification_flag == 1 ) { | ue(v) |
|                         be_idx_in_ref_pic_list | |
|                     } | |
|                 } while ( more_modification_flag == 1 ) | |
|             } | u(1) |
|             ref_pic_list_modification_flag_l1[i] | |
|             if( ref_pic_list_modification_flag_l1[i] ) { | ue(v) |
|             num_ref_idx_l1_active_minus1[i] | |
|                 do { | u(1) |
|                     more_modification_flag | |
|                     if( more_modification_flag == 1 ) { | ue(v) |
|                         be_idx_in_ref_pic_list | |
|                     } | |
|                 } while ( more_modification_flag == 1 ) | |
|             } | |
|         } | |
|     } | |
| /* other syntax elements */<br>... | |
| } | |

FIG. 17

| slice_header() { /* alternative:SPU header or picture header*/ | Descriptor |
|---|---|
| /* other syntax elements */ ... | |
| /* buffer description updating ("BD update") parameters */     if( PredictionType == P \|\| PredictionType == B ) { | ue(v) |
|         bd_select | |
|         do { | |
|             bd_modification_operation | ue(v) |
|             if( bd_modification_operation == 1 ) { | |
|                 be_idx_in_bd_update | ue(v) |
|                 delta_poc_sign_flag | u(1) |
|                 delta_poc_minus1 | ue(v) |
|                 temporal_id | u(v) |
|             } | |
|         } while( bd_modification_operation == 1) | |
|     } | |
| /* other syntax elements */ ... | |
| /* reference picture list description updating ("RLD update") parameters */     if( PredictionType == P \|\| PredictionType == B ) { | |
|         ref_pic_list_modification_flag_l0 | u(1) |
|         if( ref_pic_list_modification_flag_l0 ) { | |
|             num_ref_idx_l0_active_minus1 | ue(v) |
|             do { | |
|                 more_modification_flag | u(1) |
|                 if( more_modification_flag == 1 ) { | |
|                     be_idx_in_ref_pic_list | ue(v) |
|                 } | |
|             } while ( more_modification_flag == 1 ) | |
|         } | |
|     if( PredictionType == B ) { | |
|         ref_pic_list_modification_flag_l1 | u(1) |
|         if( ref_pic_list_modification_flag_l1 ) { | |
|             num_ref_idx_l1_active_minus1 | ue(v) |
|             do { | |
|                 more_modification_flag | u(1) |
|                 if( more_modification_flag == 1 ) { | |
|                     be_idx_in_ref_pic_list | ue(v) |
|                 } | |
|             } while ( more_modification_flag == 1 ) | |
|         } | |
|     } | |
| /* other syntax elements */ ... | |
| } | |

FIG. 19

| sequence_parameter_set ( ) { | Descriptor |
|---|---|
| /* other syntax elements */ | |
| ... | |
| /* buffer description defining ("BD define") parameters */ | |
|     bits_for_temporal_id | u(2) |
|     number_of_bds | ue(v) |
|     if( number_of_bds > 0 ) { | |
|         for( i =0; i < number_of_bds; i++) { | |
|             number_of_bds_minus1[i] | ue(v) |
|             first_delta_poc_sign_flag[i] | u(1) |
|             first_delta_poc_minus1[i] | ue(v) |
|             first_temporal_id[i] | u(v) |
|             for( j =0; j < number_of_bds_minus1; j++) { | |
|                 delta_poc_minus1[i][j] | ue(v) |
|                 first_temporal_id[i][j] | u(v) |
|             } | |
|         } | |
|     } | |
| /* other syntax elements */ | |
| ... | |
| /* reference picture list description defining ("RLD define") parameters */ | |
|     if( number_of_bds > 0 ) { | |
|         for( i =0; i < number_of_bds; i++) { | u(1) |
|             ref_pic_list_modification_flag_l0[i] | |
|             if( ref_pic_list_modification_flag_l0[i] ) { | ue(v) |
|             num_ref_idx_l0_active_minus1[i] | |
|             do { | u(1) |
|                 more_modification_flag | |
|                 if ( more_modification_flag == 1 ) { | ue(v) |
|                     be_idx_in_ref_pic_list | |
|                 } | |
|             } while ( more_modification_flag == 1 ) | |
|             } | u(1) |
|             ref_pic_list_modification_flag_l1[i] | |
|             if( ref_pic_list_modification_flag_l1[i] ) { | ue(v) |
|             num_ref_idx_l1_active_minus1[i] | |
|             do { | u(1) |
|                 more_modification_flag | |
|                 if( more_modification_flag == 1 ) { | ue(v) |
|                     be_idx_in_ref_pic_list | |
|                 } | |
|             } while ( more_modification_flag == 1 ) | |
|             } | |
|         } | |
|     } | |
| /* other syntax elements */ | |
| ... | |
| } | |

FIG. 20

| picture_parameter_set () { | Descriptor |
|---|---|
| /* other syntax elements */ <br> ... | |
| /* buffer description updating ("PPS BD update") parameters */ <br>     number_of_bd_updates | ue(v) |
|     if( number_of_bd_updates > 0 ) { | |
|         for( i = 0; i < number_of_bd_updates; i++) { | |
|             bd_select | ue(v) |
|             do { | |
|                 bd_modification_operation | ue(v) |
|                 if( bd_modification_operation == 1 ) { | |
|                     be_idx_in_bd_update | ue(v) |
|                     delta_poc_sign_flag | u(1) |
|                     delta_poc_minus1 | ue(v) |
|                     temporal_id | u(v) |
|                 } | |
|             } while( bd_modification_operation == 1) | |
|         } | |
|     } | |
| /* other syntax elements */ <br> ... | |
| /* reference picture list description updating ("PPS RLD update") parameters */ <br>     if ( number_of_bd_updates > 0 ) { | |
|         for( i =0; i < number_of_bd_updates; i++) { | |
|             ref_pic_list_modification_flag_l0[i] | u(1) |
|             if( ref_pic_list_modification_flag_l0[i] ) { | |
|         num_ref_idx_l0_active_minus1[i] | ue(v) |
|             do { | |
|                 more_modification_flag | u(1) |
|                 if( more_modification_flag == 1 ) { | |
|                     be_idx_in_ref_pic_list | ue(v) |
|                 } | |
|             } while ( more_modification_flag == 1 ) | |
|         } | |
|         ref_pic_list_modification_flag_l1[i] | u(1) |
|         if( ref_pic_list_modification_flag_l1[i] ) { | |
|             num_ref_idx_l1_active_minus1[i] | ue(v) |
|             do { | |
|                 more_modification_flag | u(1) |
|                 if ( more_modification_flag == 1 ) { | |
|                     be_idx_in_ref_pic_list | ue(v) |
|                 } | |
|             } while ( more_modification_flag == 1 ) | |
|         } | |
|         } | |
|     } | |
| /* other syntax elements */ <br> ... | |
| } | |

FIG. 21

| slice_header() {  /* alternative:SPU header or picture header*/ | Descriptor |
|---|---|
| /* other syntax elements */ <br> ... | |
| /* buffer description updating ("slice BD update") parameters */ <br> if( PredictionType == P \|\| PredictionType == B ) { | ue(v) |
| bd_select | |
| do { | |
| bd_modification_operation | ue(v) |
| if( bd_modification_operation == 1 ) { | |
| be_idx_in_bd_update | ue(v) |
| delta_poc_sign_flag | u(1) |
| delta_poc_minus1 | ue(v) |
| temporal_id | u(v) |
| } | |
| } while( bd_modification_operation == 1) | |
| } | |
| /* other syntax elements */ <br> ... | |
| /* reference picture list description updating ("slice RLD update") parameters */ <br> if ( PredictionType == P \|\| PredictionType == B ) { | |
| ref_pic_list_modification_flag_l0 | u(1) |
| if( ref_pic_list_modification_flag_l0 ) { | |
| num_ref_idx_l0_active_minus1 | ue(v) |
| do { | |
| more_modification_flag | u(1) |
| if( more_modification_flag == 1 ) { | |
| be_idx_in_ref_pic_list | ue(v) |
| } | |
| } while ( more_modification_flag == 1 ) | |
| } | |
| if( PredictionType == B ) { | |
| ref_pic_list_modification_flag_l1 | u(1) |
| if( ref_pic_list_modification_flag_l1 ) { | |
| num_ref_idx_l1_active_minus1 | ue(v) |
| do { | |
| more_modification_flag | u(1) |
| if ( more_modification_flag == 1 ) { | |
| be_idx_in_ref_pic_list | ue(v) |
| } | |
| } while ( more_modification_flag == 1 ) | |
| } | |
| } | |
| /* other syntax elements */ <br> ... | |
| } | |

FIG. 23

| sequence_parameter_set ( ) { | Descriptor |
|---|---|
| /* other syntax elements */ | |
| ... | |
| /* buffer description defining ("BD define") parameters */ | |
|     bits_for_temporal_id | u(2) |
|     number_of_bds | ue(v) |
|     if( number_of_bds > 0 ) { | |
|         for( i =0; i < number_of_bds; i++) { | |
|             number_of_bes_minus1[i] | ue(v) |
|             first_delta_poc_sign_flag[i] | u(1) |
|             first_delta_poc_minus1[i] | ue(v) |
|             first_temporal_id[i] | u(v) |
|             for( j =0; j < number_of_bes_minus1; j++) { | |
|                 delta_poc_minus1[i][j] | ue(v) |
|                 first_temporal_id[i][j] | u(v) |
|             } | |
|         } | |
|     } | |
| /* other syntax elements */ | |
| ... | |
| /* reference picture list description defining ("RLD define") parameters */ | |
|     if( number_of_bds > 0 ) { | |
|         for( i =0; i < number_of_bds; i++) { | |
|             ref_pic_list_modification_flag_l0[i] | u(1) |
|             if( ref_pic_list_modification_flag_l0[i] ) { | |
|             num_ref_idx_l0_active_minus1[i] | ue(v) |
|             do { | |
|                 more_modification_flag | u(1) |
|                 if ( more_modification_flag == 1 ) { | |
|                     be_idx_in_ref_pic_list | ue(v) |
|                 } | |
|             } while ( more_modification_flag == 1 ) | |
|             } | |
|             ref_pic_list_modification_flag_l1[i] | u(1) |
|             if( ref_pic_list_modification_flag_l1[i] ) { | |
|                 num_ref_idx_l1_active_minus1[i] | ue(v) |
|             do { | |
|                 more_modification_flag | u(1) |
|                 if( more_modification_flag == 1 ) { | |
|                     be_idx_in_ref_pic_list | ue(v) |
|                 } | |
|             } while ( more_modification_flag == 1 ) | |
|             } | |
|         } | |
|     } | |
| /* other syntax elements */ | |
| ... | |
| } | |

FIG. 24

| picture_parameter_set () { | Descriptor |
|---|---|
| /* other syntax elements */ ... | |
| /* buffer description updating ("PPS BD update") parameters */<br>    bd_select | ue(v) |
|     do { | |
|         bd_modification_operation | ue(v) |
|         if( bd_modification_operation == 1 ) { | |
|             be_idx_in_bd_update | ue(v) |
|             delta_poc_sign_flag | u(1) |
|             delta_poc_minus1 | ue(v) |
|             temporal_id | u(v) |
|         } | |
|     } while( bd_modification_operation == 1) | |
| /* other syntax elements */ ... | |
| /* reference picture list description updating ("PPS RLD update") parameters */<br>    ref_pic_list_modification_flag_l0 | u(1) |
|     if( ref_pic_list_modification_flag_l0 ) { | |
|     num_ref_idx_l0_active_minus1[i] | ue(v) |
|         do { | |
|             more_modification_flag | |
|             if( more_modification_flag == 1 ) { | |
|                 be_idx_in_ref_pic_list | |
|             } | |
|         } while ( more_modification_flag == 1 ) | |
|     } | |
|     ref_pic_list_modification_flag_l1] | u(1) |
|     if( ref_pic_list_modification_flag_l1 ) { | |
|         num_ref_idx_l1_active_minus1[i] | ue(v) |
|         do { | |
|             more_modification_flag | u(1) |
|             if ( more_modification_flag == 1 ) { | |
|                 be_idx_in_ref_pic_list | ue(v) |
|             } | |
|         } while ( more_modification_flag == 1 ) | |
|     } | |
| /* other syntax elements */ ... | |
| } | |

FIG. 25

| slice_header() { /* alternative:SPU header or picture header*/ | Descriptor |
|---|---|
| /* other syntax elements */ <br> ... | |
| /* buffer description updating ("slice BD update") parameters */ <br> if( PredictionType == P \|\| PredictionType == B ) { | |
| do { | |
| bd_modification_operation | ue(v) |
| if( bd_modification_operation == 1 ) { | |
| be_idx_in_bd_update | ue(v) |
| delta_poc_sign_flag | u(1) |
| delta_poc_minus1 | ue(v) |
| temporal_id | u(v) |
| } | |
| } while( bd_modification_operation == 1) | |
| } | |
| /* other syntax elements */ <br> ... | |
| /* reference picture list description updating ("slice RLD update") parameters */ <br> if ( PredictionType == P \|\| PredictionType == B ) { | |
| ref_pic_list_modification_flag_l0 | u(1) |
| if( ref_pic_list_modification_flag_l0 ) { | |
| num_ref_idx_l0_active_minus1 | ue(v) |
| do { | |
| more_modification_flag | u(1) |
| if( more_modification_flag == 1 ) { | |
| be_idx_in_ref_pic_list | ue(v) |
| } | |
| } while ( more_modification_flag == 1 ) | |
| } | |
| if( PredictionType == B ) { | |
| ref_pic_list_modification_flag_l1 | u(1) |
| if( ref_pic_list_modification_flag_l1 ) { | |
| num_ref_idx_l1_active_minus1 | ue(v) |
| do { | |
| more_modification_flag | u(1) |
| if ( more_modification_flag == 1 ) { | |
| be_idx_in_ref_pic_list | ue(v) |
| } | |
| } while ( more_modification_flag == 1 ) | |
| } | |
| } | |
| /* other syntax elements */ <br> ... | |
| } | |

FIG. 36

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 39
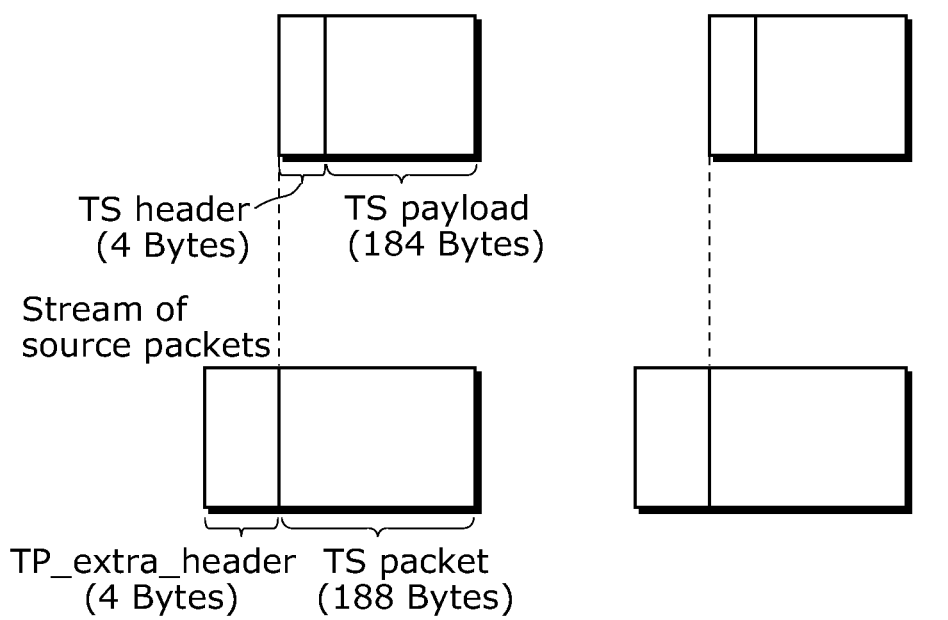
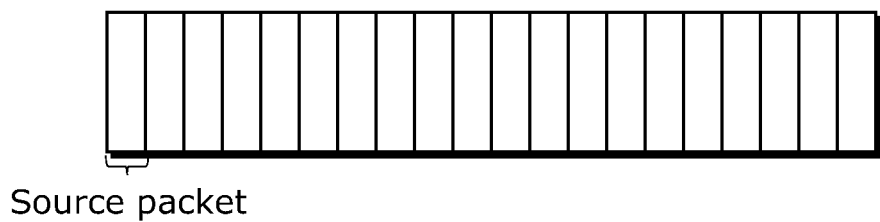

Data structure of PMT

FIG. 47

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, AND IMAGE CODING AND DECODING APPARATUS

CROSS REFERENCE TO RELATED APPLICATION

The present application claims the benefit of U.S. Provisional Patent Application No. 61/548,842 filed on Oct. 19, 2011. The entire disclosure of the above-identified application, including the specification, drawings and claims is incorporated herein by reference in their entirety.

FIELD

One or more exemplary embodiments disclosed herein relate generally to image coding methods, image decoding methods, image coding apparatuses, image decoding apparatuses, and image coding and decoding apparatuses, and particularly to an image coding method and an image decoding method each of which uses a buffer description for specifying a picture to be held in a buffer and a reference list for specifying a picture to be referred to.

BACKGROUND

State-of-the-art video coding schemes, such as MPEG-4 AVC/H.264 (see Non Patent Literature 1) and the upcoming HEVC (High-Efficiency Video Coding), perform coding of image or video content using inter-picture prediction from previously coded or decoded reference pictures. In other words, the video coding schemes exploit the information redundancy across consecutive pictures in time. In MPEG-4 AVC video coding scheme, reference pictures in the decoded picture buffer (DPB) are managed either using a predefined sliding-window scheme for removing earlier pictures in coding order from the DPB, or explicitly using a number of buffer management signals in the coded bitstream to manage and remove unused reference pictures.

CITATION LIST

Non Patent Literature

[Non Patent Literature 1] ISO/IEC 14496-10 "MPEG-4 Part10 Advanced Video Coding"

SUMMARY

Technical Problem

In the image coding method and the image decoding method which adopt such video coding schemes, there are demands for a further improvement in coding efficiency and a reduction in calculation amount.

Thus, one or more exemplary embodiments provide an image coding method or an image decoding method in which the coding efficiency can improve or the calculation amount can be reduced.

Solution to Problem

In one general aspect, the techniques disclosed herein feature an image coding method for generating a coded bitstream by coding an image using (i) a buffer description for specifying a picture to be held in a buffer and (ii) a reference list for specifying a picture to be referred to, the image coding method comprising: writing, into the coded bitstream, buffer description defining information for defining the buffer description; constructing a default reference list including a plurality of pictures indicated in the buffer description; reordering the pictures included in the default reference list; writing, into the coded bitstream, reference list reordering information for indicating details of the reordering; and coding the image using the buffer description and a reference list resulting from the reordering, wherein, in the reference list reordering information, among the pictures, a picture to be reordered is specified using an index which is used in other processing in the image coding method.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein provide an image coding method or an image decoding method in which the coding efficiency can improve or the calculation amount can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 shows a syntax structure of a slice header according to the first example of the first embodiment of the present disclosure.

FIG. 12 shows a syntax structure of a sequence parameter set according to the second example of the first embodiment of the present disclosure.

FIG. 13 shows a syntax structure of a slice header according to the second example of the first embodiment of the present disclosure.

FIG. 14 shows a structure of a coded bitstream according to the third example of the first embodiment of the present disclosure.

FIG. 16 shows a syntax structure of a sequence parameter set according to the third example of the first embodiment of the present disclosure.

FIG. 17 shows a syntax structure of a slice header according to the third example of the first embodiment of the present disclosure.

FIG. 19 shows a syntax structure of a sequence parameter set according to the fourth example of the first embodiment of the present disclosure.

FIG. 20 shows a syntax structure of a picture parameter set according to the fourth embodiment of the present disclosure.

FIG. 21 shows a syntax structure of a slice header according to the fourth example of the first embodiment of the present disclosure.

FIG. 23 shows a syntax structure of a sequence parameter set according to the fifth example of the first embodiment of the present disclosure.

FIG. 24 shows a syntax structure of a picture parameter set according to the fifth embodiment of the present disclosure.

FIG. 25 shows a syntax structure of a slice header according to the fifth example of the first embodiment of the present disclosure.

FIG. 36 illustrates a structure of multiplexed data.

FIG. 39 shows a structure of TS packets and source packets in the multiplexed data.

FIG. 47 shows an example of a look-up table in which video data standards are associated with driving frequencies.

DESCRIPTION OF EMBODIMENTS

Underlying Knowledge Forming Basis of the Present Disclosure

Recent developments in the HEVC video coding scheme include the introduction of DPB management using buffer descriptions. A buffer description defines the pictures that are retained in the DPB, instead of defining the pictures that are to be removed from the DPB. In other words, a buffer description is a list of picture identifiers indicating all reference pictures stored in the DPB. Each item in this list is referred to as a buffer element. A buffer element contains a picture identifier unique to each picture, such as a picture order count (POC) number, and additional information of the picture such as a temporal_id value.

This buffer description is activated at the start of coding or decoding of a picture. Pictures that are not included in the active buffer description are removed from the DPB. Benefits of this buffer description include improved robustness against transmission/delivery losses and simplified handling of non-existent pictures.

Figure 1:
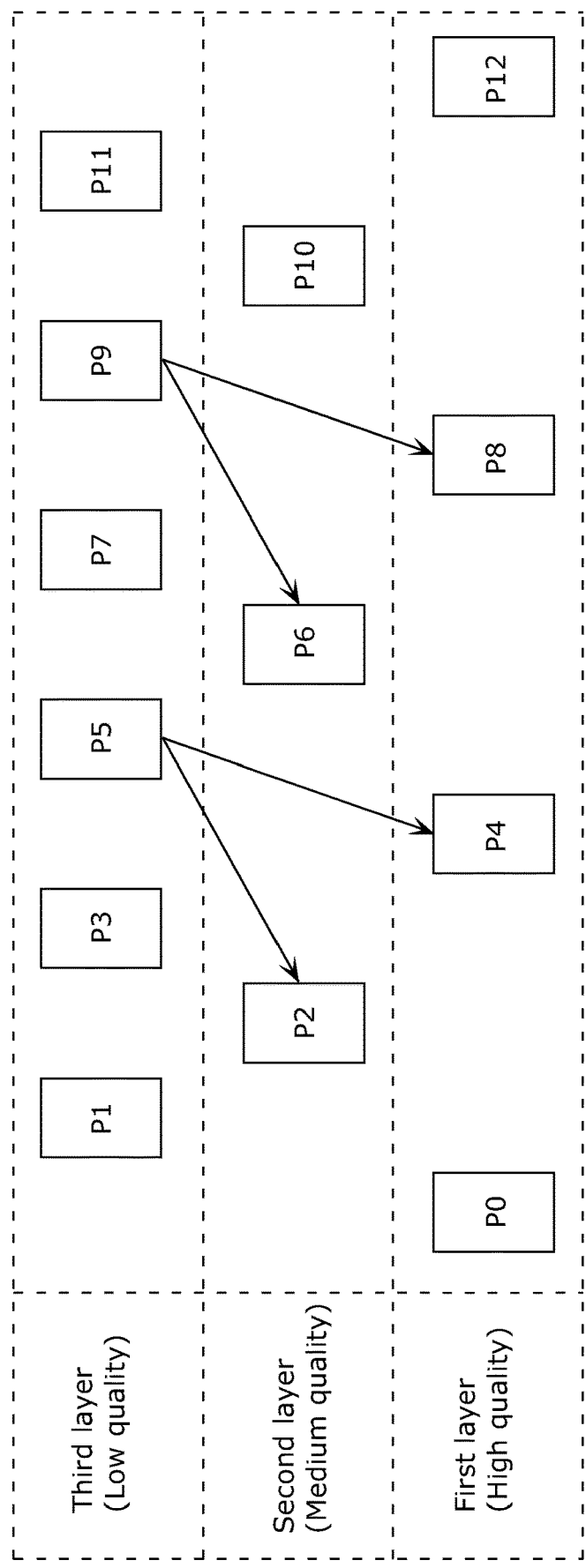
FIG. 1 shows an example of a picture referencing structure.

In some cases, multiple pictures in a video sequence share the same picture referencing structure. For example, a low delay coding structure uses a periodic clustering structure in which the same layer structure is periodically repeated in unit of four pictures as shown in FIG. 1. This repeating unit (that is four pictures herein) is called a cluster.

In the example shown in FIG. 1, the picture numbers (P0 to P12) indicate both unique coding order and unique display or output order of pictures. The pictures P0, P4, P8 and P12 constitute the first layer of pictures. These pictures are coded with the highest quality, for example, by applying quantization least strongly. Pictures P2, P6 and P10 constitute the second layer. These pictures are coded with lower quality than the first layer. Pictures P1, P3, P5, P7, P9 and P11 constitute the third layer. These pictures are coded with the lowest quality. In such a periodic referencing structure, pictures located at the same relative position within their clusters (for example P1, P5 and P9) usually use the same relative picture referencing structure. For example, the picture P5 uses the pictures P4 and P2 as reference pictures, while the picture P9 uses the pictures P8 and P6 as reference pictures.

In order to accommodate periodic clustering structures such as the above structure, a conceivable approach is periodic signaling of buffer descriptions. This buffer description specifies the temporal distances or positions of the reference pictures relative to a target picture to be coded or decoded. By so doing, the reference pictures stored in the DPB can be specified. For example, this buffer description is signalled once in the picture parameter set (PPS). This buffer description is then referred to repeatedly in the slice headers of the pictures having the same relative position within a cluster. For example, a buffer description specifying relative positions of {−1, −3} can be used in both P5 to specify {P4, P2} as reference pictures and by P9 to specify {P8, P6} as reference pictures.

Figure 2:
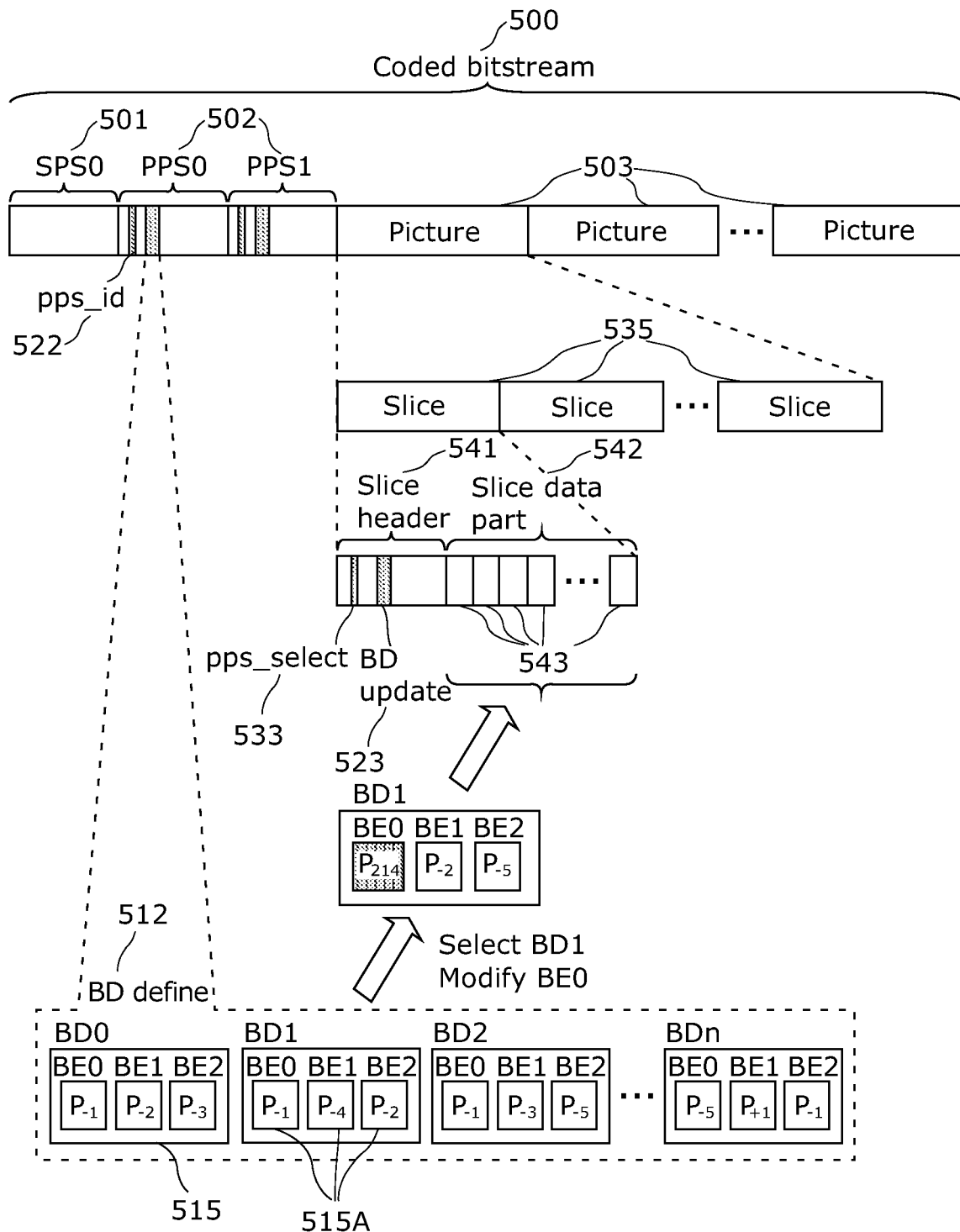
FIG. 2 shows a structure of a coded bitstream.

FIG. 2 shows an example of the signaling structure of buffer description in this case. A coded bitstream 500 shown in FIG. 2 includes a sequence parameter set (SPS) 501 (SPS0), a plurality of picture parameter sets (PPSs) 502 (PPS0 and PPS1), and a plurality of picture data 503. Each of the picture data 503 includes a plurality of slice data 535. Each of the slice data 535 includes a slice header 541 and a slice data part 542. The slice data part 542 includes a plurality of coding unit (CU) data 543.

Each of the PPSs 502 includes a PPS identifier 522 (pps_id) and buffer description defining information 512 (BD define). The buffer description defining information 512 indicates a plurality of buffer descriptions 515 (BD0 to BDn). Each of the buffer descriptions 515 includes a plurality of buffer elements 515A (BE0 to BE2).

Thus, the plurality of buffer descriptions 515 are defined using the buffer description defining information 512 in the picture parameter sets 502. Each of the PPSs 502 is identified by a PPS identifier 522 unique to the PPS.

The slice header 541 includes PPS selecting information 533 (pps_select) and buffer description updating information 523 (BD update).

The PPS selecting information 533 indicates the PPS 502 referred to during coding or decoding of the slice. In the example in FIG. 2, pps_select=0 is satisfied, and the PPS0 having pps_id=0 is selected.

The buffer description updating information 523 includes information which specifies the buffer description selected out of the buffer descriptions 515. In the example in FIG. 2, the buffer description BD1 is selected. Additionally, the buffer description updating information 523 includes buffer description modifying information. The buffer description modifying information assigns a picture identifier to a selected buffer element 515A within the selected buffer description 515. Here, the picture identifier is specified either using its relative position or using an identifier unique to the picture. The identifier unique to the picture includes, for example, the picture order count (POC) number. In the example in FIG. 2, the picture P214 identified by its POC number=214 is assigned to the buffer element BE0 within the buffer description BD1. This modification applies only to the current target slice and does not apply to subsequent slices.

In a coded bitstream, reference pictures used for the inter prediction process of prediction units (an N×N block) are identified using reference indexes. All available reference pictures and their associated reference indexes are described in a reference list. When bi-predictive inter prediction is used, two reference lists are used for describing two groups of reference pictures and the associated reference indexes. Smaller reference indexes are represented with fewer bits in the coded bitstream compared to larger reference indexes. Therefore, higher coding efficiency is achieved by assigning smaller reference indexes to frequently used reference pictures.

At the start of the coding or decoding of a slice, a default reference list is constructed by assigning indexes to all available reference pictures according to a predetermined ordering scheme. The image coding apparatus may further reorder the reference indexes included in the default reference list and write reference list reordering information into the slice header in the coded bitstream. The reordered reference list applies only to the current target slice and does not apply to subsequent slices.

Here, the reference list reordering information (parameter) for describing reference list reordering uses the picture number differences or POC number differences for specifying a reference picture to be reordered in a reference picture list. Specifically, the difference value is calculated either between the picture number (POC number) of the current slice (or picture) and the picture number (POC number) of the reference picture to be reordered, or between the picture number (POC number) of the reference picture to be reordered and the picture number (POC number) of the previously reordered reference picture. The difference value can be a positive or a negative value. To reorder a long term reference picture in a reference picture list, a separate set of parameters is used in which a long term reference picture is identified using the absolute value of its long term picture number.

In the above technique, the reference list reordering information uses picture number or POC number for specifying a reference picture to be reordered. On the other hand, the set of available reference pictures in the DPB is also uniquely identified and completely listed in the active buffer description. The inventors found that the readily available information in the buffer description is not utilized in the reference picture list reordering information. Thus, the reference list reordering information in the above technique uses redundant information.

Furthermore, the inventors found that the above technique has a problem that the information (parameters) for describing reference list reordering is only applied once in a current slice to be coded or decoded. However, as described above, multiple pictures in a video sequence share the same referencing structure in some cases. Consequently, information for describing the same reference list reordering process is signalled repeatedly in the coded bitstream.

Thus, the inventors found the problem of a decrease in coding efficiency which is due to repeated information included in the coded bitstream.

According to an exemplary embodiment disclosed herein, an image coding method for generating a coded bitstream by coding an image using (i) a buffer description for specifying a picture to be held in a buffer and (ii) a reference list for specifying a picture to be referred to, comprises: writing, into the coded bitstream, buffer description defining information for defining the buffer description; constructing a default reference list including a plurality of pictures indicated in the buffer description; reordering the pictures included in the default reference list; writing, into the coded bitstream, reference list reordering information for indicating details of the reordering; and coding the image using the buffer description and a reference list resulting from the reordering, wherein, in the reference list reordering information, among the pictures, a picture to be reordered is specified using an index which is used in other processing in the image coding method.

By so doing, a picture to be reordered is specified using an index which is also used in other processing. Thus, the redundancy and complexity of the reference list reordering information are reduced, with the result that the image coding apparatus and the image decoding apparatus involve a reduced amount of calculation.

For example, the buffer description defining information and the reference list reordering information are written into different headers belonging to network abstraction layers (NALs) of different types.

By so doing, a picture to be reordered to is specified using a buffer element index which is used in a buffer description. Thus, the redundancy and complexity of the reference list reordering information are reduced, with the result that the image coding apparatus and the image decoding apparatus involve a reduced amount of calculation.

For example, the reordering includes: selecting, from the pictures included in the reference list, a first picture to be reordered; assigning a predetermined first reference index to the first picture; and incrementing, by one, a reference index of each of the pictures which is larger than or equal to the first reference index, the each of the pictures being a picture included in the reference list other than the first picture.

For example, in the reordering, processing including the selecting, the assigning, and the incrementing is performed repeatedly a predetermined number of times, at an initial invocation of the processing, the first reference index is set to zero, and at each subsequent invocation of the processing, the first reference index set at an immediately previous invocation of the processing is incremented by one.

For example, in the reference list reordering information, the picture to be reordered is indicated using an absolute value of the index.

For example, in the reference list reordering information, among a plurality of target pictures to be reordered, an initial target picture is indicated using an absolute value of the index, and among the target pictures, a target picture other than the initial target picture is indicated using a difference value between the index of the target picture and the index of an immediately previous target picture.

For example, the buffer description includes buffer element indexes each associated with a buffer element which specifies one picture, and the index is one of the buffer element indexes.

By so doing, the quantity of the reference list reordering information can be reduced in the image coding method.

For example, the buffer description defining information defines a plurality of buffer descriptions including the buffer description, the buffer description defining information is written into a sequence parameter set included in the coded bitstream, the image coding method further comprises: defining a plurality of reference list descriptions which correspond one-to-one with the buffer descriptions, and writing, into a slice header of a current slice included in the coded bitstream, reference list description defining information including the reference list reordering information; and selecting one of the buffer descriptions, and writing, into the slice header, buffer description selecting information for specifying the selected buffer description, and in the coding, the current slice is coded using the selected buffer description and one of the reference list descriptions which corresponds to the selected buffer description.

By so doing, the image coding apparatus according to an exemplary embodiment disclosed herein writes the reference list description defining information into the picture parameter set shared by a plurality of pictures. This allows the image coding apparatus to reduce redundant information and thereby improve the coding efficiency as compared to the case where the reference list description defining information is written into a slice header.

Furthermore, according to an exemplary embodiment disclosed herein, an image decoding method for decoding a coded bitstream using (i) a buffer description for specifying a picture to be held in a buffer and (ii) a reference list for specifying a picture to be referred to, comprises: obtaining, from the coded bitstream, buffer description defining information for defining the buffer description; constructing a default reference list including a plurality of pictures indicated in the buffer description; obtaining, from the coded bitstream, reference list reordering information for indicating details of reordering to be performed on the default reference list; reordering, according to the reference list reordering information, the pictures included in the default reference list; and decoding a current picture or slice using the buffer description and a reference list resulting from the reordering, wherein, in the reference list reordering information, among the pictures, a picture to be reordered is specified using an index which is used in other processing in the image decoding method.

By so doing, a picture to be reordered is specified using an index which is also used in other processing. Thus, the redundancy and complexity of the reference list reordering information are reduced, with the result that the image decoding apparatus involves a reduced amount of calculation.

Furthermore, according to an exemplary embodiment disclosed herein, an image coding apparatus for generating a coded bitstream by coding an image using (i) a buffer description for specifying a picture to be held in a buffer and (ii) a reference list for specifying a picture to be referred to, comprises a frame memory control unit configured to perform the following: writing, into the coded bitstream, buffer description defining information for defining the buffer description; constructing a default reference list including a plurality of pictures indicated in the buffer description; reordering the pictures included in the default reference list; and writing, into the coded bitstream, reference list reordering information for indicating details of the reordering, wherein the image coding apparatus codes the image using the buffer description and a reference list resulting from the reordering, and in the reference list reordering information, among the pictures, a picture to be reordered is specified using an index which is used in other processing in the image coding apparatus.

By so doing, a picture to be reordered is specified using an index which is also used in other processing. Thus, the redundancy and complexity of the reference list reordering information are reduced, with the result that the image coding apparatus and the image decoding apparatus involve a reduced amount of calculation.

Furthermore, according to an exemplary embodiment disclosed herein, an image decoding apparatus for decoding a coded bitstream using (i) a buffer description for specifying a picture to be held in a buffer and (ii) a reference list for specifying a picture to be referred to, comprises a frame memory control unit configured to perform the following: obtaining, from the coded bitstream, buffer description defining information for defining the buffer description; constructing a default reference list including a plurality of pictures indicated in the buffer description; obtaining, from the coded bitstream, reference list reordering information for indicating details of reordering to be performed on the default reference list; and reordering, according to the reference list reordering information, the pictures included in the default reference list, wherein the image decoding apparatus decodes a current picture or slice using the buffer description and a reference list resulting from the reordering, and in the reference list reordering information, among the picture to be reordered, a picture is specified using an index which is used in other processing in the image decoding apparatus.

By so doing, a picture to be reordered is specified using an index which is also used in other processing. Thus, the redundancy and complexity of the reference list reordering information are reduced, with the result that the image decoding apparatus involves a reduced amount of calculation.

Furthermore, according to an exemplary embodiment disclosed herein, an image coding and decoding apparatus comprises the image coding apparatus and the image decoding apparatus.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the inventive concept disclosed herein. Therefore, among the structural elements in the following exemplary embodiments, structural elements not recited in any one of the independent claims defining the most generic part of the inventive concept are described as arbitrary structural elements.

Two embodiments are described in the following. It will be apparent to those skilled in the art that combinations of these embodiments can be carried out to further increase the usability and adaptability of periodic reference list descriptions.

First Embodiment

In this embodiment, a picture to be reordered is specified using a buffer element index which is used in a buffer description. By so doing, the redundancy and complexity of the reference list reordering information are reduced, with the result that the image coding apparatus and the image decoding apparatus involve a reduced amount of calculation.
[Coding Apparatus]

Figure 3:
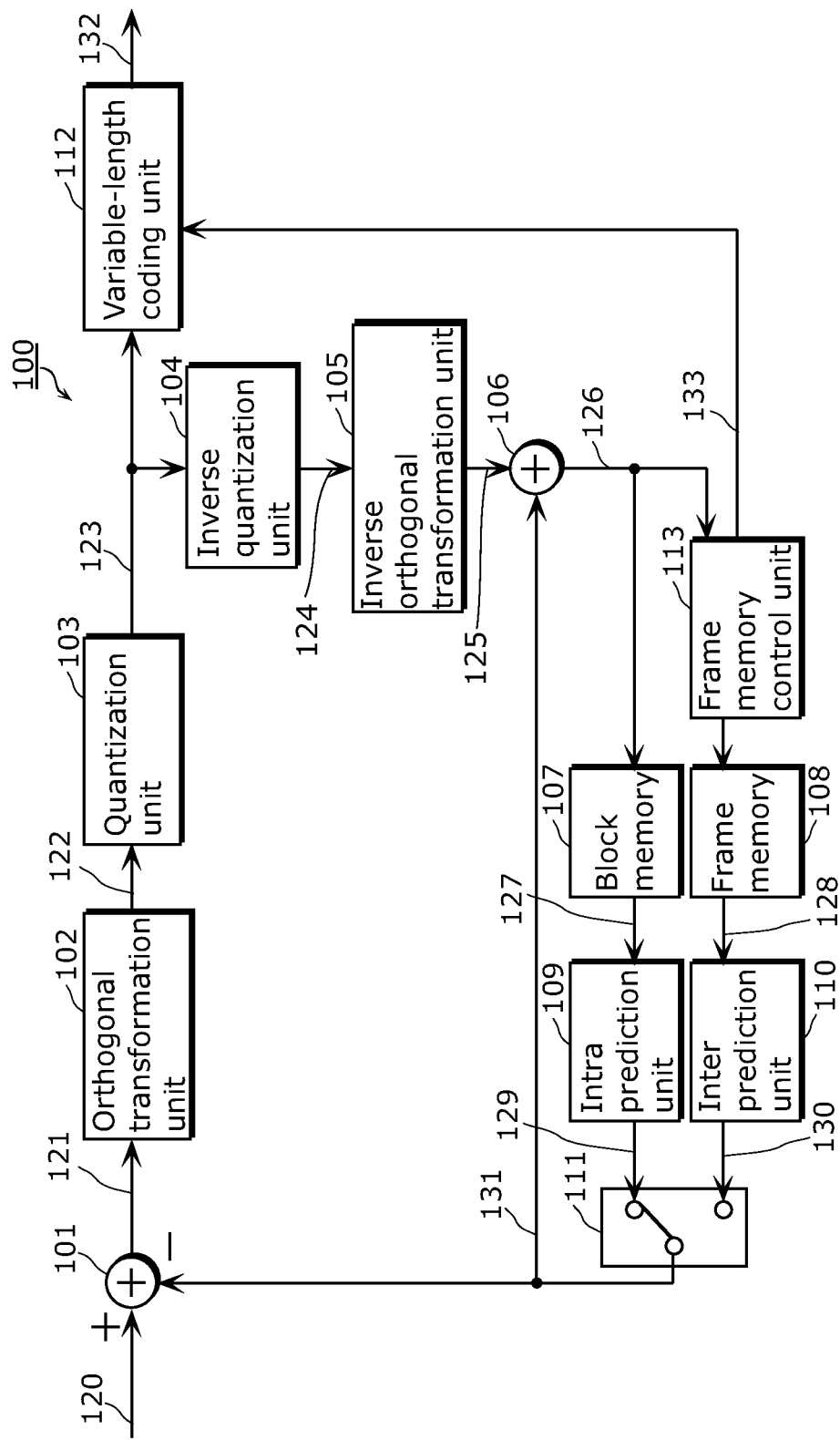
FIG. 3 is a block diagram of an image coding apparatus according to the first embodiment of the present disclosure.

FIG. 3 is a block diagram which shows a structure of an image coding apparatus 100 according to this embodiment.

The image coding apparatus 100 codes an input image signal 120 on a block-by-block basis so as to generate a coded bitstream 132. As shown in FIG. 3, the image coding apparatus 100 includes a subtractor 101, an orthogonal transformation unit 102, a quantization unit 103, an inverse quantization unit 104, an inverse orthogonal transformation unit 105, an adder 106, a block memory 107, a frame memory 108, an intra prediction unit 109, an inter prediction unit 110, a picture type determination unit 111, a variable-length coding unit 112, and a frame memory control unit 113.

The input image signal 120 is a video or image bitstream. The subtractor 101 calculates a difference between prediction image data 131 and the input image signal 120, thereby generating prediction error data 121. The orthogonal transformation unit 102 performs orthogonal transformation on the prediction error data 121 to generate frequency coefficients 122. The quantization unit 103 quantizes the frequency coefficients 122, thereby generating quantized values 123. The variable-length coding unit 112 performs entropy coding (variable-length coding) on the quantized values 123, thereby generating the coded bitstream 132.

The inverse quantization unit 104 inversely quantizes the quantized values 123, thereby generating frequency coefficients 124. The inverse orthogonal transformation unit 105 performs inverse orthogonal transformation on the frequency coefficients 122, thereby generating prediction error data 125. The adder 106 adds the prediction error data 125 and the prediction image data 131, thereby generating the decoded image data 126. The block memory 107 holds the decoded image data 126 as decoded image data 127 on a block-by-block basis. The frame memory 108 holds the decoded image data 126 as decoded image data 128 on a frame-by-frame basis.

The intra prediction unit 109 performs intra prediction to generate prediction image data 129 of a current block to be coded. Specifically, the intra prediction unit 109 searches within the decoded image data 127 stored in the block memory 107, and estimates an image area which is most similar to the input image signal 120.

The inter prediction unit 110 performs inter prediction using the per-frame decoded image data 128 stored in the frame memory 108, to generate prediction image data 130 of the current block.

The picture type determination unit 111 selects one of the prediction image data 129 and the prediction image data 130 and outputs the selected data as the prediction image data 131.

The frame memory control unit 113 manages the decoded image data 128 stored in the frame memory 108. Specifically, the frame memory control unit 113 determines whether the decoded image data 128 is kept in the frame memory 208 or removed from the frame memory 208. Furthermore, the frame memory control unit 113 constructs reference lists to be used by the inter prediction unit 110. Furthermore, the frame memory control unit 113 generates frame memory control information 133 which includes the buffer description defining information and the reference list description defining information. The variable-length coding unit 112 generates the coded bitstream 132 which includes this frame memory control information 133.
[Coding Process]

Next, a description is given to an image coding method which is performed by the image coding apparatus 100 as mentioned above.

Figure 4:
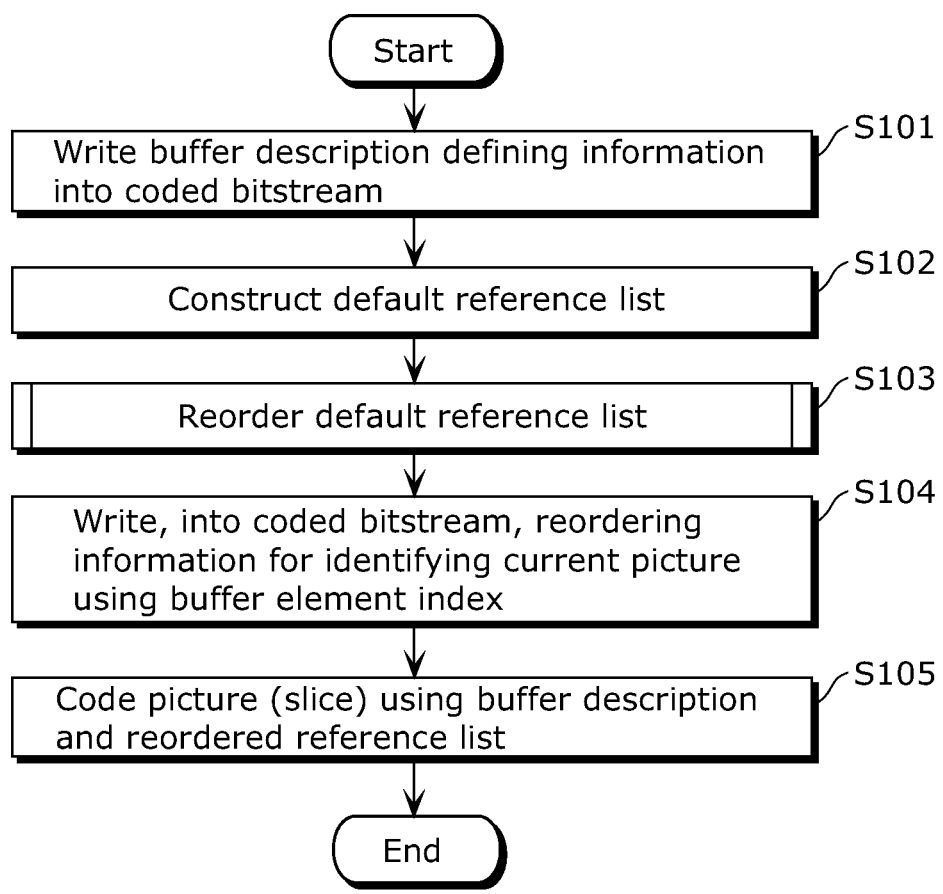
FIG. 4 is a flowchart of an image coding method according to the first embodiment of the present disclosure.

FIG. 4 is a flowchart of an image coding method according to this embodiment.

Firstly, the image coding apparatus 100 writes, into a first header of a bitstream, buffer description defining information which defines buffer descriptions (S101). The buffer descriptions are used to specify pictures to be held in the buffer (frame memory). Specifically, each of the buffer descriptions includes a plurality of buffer elements. Each buffer element contains a unique picture identifier (such as a POC number) corresponding to one reference picture stored in the frame memory. This means that each of the buffer descriptions indicates a plurality of reference pictures stored in the frame memory.

Next, the image coding apparatus 100 constructs a default reference list including all the reference pictures which are indicated in the buffer descriptions (S102). Here, the default reference list is a reference list which is constructed according to a predetermined default reference list constructing scheme in the image coding apparatus and the image decoding apparatus. In other words, as the default reference list for the same picture (or slice), the same reference list is constructed in the image coding apparatus and the image decoding apparatus.

Next, the image coding apparatus 100 reorders the plurality of reference pictures included in the constructed default reference list (S103).

The image coding apparatus 100 then writes, into the second header of the coded bitstream, the reference list reordering information which indicates the details of the reordering in Step S103 (S104). Here, in the reference list reordering information, a picture to be reordered is specified using its buffer element index in the buffer description.

Finally, the image coding apparatus 100 codes a current slice using the buffer description and the reference list resulting from the reordering (S105). Furthermore, the image coding apparatus 100 generates the coded bitstream 132 which includes the resulting coded data.

Here, the first and second headers belong to the same single network abstraction layer (NAL) unit. One example of the single NAL unit is a slice NAL unit. This means that the first and second headers are each a single slice header. It is to be noted that this same single NAL unit may be an adaptation parameter set (APS) NAL unit, a picture parameter set (PPS) NAL unit, or a sequence parameter set (SPS) NAL unit.

Furthermore, the above first and second headers belong to NAL units of different NAL unit types. For example, the first header belongs to an SPS NAL unit while the second header belongs to an APS NAL unit. Alternatively, it may be that the first header belongs to a PPS NAL unit while the second header belongs to an APS NAL unit. It may be that the first header belongs to an SPS NAL unit while the second header belongs to a slice NAL unit. It may be that the first header belongs to a PPS NAL unit while the second header belongs to a slice NAL unit.

Figure 5:
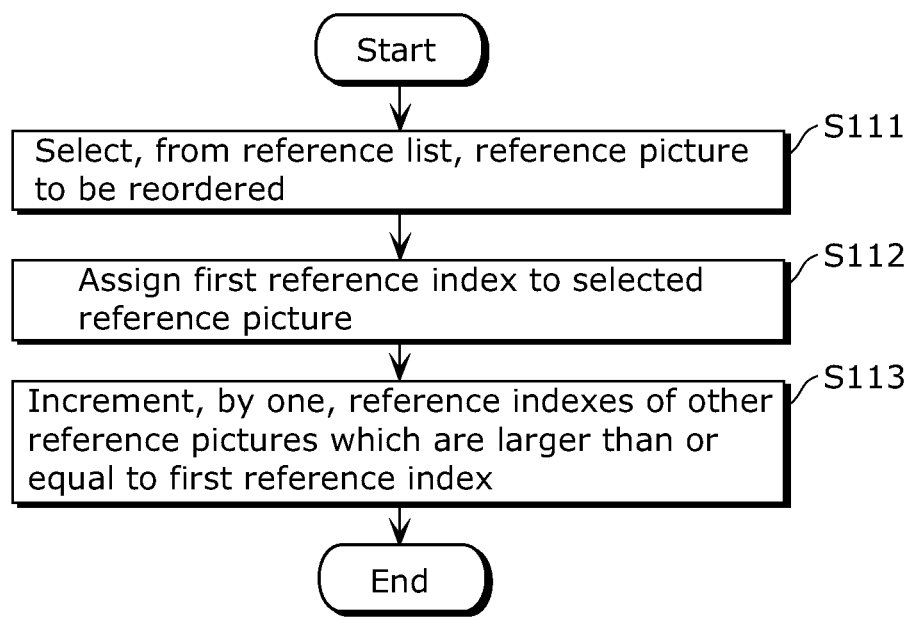
FIG. 5 is a flowchart of the first example of reordering a reference list according to the first embodiment of the present disclosure.

The following describes a process of reordering the default reference list (S103) shown in FIG. 4. FIG. 5 is a flowchart of the first example of this reordering (S103).

Firstly, the image coding apparatus 100 identifies and selects a reference picture to be reordered from the reference pictures included in a current reference list (S111). In the coded bitstream, the reference picture to be reordered is indicated using its corresponding buffer element index within the active buffer description.

Next, the image coding apparatus 100 assigns a predetermined reference index to the reference picture to be reordered in the reference list (S112).

Next, the image coding apparatus 100 increments reference indexes by one for the other reference pictures than the above reference picture to be reordered which are in the reference picture list and have reference indexes larger than or equal to the predetermined reference index (S113).

A specific example is given as follows. For example, a reference picture R is selected in Step S111. Next, the reference picture R is assigned a reference index=2 in Step S112. Subsequently, in Step S113, the reference indexes of reference pictures previously having reference indexes 2 or larger assigned thereto among the other reference pictures in the default reference list are incremented to be 3 or more. By so doing, a reordered reference list is constructed.

Figure 6:
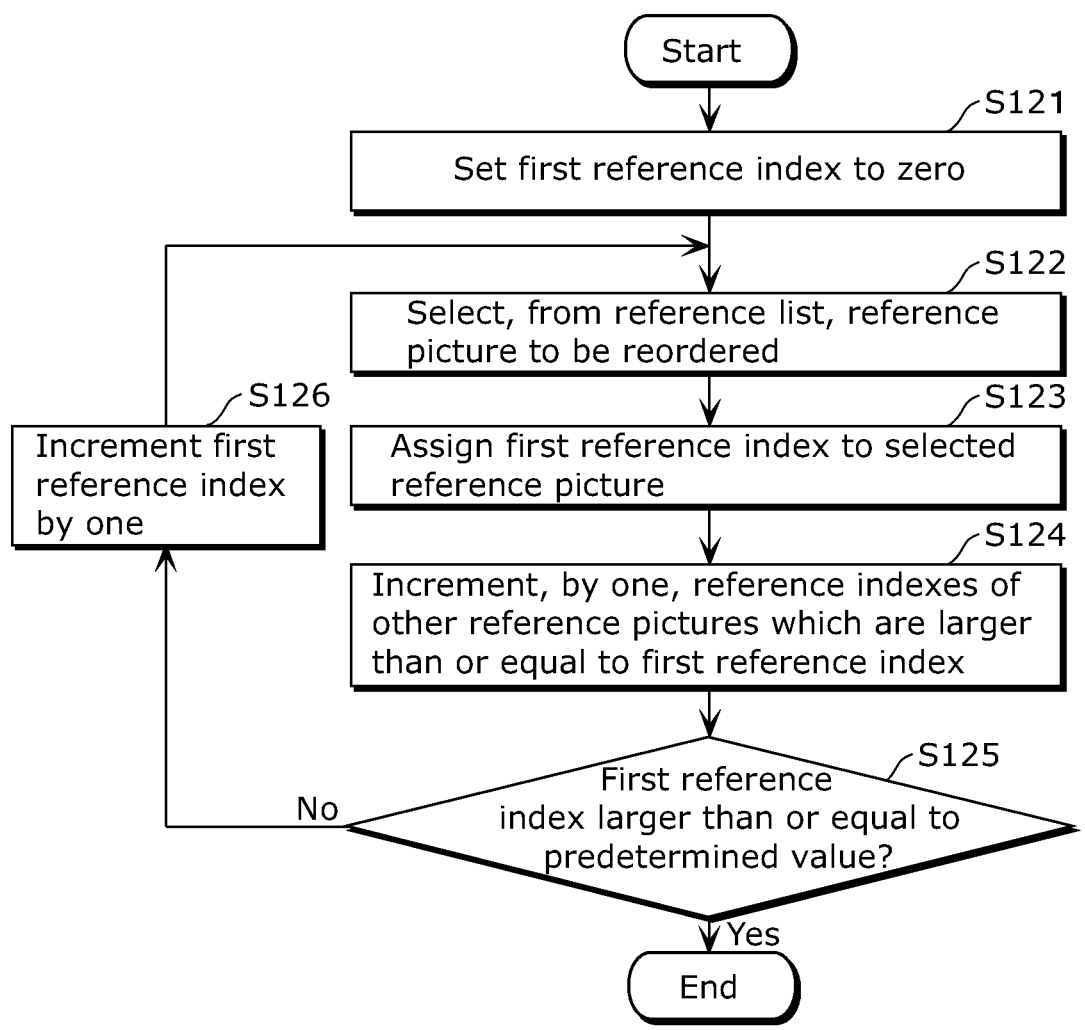
FIG. 6 is a flowchart of the second example of reordering a reference list according to the first embodiment of the present disclosure.

FIG. 6 is a flowchart of the second example of the reordering (S103).

The reordering (S103) shown in FIG. 6 includes a predetermined number of repetitive processes. Each of the repetitive processes includes processing which corresponds to the above Steps S111 to S113 shown in FIG. 5. Specifically, each of the repetitive processes includes a process of selecting a reference picture to be reordered (S122), a process of assigning a reference index to the reference picture to be reordered (S123), and a process of incrementing reference indexes by one (S124). For example, the coded bitstream includes information indicating the number of times of this repetitive process. It is to be noted that the coded bitstream may include information indicating whether or not, after each of the repetitive processes, another set of the repetitive process is to be performed.

Firstly, the image coding apparatus 100 sets the first reference index to zero (S121) in the initial repetitive process and then performs the processing in Steps S122 to S124.

Specifically, the image coding apparatus 100 identifies and selects a reference picture to be reordered from the reference pictures included in a current reference list (S122). In the coded bitstream, the reference picture to be reordered is indicated using its corresponding buffer element index within the active buffer description.

Next, the image coding apparatus 100 assigns a predetermined reference index (=0) to the reference picture to be reordered in the reference list (S123).

Next, the image coding apparatus 100 increments reference indexes by one for the other reference pictures than the above reference picture to be reordered which are in the reference picture list and have reference indexes larger than or equal to the predetermined reference index (S124).

When the first reference index is smaller than a predetermined value (No in S125), that is, when the repetitive process has not been performed the predetermined number of times, the image coding apparatus 100 increments the value of the first reference index by one (S126) and then performs the processing in Step S122 and the following steps. In other words, the processing in Steps S126 and S122 to S124 is performed repeatedly until the repetitive process has been performed the predetermined number of times (Yes in S125).

Here, in this embodiment, a reference picture to be reordered is indicated in the reference list reordering information included in the coded bitstream, using the absolute value of its buffer element index.

It may be that the reference list reordering information indicates, among the reference pictures to be reordered, an initial reference picture using the absolute value of its buffer element index, and indicates each of the following reference pictures to be reordered, using the difference value between its buffer element index and the buffer element index of the immediately previous reference picture to be reordered. Specifically, it may be that, in the initial repetitive process, the reference picture to be reordered is indicated using the absolute value of its buffer element index, and in each of the second and subsequent repetitive processes, the reference picture to be reordered is indicated using the difference value between the buffer element indexes.

Syntax Diagram: First Example

Figure 7:
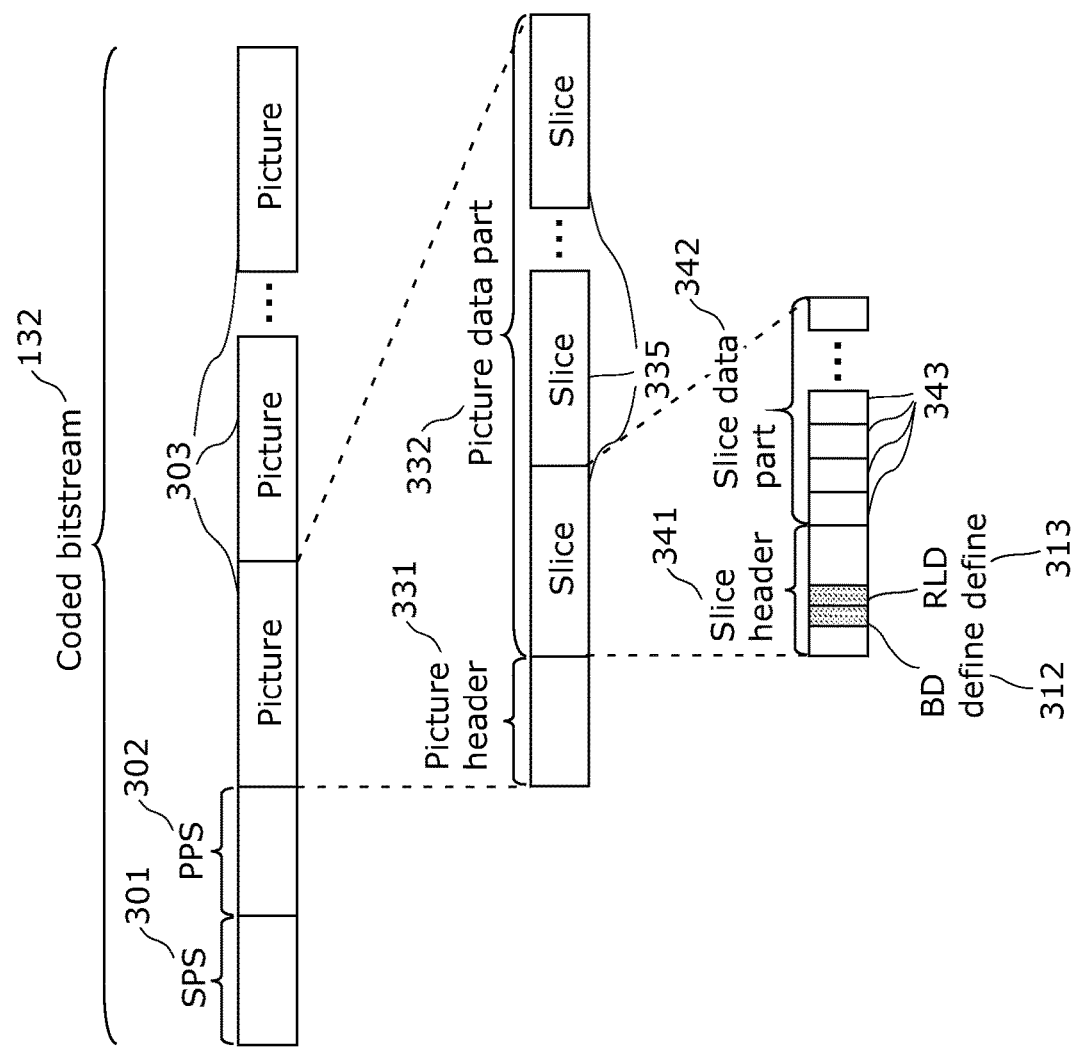
FIG. 7 shows a structure of a coded bitstream according to the first example of the first embodiment of the present disclosure.
Figure 8:
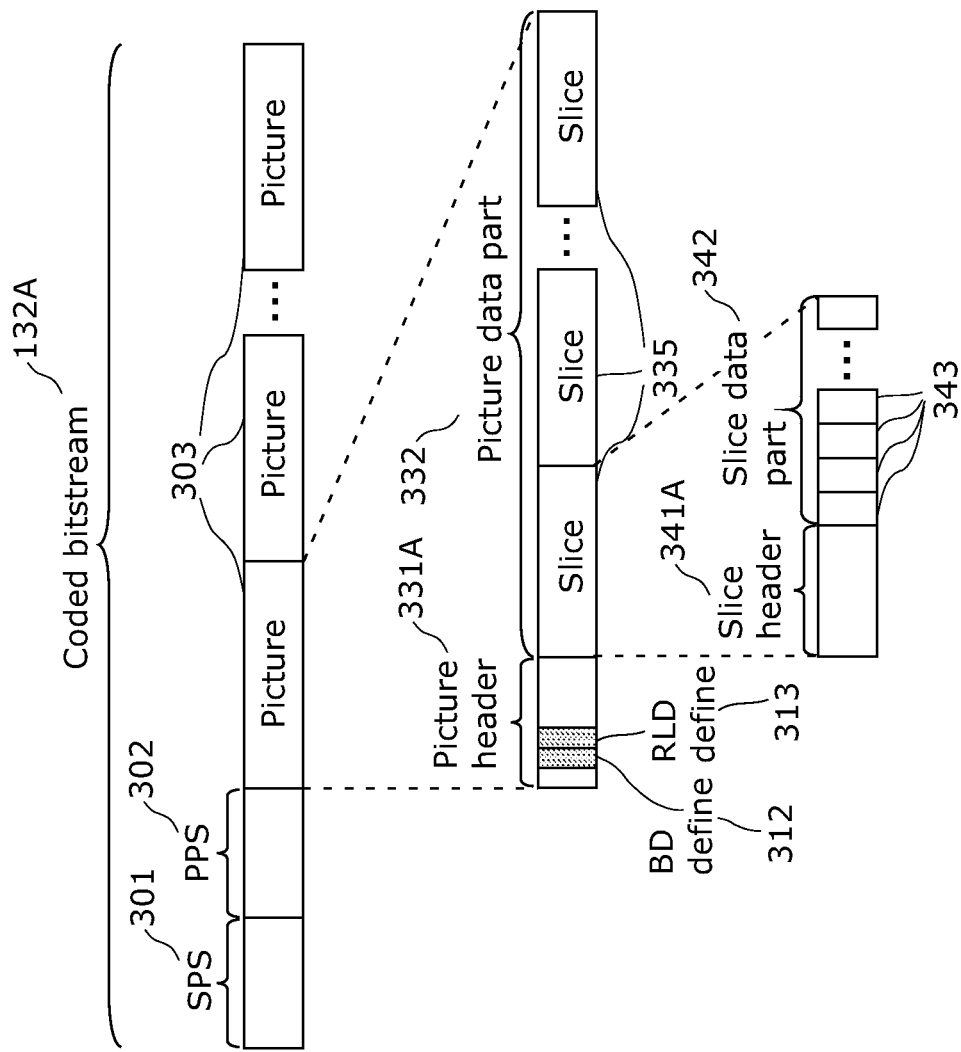
FIG. 8 shows a structure of a coded bitstream according to the first example of the first embodiment of the present disclosure.

FIGS. 7 and 8 are each a syntax diagram which shows the locations of the buffer description defining information and the reference list description defining information in a coded bitstream in the first example of this embodiment.

The coded bitstream 132 shown in FIG. 7 includes SPS 301, PPS 302, and a plurality of picture data 303. Each of the picture data 303 includes a picture header 331 and a picture data part 332. The picture data part 332 includes a plurality of slice data 335.

Each of the slice data 335 includes a slice header 341 and a slice data part 342. The slice data part 342 includes a plurality of coding unit (CU) data 343.

The slice header 341 includes buffer description defining information 312 (BD define) and reference list description defining information 313 (RLD define).

The buffer description defining information 312 defines buffer descriptions 315. For example, like the above-mentioned buffer descriptions 515, the buffer descriptions 315 each include a plurality of buffer elements.

The reference list description defining information 313 defines a plurality of reference list descriptions 316. This reference list description defining information 313 includes the above-mentioned reference list reordering information and a reordering flag for indicating whether or not the default reference list is to be reordered.

Furthermore, in a coded bitstream 132A shown in FIG. 8, the buffer description defining information 312 and the reference list description defining information 313 are included not in a slice header 341A, but in a picture header 331A. The buffer description defining information 312 and the reference list description defining information 313 may be included in APS in HEVC. Here, a picture includes a plurality of slices. Thus, all slices included in one picture use one of the reference lists that are constructed according to the buffer description defining information 312 and the reference list description defining information 313.

It is to be noted that "slice" in the above explanation may be replaced by "sub-picture unit (SPU)". The sub-picture unit includes, for example, a tile, an entropy slice, and a group of blocks constituting a wavefront processing sub-picture partition (Wavefront Parallel Processing (WPP)) unit).

The above buffer description defining information 312 and reference list description defining information 313 are signalled in the syntax structure of the slice header according to the pseudo code in the table shown in FIG. 9. It is to be noted that the same applies to the syntax structures of the SPU header and the picture header.

The descriptors define the parsing process of each syntax element according to the same bit representation as the AVC video coding scheme as follows:

ue(v): unsigned integer Exp-Golomb-coded syntax element with the left bit first.

u(n): unsigned integer using n bits. When n is "v" in the syntax table, the number of bits varies in a manner dependent on the value of other syntax elements.

The following explains the semantics associated with the syntax elements representing the buffer description defining information and the reference list description defining information.

In FIG. 9, PredictionType denotes the prediction type of the current slice (or SPU or picture). PredictionType=P indicates single prediction and PredictionType=B indicates bi-prediction. This PredictionType is information indicated earlier in the coded bitstream and is, for example, information indicated earlier in the preceding slice header syntax elements or in the APS syntax structure.

The following describes the syntax elements shown in FIG. 9.

The variables or lists BDDeltaPOC and BDTemporalID represent the ordered buffer elements BE in the active buffer description BD.

number_of_bes_minus1 indicates the number of buffer elements BE in the buffer description BD. The number of buffer elements BE is (number_of_bes_minus1+1).

first_delta_poc_sign_flag indicates the sign (plus or minus) of the POC difference between a current picture and the reference picture associated with the buffer element BE[0] in the buffer description BD. first_delta_poc_sign_flag[i] equal to 0 specifies that the POC difference has a positive value, while first_delta_poc_sign_flag[i] equal to 1 specifies that the POC difference has a negative value.

first_delta_poc_minus1 indicates an absolute POC difference value between a current picture and the reference picture associated with the buffer element BE[0] in the buffer description BD. first_delta_poc_sign_flag and first_delta_poc define the value of the signed variable BDDeltaPOC[0] as $$BDDeltaPOC[0]=(first\_delta\_poc\_minus1+1)*(1-2*first\_delta\_poc\_sign\_flag)$$

BDDeltaPOC[0] shall be the highest signed POC difference value among all reference pictures associated with the buffer elements BE[j] in the buffer description BD.

first_temporal_id specifies a temporal identifier and is represented by a predetermined number of bits. For example, the predetermined number of bits is indicated earlier in the coded bitstream and is indicated, for example, in the active SPS or the active PPS. first_temporal_id defines the value of the unsigned variable BDTemporalID[0] as $$BDTemporalID[0]=first\_temporal\_id$$

delta_poc_minus1[j] specifies a negative POC distance value from the reference picture associated with the buffer element BE[j] to the reference picture associated with the buffer element BE[j+1] in the buffer description BD. delta_poc_minus1[j] defines the value of the signed variable BDDeltaPOC[j+1] as $$BDDeltaPOC[j+1]=BDDeltaPOC[j]-(delta\_poc\_minus1[j]+1)$$

temporal_id[j] specifies a temporal identifier and is represented by a predetermined number of bits in a similar way as first_temporal_id. temporal_id[j] defines the value of the unsigned variable BDTemporalID[j+1] as $$BDTemporalID[j+1]=temporal\_id[j]$$

ref_pic_list_modification_flag_l0 equal to 1 specifies that num_ref_idx_l0_active_minus1 and more_modification_flag are present for specifying the reference picture list RL0 corresponding to the buffer description BD. ref_pic_list_modification_flag_l0 equal to 0 specifies that num_ref_idx_l0_active_minus1 and more_modification_flag are not present.

When ref_pic_list_modification_flag_l0 is equal to 1, the number of times that more_modification_flag is equal to 1 following ref_pic_list_modification_flag_l0 shall not exceed (num_ref_idx_l0_active_minus1+1).

ref_pic_list_modification_flag_l1 equal to 1 specifies that the num_ref_idx_l1_active_minus1 and more_modification_flag are present for specifying the reference picture list RL1 corresponding to the buffer description BD. ref_pic_list_modification_flag_l1 equal to 0 specifies that num_ref_idx_l1_active_minus1 and more_modification_flag are not present.

When ref_pic_list_modification_flag_l1 is equal to 1, the number of times that more_modification_flag is equal to 1 following ref_pic_list_modification_flag_l1 shall not exceed (num_ref_idx_l1_active_minus1+1).

num_ref_idx_l0_active_minus1 specifies the maximum reference index for reference picture list RL0 corresponding to the buffer description BD.

num_ref_idx_l1_active_minus1 specifies the maximum reference index for reference picture list RL1 corresponding to the buffer description BD.

more_modification_flag together with be_idx specifies which of the reference pictures are re-mapped. more_modification_flag equal to 1 specifies that be_idx is present immediately following more_modification_flag. more_modification_flag equal to 0 specifies the end of the loop for re-mapping reference pictures in the reference picture list.

be_idx_in_ref_pic_list specifies the reference picture associated with the buffer element BE[be_idx_in_ref_pic_list] in the current buffer description BD. be_idx_in_ref_pic_list identifies the picture to be re-mapped in the current reference picture list RL0 or RL1 associated with the buffer description BD. The re-mapping or reordering process is performed following the processing described in FIGS. 5 and 6.

Syntax Diagram: Second Example

Figure 10:
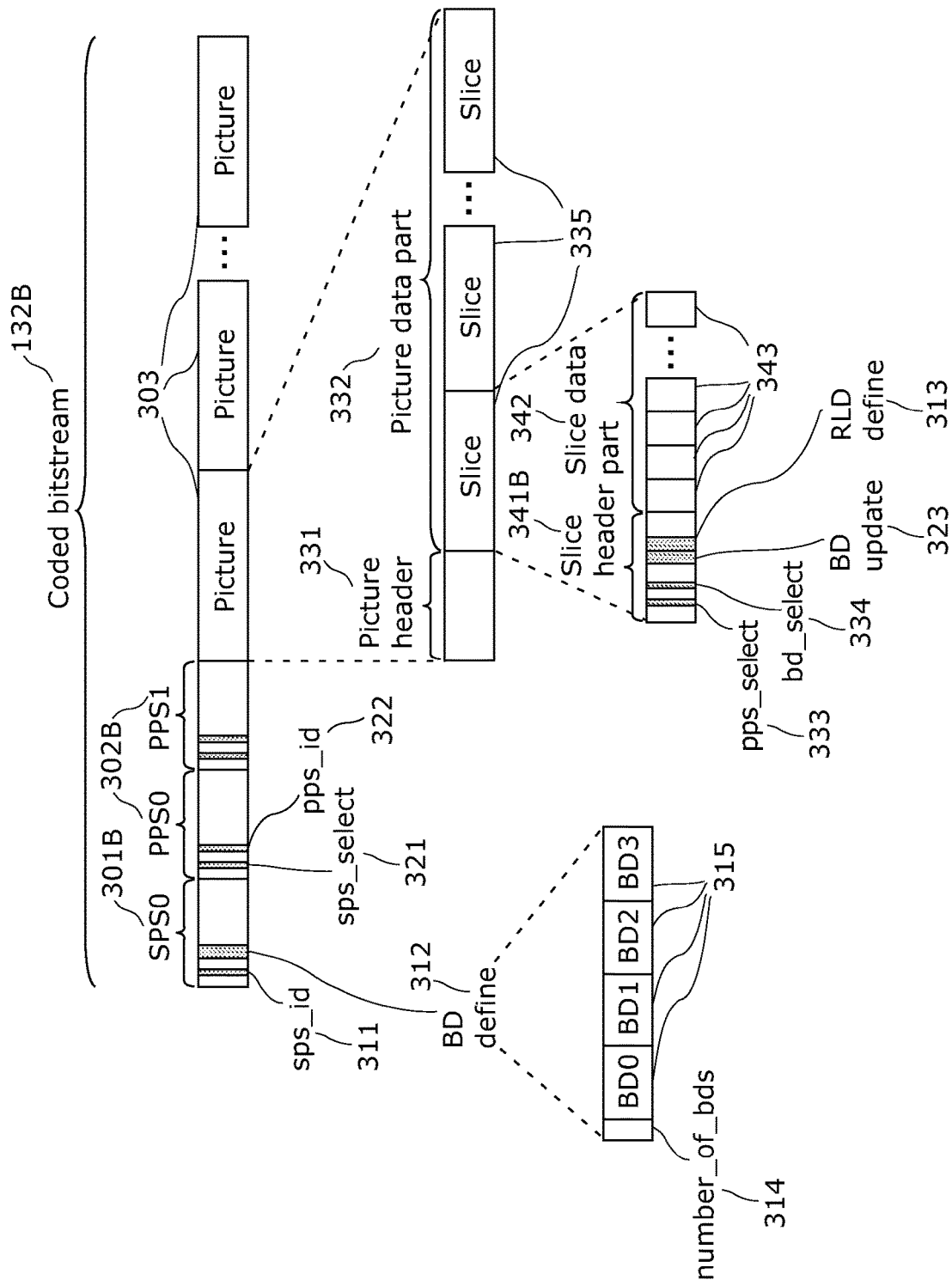
FIG. 10 shows a structure of a coded bitstream according to the second example of the first embodiment of the present disclosure.
Figure 11:
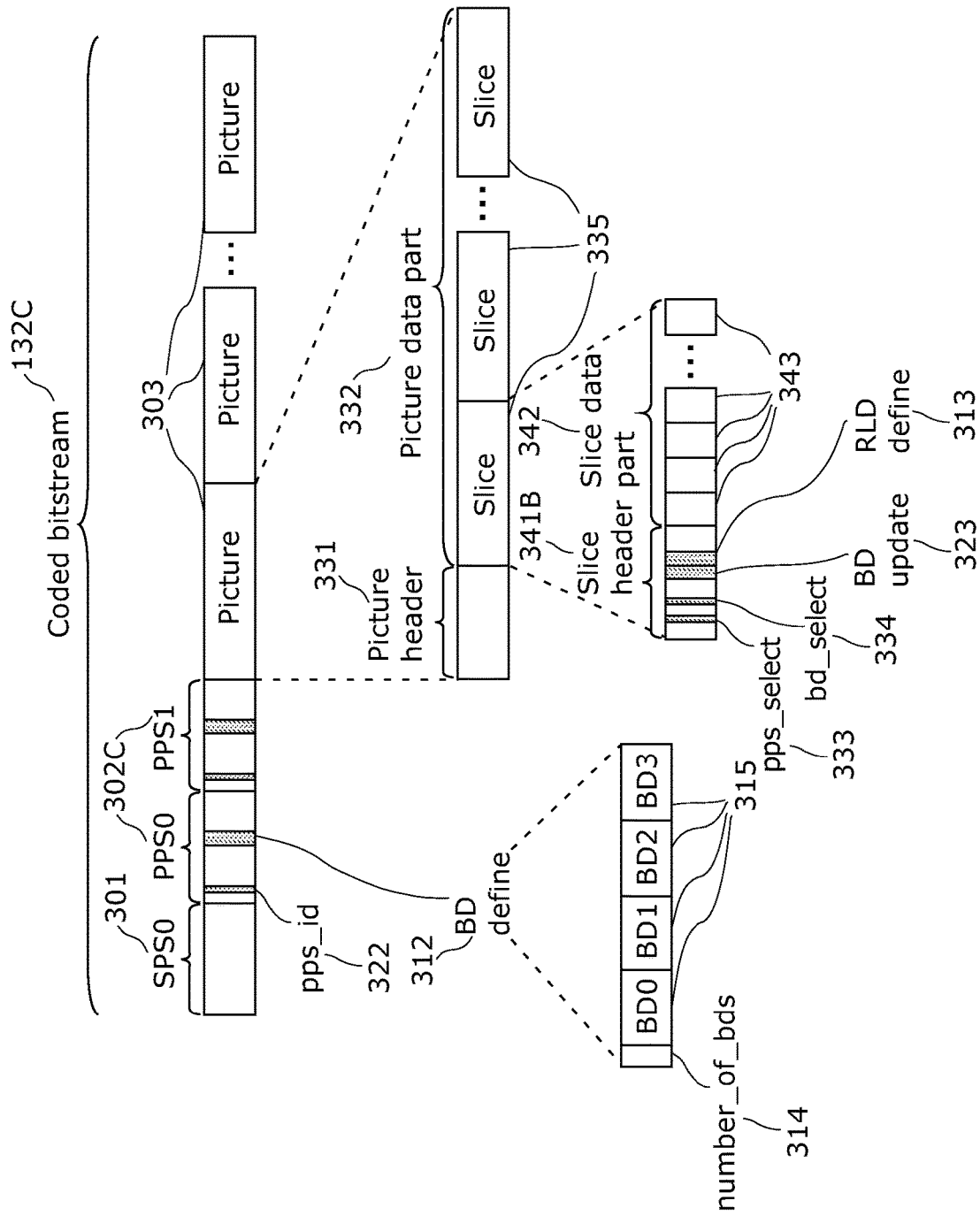
FIG. 11 shows a structure of a coded bitstream according to the second example of the first embodiment of the present disclosure.

FIGS. 10 and 11 are each a syntax diagram which shows the locations of the buffer description defining information and the reference list description defining information in a coded bitstream in the second example of this embodiment. The following mainly describes differences from the first example and thus omits overlapping explanations. Elements the same or alike as the elements shown in FIGS. 7 and 8 are denoted by the same references. This applies to other examples below.

A coded bitstream 132B shown in FIG. 10 is different from the coded bitstream 132 shown in FIG. 7 in that the SPS includes the buffer description defining information 312. Specifically, the coded bitstream 132B shown in FIG. 10 is different from the coded bitstream 132 shown in FIG. 7 in that the SPS 301, the PPS 302, and the slice header 341 are replaced by SPS 301B, PPS 302B, and a slice header 341B, respectively.

The SPS 301B includes buffer description defining information 312 and an SPS identifier 311 (sps_id).

The buffer description defining information 312 defines a plurality of buffer descriptions 315. Furthermore, the buffer description defining information 312 includes the number of buffer descriptions 314 (number_of_bds) indicating the number of buffer descriptions 315 included in the buffer description defining information 312.

Furthermore, the SPS 301B is identified by the unique SPS identifier 311 (e.g. sps_id=0).

Each of the PPSs 302B includes SPS selecting information 321 (sps_select) and a PPS identifier 322 (pps_id). The SPS selecting information 321 (e.g. sps_select=0) indicates the SPS301B which is referred to. Furthermore, each of the PPSs 302B is identified by the unique PPS identifier 322 (e.g. pps_id=0).

The slice header 341B includes PPS selecting information (pps_select) 333, buffer description selecting information 334 (bd_select), buffer description updating information 323 (BD update), and the reference list description defining information 313.

The PPS selecting information 333 (e.g. pps_select=0) indicates the PPS 302B which is referred to. Using this PPS selecting information 333, one of the PPSs 302B is referred to from the slice header 341B. Furthermore, using the SPS selecting information 321 included in the PPS 302B, the SPS 301B is referred to from the PPS 302B referred to. This links the current slice to the available plurality of buffer descriptions defined in the SPS 301B.

With the buffer description selecting information 334 (e.g. bd_select=2), one of the buffer descriptions is specified. Thus, one buffer description is selected out of the plurality of buffer descriptions.

The buffer description updating information 323 is information for updating the selected buffer description. The updated buffer description is then used in the process of coding or decoding the current slice. When the default buffer descriptions defined using the buffer description defining information 312 included in the SPS 301B are not updated, the slice header 341B does not include the buffer description updating information 323.

Like a coded bitstream 132C shown in FIG. 11, the buffer description defining information 312 may be included in PPS 302C.

The above buffer description defining information 312 is signalled in the syntax structure of the sequence parameter set according to the pseudo code in the table shown in FIG. 12. It is to be noted that the same applies to the syntax structure of the picture parameter set. The above buffer description updating information 323 and reference list description defining information 313 are signalled in the syntax structure of the slice header according to the pseudo code in the table shown in FIG. 13. It is to be noted that the same applies to the syntax structures of the SPU header and the picture header.

The following describes the syntax elements shown in FIG. 12.

The variables or lists BDDeltaPOC[i] and BDTemporalID[i] represent the ordered buffer elements BE[i] in the active buffer description BD[i].

bits_for_temporal_id indicates the number of bits of first_temporal_id and temporal_id.

number_of_bds (the number of buffer descriptions 314) indicates the number of number_of_bes_minus1 included in the SPS 301. In other words, number_of_bds indicates the number of buffer descriptions 315 included in the SPS 301.

number_of_bes_minus1[i] indicates the number of buffer elements in the buffer description BD[i].

first_delta_poc_sign_flag[i] indicates the sign (plus or minus) of the POC difference between a current picture and the reference picture associated with the buffer element BE[i][0] in the buffer description BD[i]. first_delta_poc_sign_flag[i] equal to 0 specifies that the POC difference has a positive value, while first_delta_poc_sign_flag[i] equal to 1 specifies that the POC difference has a negative value.

first_delta_poc_minus1[i] indicates an absolute POC difference value between a current picture and the reference picture associated with the buffer element BE[i][0] in the buffer description BD[i]. first_delta_poc_sign_flag[i] and first_delta_poc[i] define the value of the signed variable BDDeltaPOC[i][0] as BDDeltaPOC[i][0]=(first_delta_poc_minus1[i]+1)*
(1−2*first_delta_poc_sign_flag[i])

BDDeltaPOC[i][0] shall be the highest signed POC difference value among all reference pictures associated with the buffer elements BE[i][j] in the buffer description BD[i].

first_temporal_id[i] specifies a temporal identifier and is represented by bits_for_temporal_id bits. first_temporal_id[i] defines the value of the unsigned variable BDTemporalID[i][0] as BDTemporalID[i][0]=First_Temporal_Id[i]

delta_poc_minus1[i][j] indicates an negative POC distance value from the reference picture associated with the buffer element BE[i][j] to the reference picture associated with the buffer element BE[i][j+1] in the buffer description BD[i]. delta_poc_minus1[i][j] defines the value of the signed variable BDDeltaPOC[i][j+1] as BDDeltaPOC[i][j+1]=BDDeltaPOC[i][j]−(delta_poc_minus1[i][j]+1)

temporal_id[i][j] specifies a temporal identifier and is represented by bits_for_temporal_id bits. temporal_id[i] defines the value of the unsigned variable BDTemporalID[i][j+1] as BDTemporalID[i][j+1]=temporal_id[i][j]

The following describes the syntax elements shown in FIG. 13.

The variable PredictionType denotes the prediction type of the current slice (or SPU or picture). The details of PredictionType are as described above.

The variables or lists BDDeltaPOC[bd_select] and BDTemporalID[bd_select] represent the ordered buffer elements BE[bd_select] in the selected buffer description BD[bd_select]. The updated variables or lists BDDeltaPOC[bd_select] and BDTemporalID[bd_select] represent the active buffer description used in the process of coding or decoding the current slice.

bd_select specifies an index into the lists BDDeltaPOC and BDTemporalID representing the buffer description BD[bd_select] to be modified by the slice header.

bd_modification_operation specifies a modification operation to be applied on the selected buffer description BD[bd_select]. bd_modification_operation equal to 0 specifies the end of the loop for modifying the buffer description BD[bd_select].

In this embodiment, while bd_modification_operation equal to 1 specifies that a buffer element indicated by be_idx_in_bd_update in the buffer description BD[bd_select] is to be assigned a POC difference value to a current picture. This POC difference value represents a difference between the POC number of the reference picture and the POC number of the current picture or slice.

In alternative implementations, additional buffer description modification operations indicated by bd_modification_operation may be defined. One example is the operation for assigning marking for a picture indicated by a buffer element as a short term or long term reference picture.

be_idx_in_bd_update specifies the buffer element to be modified in the buffer description BD[bd_select].

delta_poc_sign_flag specifies the sign (plus or minus) of the POC difference between a current picture and the reference picture to be associated with the buffer element BE[bd_select][be_idx_in_bd_update] in the buffer description BD[bd_select]. delta_poc_sign_flag equal to 0 specifies that the POC difference has a positive value, while delta_poc_sign_flag equal to 1 specifies that the POC difference has a negative value.

delta_poc_minus1 specifies an absolute POC difference value between a current picture and the reference picture to be associated with the buffer element BE[bd_select][be_idx_in_bd_update] in the buffer description BD[bd_select]. first_delta_poc_sign_flag and first_delta_poc define the value of the signed variable BDDeltaPOC[bd_select][be_idx_in_bd_update] as BDDeltaPOC[bd_select][be_idx_in_bd_update]=(delta_poc_minus1+1)*(1−2*delta_poc_sign_flag)

temporal_id specifies a temporal identifier and is represented by bits_for_temporal_id bits. temporal_id defines the value of the unsigned variable BDTemporalID[bd_select][be_idx_in_bd_update] as BDTemporalID[bd_select][be_idx_in_bd_update]=temporal_id The semantics of the syntax elements of the reference list description defining information ref_pic_list_modification_flag_l0, ref_pic_list_modification_flag_l1, num_ref_idx_l0_active_minus1, num_ref_idx_l1_active_minus1, more_modification_flag, and be_idx_in_ref_pic_list shown in FIG. 13 is the same as in FIG. 9.

Syntax Diagram: Third Example

Figure 15:
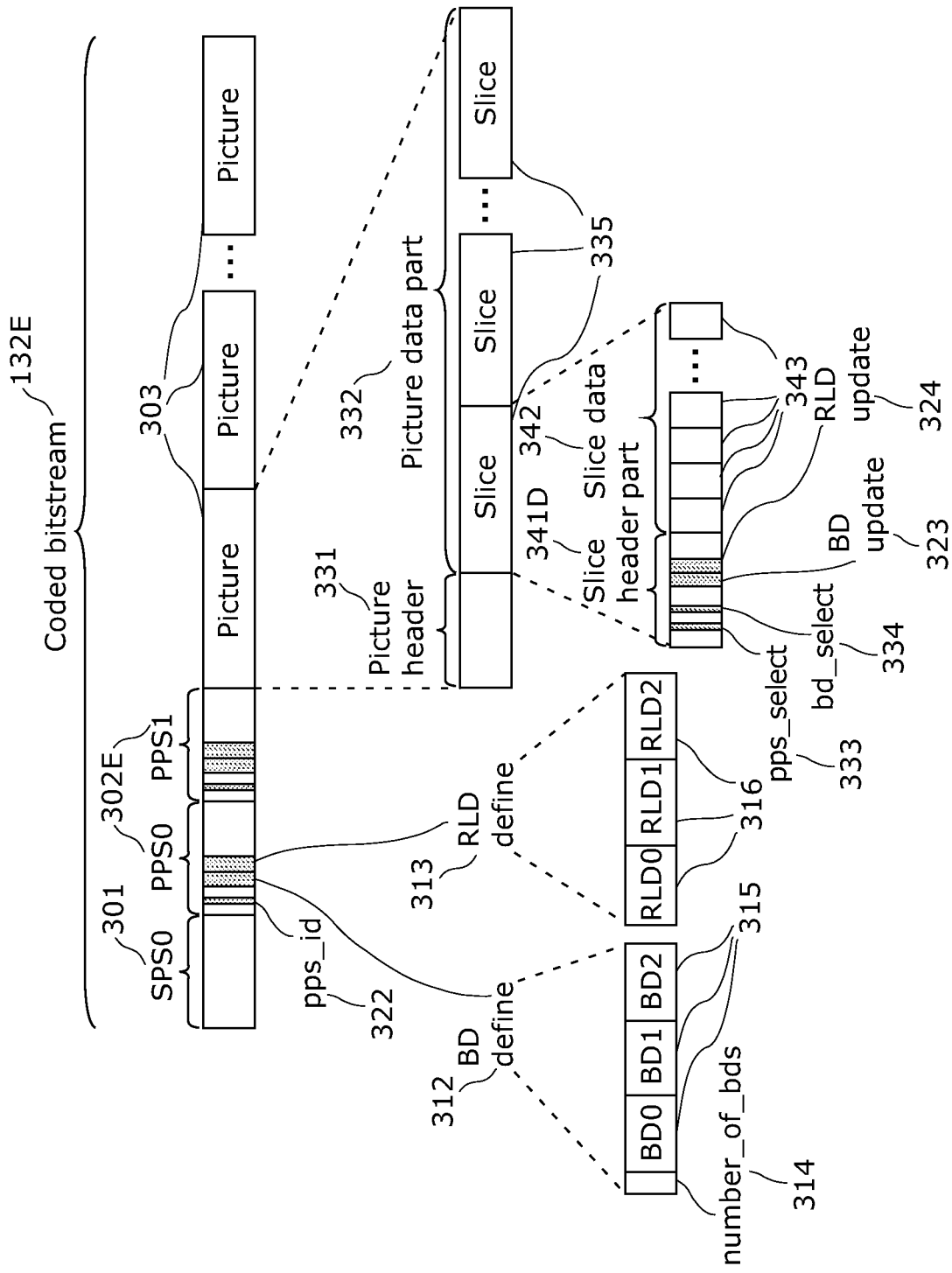
FIG. 15 shows a structure of a coded bitstream according to the third example of the first embodiment of the present disclosure.

FIGS. 14 and 15 are each a syntax diagram which shows the locations of the buffer description defining information and the reference list description defining information in a coded bitstream in the third example of this embodiment.

A coded bitstream 132D shown in FIG. 14 is different from the coded bitstream 132B shown in FIG. 10 in that the SPS includes the reference list description defining information 313. Specifically, the coded bitstream 132D shown in FIG. 14 is different from the coded bitstream 132B shown in FIG. 10 in that the SPS 301B and the slice header 341B are replaced by SPS 301D and a slice header 341D, respectively.

The SPS 301D further includes the reference list description defining information 313 in addition to the buffer description defining information 312 and the SPS identifier 311.

The reference list description defining information 313 defines a plurality of reference list descriptions 316. Each reference list description 316 (e.g. RLD2) is associated exclusively with a buffer description 315 (e.g. BD2).

The slice header 341D includes the PPS selecting information 333, the buffer description selecting information 334, the buffer description updating information 323, and reference list description updating information 324 (RLD update).

The reference list description updating information 324 is information for updating the reference list description which corresponds to the updated buffer description. The updated buffer description and reference list description are then used in the process of coding or decoding the current slice. When the default buffer descriptions and the reference list description defined using the buffer description defining information 312 and the reference list description defining information 313, respectively, which are included in the SPS 301D are not updated, the slice header 341D does not include the buffer description updating information 323 or the reference list description updating information 324.

In the SPS 301D, the reference list description defining information 313 follows the buffer description defining information 312. In the slice header 341D, the reference list description updating information 324 follows the buffer description updating information 323. The reference list description defining information 313 and the reference list description updating information 324 each include a reordering flag for indicating whether or not the reference list is to be reordered. When the reference list is to be reordered, each of the reference list description defining information 313 and the reference list description updating information 324 further includes reference list reordering information which indicates the details of the reordering.

When the reference list description updating information 324 indicates that the reordering is not to be performed, a reference list is constructed using the reference list description defining information 313. On the other hand, when the reference list description updating information 324 indicates that the reordering is to be performed, the reference list constructed using the reference list description defining information 313 is not used, but the reference list is constructed using the reference list description updating information 324. Specifically, a default reference list is constructed according to a predetermined default reference list constructing scheme. Next, the default reference list is reordered according to the reordering information included in the reference list description updating information 324. In other words, the reference list reordered using the reference list description defining information 313 overwrites the reference list reordered using the reference list description updating information 324. Here, in the reference list reordering information included in the reference list description defining information 313 and the reference list description updating information 324, a reference list to be reordered is identified using its buffer element index within the buffer description.

Like a coded bitstream 132E shown in FIG. 15, the reference list description defining information 313 may be included in PPS 302E.

The above buffer description defining information 312 and reference list description defining information 313 are signalled in the syntax structure of the sequence parameter set according to the pseudo code in the table shown in FIG. 16. It is to be noted that the same applies to the syntax structure of the picture parameter set. The above buffer description updating information 323 and reference list description updating information 324 are signalled in the syntax structure of the slice header according to the pseudo code in the table shown in FIG. 17. It is to be noted that the same applies to the syntax structures of the SPU header and the picture header.

The following describes the syntax elements shown in FIG. 16.

The variables or lists BDDeltaPOC[i] and BDTemporalID[i] represent the ordered buffer elements BE[i] in the active buffer description BD.

The semantics of the syntax elements of the buffer description defining information bits_for_temporal_id, number_of_bds, number_of_bes_minus1[i], first_delta_poc_sig n_flag[i], first_delta_poc_minus1[i], first_temporal_id[i], delta_poc_minus1[i][j], and temporal_id[i][j] shown in FIG. 16 is the same as in FIG. 12.

ref_pic_list_modification_flag_l0[i] equal to 1 specifies that num_ref_idx_l0_active_minus1[i] and more_modification_flag are present for specifying the reference picture list RL0[i] corresponding to the buffer description BD[i]. ref_pic_list_modification_flag_l0[i] equal to 0 specifies that num_ref_idx_l0_active_minus1[i] and more_modification_flag are not present.

When ref_pic_list_modification_flag_l0[i] is equal to 1, the number of times that more_modification_flag is equal to 1 following ref_pic_list_modification_flag_l0[i] shall not exceed (num_ref_idx_l0_active_minus1[i]+1).

ref_pic_list_modification_flag_l1[i] equal to 1 specifies that num_ref_idx_l1_active_minus1[i] and more_modification_flag are present for specifying the reference picture list RL1[i] corresponding to the buffer description BD[i].

ref_pic_list_modification_flag_l1[i] equal to 0 specifies that num_ref_idx_l1_active_minus1[i] and more_modification_flag are not present.

When ref_pic_list_modification_flag_l1[i] is equal to 1, the number of times that more_modification_flag is equal to 1 following ref_pic_list_modification_flag_l1[i] shall not exceed (num_ref_idx_l1_active_minus1[i]+1).

num_ref_idx_l0_active_minus1[i] indicates the maximum reference index for reference picture list RL0[i] corresponding to the buffer description BD[i].

num_ref_idx_l1_active_minus1[i] indicates the maximum reference index for reference picture list RL1[i] corresponding to the buffer description BD[i].

more_modification_flag together with be_idx specifies which of the reference pictures are re-mapped. more_modification_flag equal to 1 specifies that be_idx is present immediately following more_modification_flag. more_modification_flag equal to 0 specifies the end of the loop for re-mapping reference pictures in the reference picture list.

be_idx_in_ref_pic_list specifies the reference picture associated with the buffer element BE[i][be_idx_in_ref_pic_list] in the current buffer description BD[i]. be_idx_in_ref_pic_list identifies the picture to be re-mapped in the current reference list RL0[i] or RL1[i] associated with the buffer description BD[i]. The re-mapping or reordering process is performed following the processing described in FIGS. 5 and 6.

The following describes the syntax elements shown in FIG. 17.

The variable PredictionType denotes the prediction type of the current slice (or SPU or picture). The details of PredictionType are as described above.

The variables or lists BDDeltaPOC[bd_select] and BDTemporalID[bd_select] represent the ordered buffer elements BE[bd_select] in the selected buffer description BD[bd_select]. The updated variables or lists BDDeltaPOC[bd_select] and BDTemporalID[bd_select] represent the active buffer description used in the process of coding or decoding the current slice.

The semantics of the syntax elements of the buffer description updating information bd_select, bd_modification_operation, be_idx_in_bd_update, delta_poc_sign_flag, delta_poc_minus1, and temporal_id shown in FIG. 17 is the same as in FIG. 13.

The semantics of the syntax elements of the reference list updating information ref_pic_list_modification_flag_l0, ref_pic_list_modification_flag_l1, num_ref_idx_l0_active_minus1, num_ref_idx_l1_active_minus1, more_modification_flag, and be_idx_in_ref_pic_list shown in FIG. 17 is the same as in FIG. 9.

Syntax Diagram: Fourth Example

Figure 18:
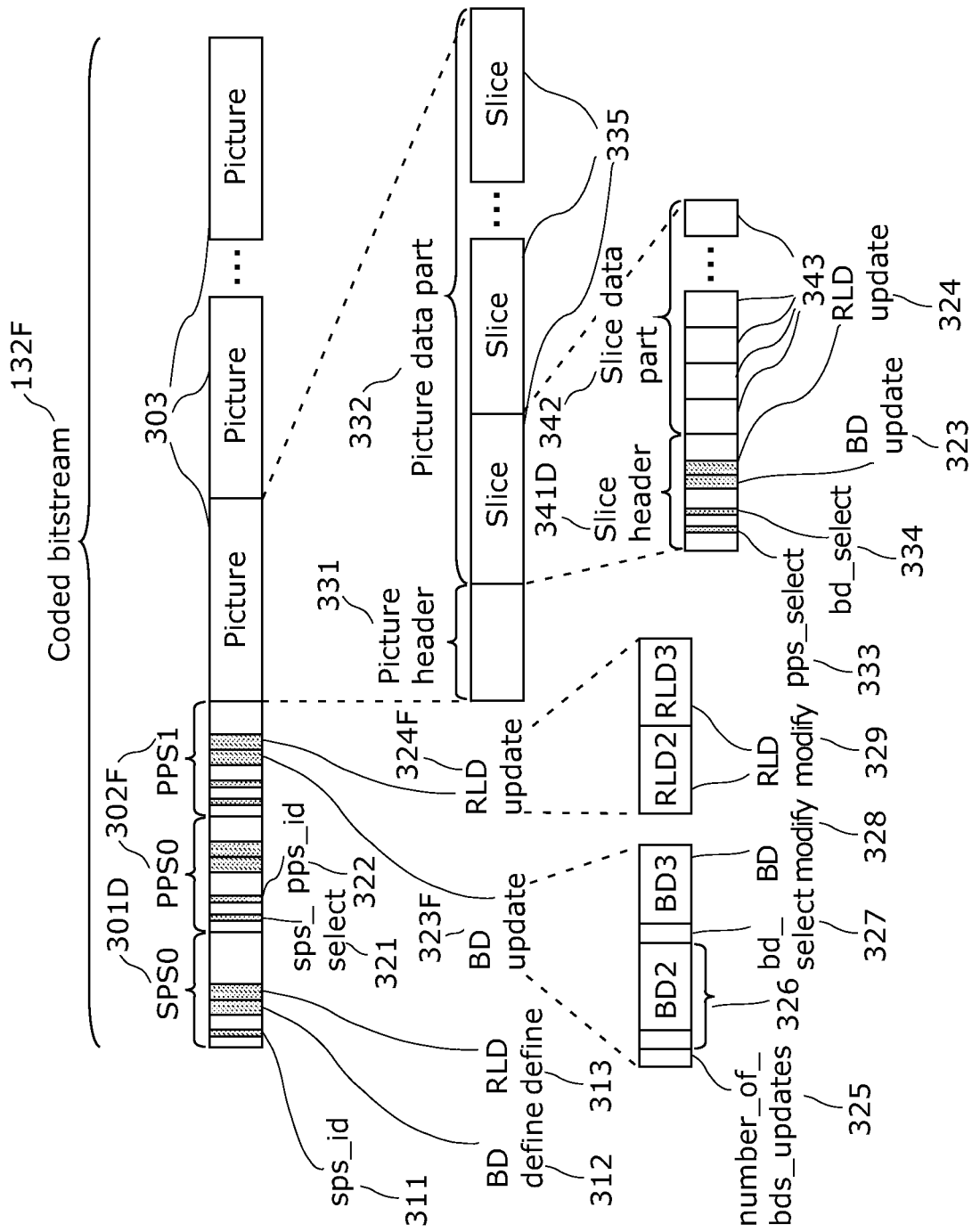
FIG. 18 shows a structure of a coded bitstream according to the fourth example of the first embodiment of the present disclosure.

FIG. 18 is a syntax diagram which shows the locations of the buffer description defining information and the reference list description defining information in a coded bitstream in the fourth example of this embodiment.

A coded bitstream 132F shown in FIG. 18 is different from the coded bitstream 132D shown in FIG. 14 in that the PPS further includes the buffer description updating information and the reference list description updating information. Specifically, the coded bitstream 132F shown in FIG. 18 is different from the coded bitstream 132D shown in FIG. 14 in that the PPS 302B is replaced by PPS 302F.

The PPS 302F further includes buffer description updating information 323F and reference list description updating information 324F in addition to the SPS selecting information 321 and the PPS identifier 322.

The buffer description updating information 323F includes number-of-updates information 325 (number_of_bd_updates) and one or more pieces of updating information 326. Each piece of the updating information 326 includes buffer description selecting information 327 (bd_select) and buffer description modifying information 328 (BD modify).

The number-of-updates information 325 (e.g. number_of_bd_updates=2) indicates the number of buffer descriptions to be modified and the number of corresponding reference list descriptions to be modified.

The buffer description selecting information 327 specifies a buffer description to be updated. The buffer description modifying information 328 indicates the details of modification of the buffer description.

The reference list description updating information 324F includes one or more pieces of reference list defining information 329 (RLD define). Each piece of the reference list defining information 329 defines the reference list description corresponding to the updated buffer description.

In the PPS 302F, the reference list description updating information 324F follows the buffer description updating information 323F. As in the case of the reference list description defining information 313 and the reference list description updating information 324, the reference list description updating information 324F includes a reordering flag for indicating whether or not the reference list is to be reordered. When the reference list is to be reordered, the reference list description updating information 324F further includes reference list reordering information which indicates the details of the reordering.

When the reference list description updating information 324 indicates that the reordering is not to be performed, a reference list is constructed using the reference list description updating information 324F included in the PPS. On the other hand, when the reference list description updating information 324 indicates that the reordering is to be performed, the reference list constructed using the reference list description updating information 324F is not used, but the reference list is constructed using the reference list description updating information 324. Specifically, a default reference list is constructed according to a predetermined default reference list constructing scheme. Next, the default reference list is reordered according to the reordering information included in the reference list description updating information 324. In other words, the reference list reordered using the reference list description updating information 324F overwrites the reference list reordered using the reference list description updating information 324.

The relationship between the reference list description updating information 324F included in the PPS 302F and the reference list description defining information 313 included in the SPS 301D is the same or alike as the relationship between the reference list description updating information 324 and the reference list description updating information 324F. Specifically, it is sufficient that "the reference list description updating information 324" in the above explanation is replaced by "the reference list description updating information 324F" and that "the reference list description updating information 324F" in the above explanation is replaced by "the reference list description defining information 313".

Here, in the reference list reordering information included in the reference list description updating information 324F, a reference list to be reordered is identified using its buffer element index within the buffer description, as in the case of the reference list description defining information 313 and the reference list description updating information 324.

The above buffer description defining information 312 and reference list description defining information 313 are signalled in the syntax structure of the sequence parameter set according to the pseudo code in the table shown in FIG. 19. The above buffer description updating information 323F and reference list description updating information 324F are signalled in the syntax structure of the picture parameter set according to the pseudo code in the table shown in FIG. 20. The above buffer description updating information 323 and reference list description updating information 324 are signalled in the syntax structure of the slice header according to the pseudo code in the table shown in FIG. 21. It is to be noted that the same applies to the syntax structures of the SPU header and the picture header.

The following describes the syntax elements shown in FIG. 19.

The variables or lists BDDeltaPOC[i] and BDTemporalID[i] represent the ordered buffer elements BE[i] in the active buffer description BD.

The semantics of the syntax elements of the buffer description defining information bits_for_temporal_id, number_of_bds, number_of_bes_minus1[i], first_delta_poc_sign_flag[i], first_delta_poc_minus1[i], first_temporal_id[i], delta_poc_minus1[i][j], and temporal_id[i][j] shown in FIG. 19 is the same as in FIG. 12.

The semantics of the syntax elements of the reference list description defining information ref_pic_list_modification_flag_l0[i], ref_pic_list_modification_flag_l1[i], num_ref_idx_l0_active_minus1[i], num_ref_idx_l1_active_minus1[i], more_modification_flag, and be_idx_in_ref_pic_list shown in FIG. 19 is the same as in FIG. 16.

The following describes the syntax elements shown in FIG. 20.

The variables or lists BDDeltaPOC[bd_select] and BDTemporalID[bd_select] represent the ordered buffer elements BE[bd_select] in the selected buffer description BD[bd_select].

number_of_bd_updates specifies the number of times the syntax element bd_select is present in PPS. In other words, number_of_bd_updates represents the number of buffer descriptions to be modified by PPS.

bd_select specifies an index into the lists BDDeltaPOC and BDTemporalID representing the buffer description BD[bd_select] to be modified by PPS.

bd_modification_operation specifies a modification operation to be applied on the selected buffer description BD[bd_select]. bd_modification_operation equal to 0 specifies the end of the loop for modifying the buffer description BD[bd_select]. bd_modification_operation shall not be equal to 0 immediately following the syntax element bd_select.

In this embodiment, while bd_modification_operation equal to 1 specifies that a buffer element indicated by be_idx_in_bd_update in the buffer description BD[bd_select] is to be assigned a POC difference value to a current picture. This POC difference value replaces the existing stored POC difference value.

In alternative implementations, additional buffer description modification operations indicated by bd_modification_ operation may be defined. One example is the operation for assigning marking for a picture indicated by a buffer element as a short term or long term reference picture. Another example is the operation for defining new additional buffer descriptions. In this case, bd_select specifies an index to a plurality of new (non-existing) buffer descriptions and subsequent buffer description modification operations assign picture indicators to the buffer elements in the new buffer descriptions.

The syntax elements of the buffer description updating information be_idx_in_bd_update, delta_poc_sign_flag, delta_poc_minus1, and temporal_id shown in FIG. 20 are the same as in FIG. 13.

The syntax elements of the reference list description updating information ref_pic_list_modification_flag_l0[i], ref_pic_list_modification_flag_l1[i], num_ref_idx_l0_active_minus1[i], num_ref_idx_l1_active_minus1[i], more_modification_flag, and be_idx_in_ref_pic_list shown in FIG. 20 are the same as in FIG. 16.

The following describes the syntax elements shown in FIG. 21.

The variable PredictionType denotes the prediction type of the current slice (or SPU or picture). The details of PredictionType are as described above.

The variables or lists BDDeltaPOC[bd_select] and BDTemporalID[bd_select] represent the ordered buffer elements BE[bd_select] in the selected buffer description BD[bd_select]. The updated variables or lists BDDeltaPOC[bd_select] and BDTemporalID[bd_select] represent the active buffer description used in the process of coding or decoding the current slice.

The semantics of the syntax elements of the buffer description updating information bd_select, bd_modification_operation, be_idx_in_bd_update, delta_poc_sign_flag, delta_poc_minus1, and temporal_id shown in FIG. 21 is the same as in FIG. 13.

The semantics of the syntax elements of the reference list updating information ref_pic_list_modification_flag_l0, ref_pic_list_modification_flag_l1, num_ref_idx_l0_active_minus1, num_ref_idx_l1_active_minus1, more_modification_flag, and be_idx_in_ref_pic_list shown in FIG. 21 is the same as in FIG. 9.

It is to be noted that the syntax loop describing buffer description updating information and the reference list description updating information may be combined as one. In such implementations, the parameters for defining a modified reference list description immediately follows the parameters for modifying the corresponding buffer description. In the example in FIG. 18, the sequence of parameters becomes [number_of_bd_updates=2], [bd_select=2], [BD2 modify], [RLD2 define], [bd_select=3], [BD3 modify], [RLD3 define].

Syntax Diagram: Fifth Example

Figure 22:
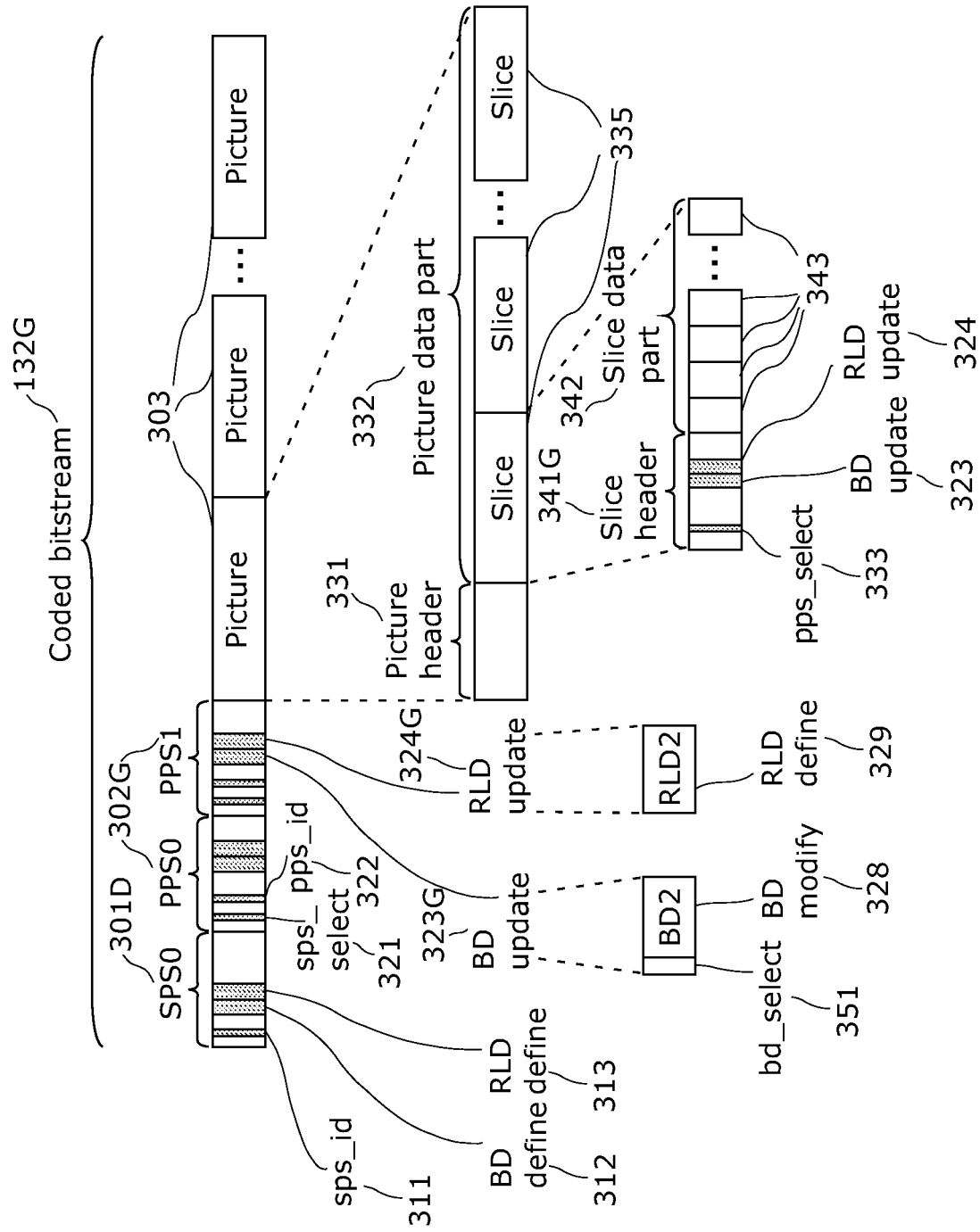
FIG. 22 shows a structure of a coded bitstream according to the fifth example of the first embodiment of the present disclosure.

FIG. 22 is a syntax diagram which shows the locations of the buffer description defining information and the reference list description defining information in a coded bitstream in the fifth example of this embodiment.

A coded bitstream 132G shown in FIG. 22 is different from the coded bitstream 132F shown in FIG. 18 in that buffer description updating information 323F and reference list description updating information 324F in PPS 302F replace the buffer description updating information 323G and the reference list description updating information 324G in the PPS 302G. Furthermore, a slice header 341G is different from the slice header 341D.

The buffer description updating information 323G includes buffer description selecting information 351 (e.g. bd_select=2) to specify one selected buffer description and a buffer description modifying flag 352 (e.g. modify_flag=1) indicating whether or not the selected buffer description and the reference list description corresponding to the selected buffer description are to be modified. When the buffer description modifying flag 352 indicates that modification is performed, the buffer description updating information 323G further includes the buffer description modifying information 328 (BD modify). Furthermore, when the buffer description modifying flag 352 indicates that modification is performed, the PPS 302G includes the reference list description updating information 324G including the reference list defining information 329 (RLD define) which defines the modified reference list. On the other hand, when the buffer description modifying flag 352 indicates that modification is not performed, the PPS302G does not include the buffer description modifying information 328 and the reference list defining information 329.

It is to be noted that the slice header 341G does not include the buffer description selecting information 334.

With the foregoing, the PPS 302G is identified by the PPS identifier 322 (e.g. pps_id=0) and is referred in the slice header 341G using the PPS selecting information 333 (e.g. pps_select=0). When the PPS 302G is referred, the selected buffer description and the associated reference list description are also referred. Slices (or sub-picture units) in the current picture are coded or decoded using ordered reference pictures according to the selected buffer description and the selected reference list description.

Here, in the reference list reordering information included in the reference list description updating information 324G, a reference list to be reordered is identified using its buffer element index within the buffer description, as in the case of the reference list description defining information 313 and the reference list description updating information 324.

The above buffer description defining information 312 and reference list description defining information 313 are signalled in the syntax structure of the sequence parameter set according to the pseudo code in the table shown in FIG. 23. The above buffer description updating information 323G and reference list description updating information 324G are signalled in the syntax structure of the picture parameter set according to the pseudo code in the table shown in FIG. 24. The above buffer description updating information 323 and reference list description updating information 324 are signalled in the syntax structure of the slice header according to the pseudo code in the table shown in FIG. 25. It is to be noted that the same applies to the syntax structures of the SPU header and the picture header.

The following describes the syntax elements shown in FIG. 23.

The variables or lists BDDeltaPOC[i] and BDTemporalID[i] represent the ordered buffer elements BE[i] in the active buffer description BD.

The semantics of the syntax elements of the buffer description defining information bits_for_temporal_id, number_of_bds, number_of_bes_minus1 [i], first_delta_poc_sig n_flag [i], first_delta_poc_minus1[i], first_temporal_id[i], delta_poc_minus1[i][j], and temporal_id[i][j] shown in FIG. 23 is the same as in FIG. 12.

The semantics of the syntax elements of the reference list description defining information ref_pic_list_modification_flag_l0[i], ref_pic_list_modification_flag_l1[i], num_ref_idx_l0_active_minus1[i], num_ref_idx_l1_active_minus1[i], more_modification_flag, and be_idx_in_ref_pic_list shown in FIG. 23 is the same as in FIG. 16.

The following describes the syntax elements shown in FIG. 24.

The variables or lists BDDeltaPOC[bd_select] and BDTemporalID[bd_select] represent the ordered buffer elements BE[bd_select] in the selected buffer description BD[bd_select].

The syntax elements of the buffer description updating information bd_select, bd_modification_operation, be_idx_in_bd_update, delta_poc_sign_flag, delta_poc_minus1, and temporal_id shown in FIG. 24 are the same as in FIG. 20. This buffer description updating information is different from that in FIG. in that it does not include the syntax element number_of_bd_updates, but includes one selected buffer description and reference list description only. These buffer description and reference list description are used in all the slices which refer to the PPS.

The syntax elements of the reference list description updating information ref_pic_list_modification_flag_l0, ref_pic_list_modification_flag_l1, num_ref_idx_l0_active_minus1, num_ref_idx_l1_active_minus1, more_modification_flag, and be_idx_in_ref_pic_list shown in FIG. 24 are the same as in FIG. 9.

The following describes the syntax elements shown in FIG. 25.

The variable PredictionType denotes the prediction type of the current slice (or SPU or picture). The details of PredictionType are as described above.

The variables or lists BDDeltaPOC[bd_select] and BDTemporalID[bd_select] represent the ordered buffer elements BE[bd_select] in the selected buffer description BD[bd_select]. The updated variables or lists BDDeltaPOC[bd_select] and BDTemporalID[bd_select] represent the active buffer description used in the process of coding or decoding the current slice.

The semantics of the syntax elements of the buffer description updating information bd_select, bd_modification_operation, be_idx_in_bd_update, delta_poc_sign_flag, delta_poc_minus1, and temporal_id shown in FIG. 25 is the same as in FIG. 13. Here, bd_select is not included in the slice header, but the buffer description and its corresponding reference list description in the PPS which is referred to from the slice header are selected.

The semantics of the syntax elements of the reference list updating information ref_pic_list_modification_flag_l0, ref_pic_list_modification_flag_l1, num_ref_idx_l0_active_minus1, num_ref_idx_l1_active_minus1, more_modification_flag, and be_idx_in_ref_pic_list shown in FIG. 25 is the same as in FIG. 9.

[Effect of Coding Method]

With the foregoing, in the image coding apparatus 100 according to this embodiment, a reference list to be reordered is identified using its buffer element index within the buffer description. This way, a picture to be reordered is specified using the buffer element index which is also used in the buffer description. Thus, the redundancy and complexity of the reference list reordering information are reduced, with the result that the image coding apparatus and the image decoding apparatus involve a reduced amount of calculation and provide improved coding efficiency.

Although the above has explained an example in which, in the reference list reordering information, a reference list to be reordered is identified using its buffer element index within the buffer description, the image coding apparatus or the image decoding apparatus may specify the reference picture to be reordered, using an index which is used in other processing. Here, this index is, for example, one of the serial numbers assigned to a plurality of pictures and starting from 0. Even in this case, the redundancy and complexity of the reference list reordering information are reduced, with the result that the image coding apparatus and the image decoding apparatus involve a reduced amount of calculation.

For example, the above index may be a reference index in a default reference list.

[Decoding Apparatus]

Figure 26:
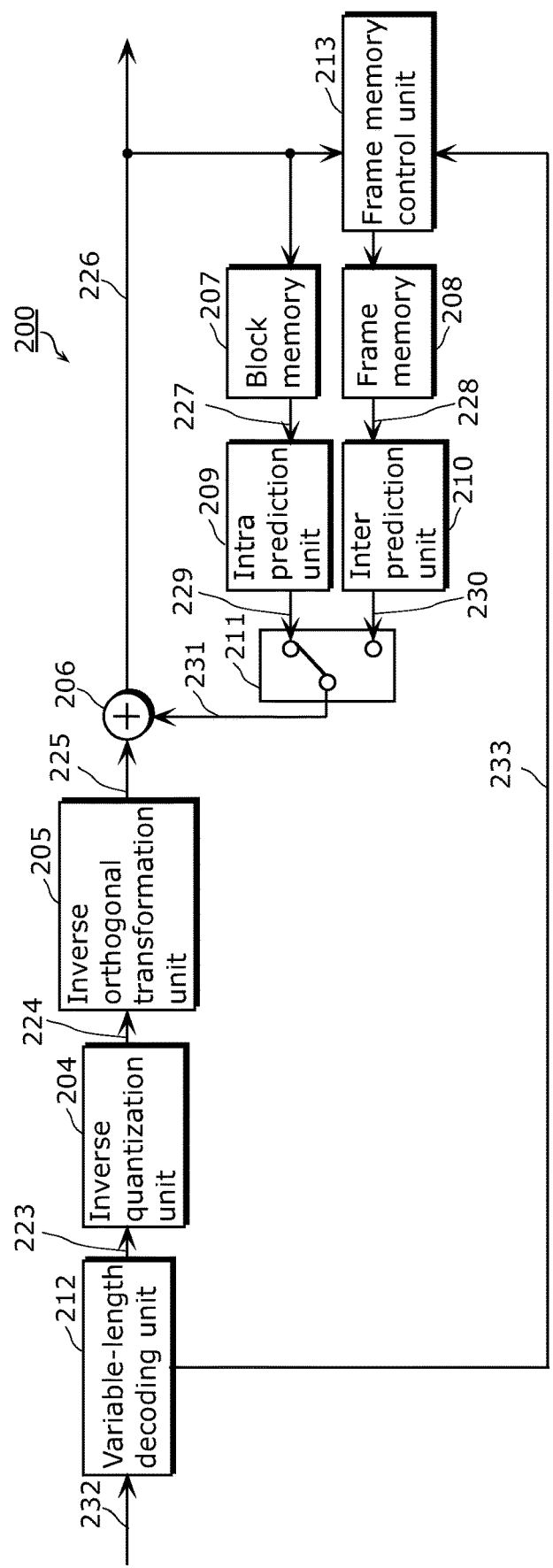
FIG. 26 is a block diagram of an image decoding apparatus according to the first embodiment of the present disclosure.

FIG. 26 is a block diagram which shows a structure of an image decoding apparatus 200 according to this embodiment.

The image decoding apparatus 200 shown in FIG. 26 decodes a coded bitstream 232 on a block-by-block basis, thereby generating decoded image data 226. This image decoding apparatus 200 includes a variable-length decoding unit 212, an inverse quantization unit 204, an inverse orthogonal transformation unit 205, an adder 206, a block memory 207, a frame memory 208, an intra prediction unit 209, an inter prediction unit 210, a picture type determination unit 211, and a frame memory control unit 213.

The coded bitstream 232 is, for example, the coded bitstream 132 generated by the above image coding apparatus 100.

The variable-length decoding unit 212 performs variable-length decoding (entropy decoding) on the coded bitstream 232 to generate quantized values 223 and frame memory control information 233. Here, the frame memory control information 233 corresponds to the above frame memory control information 133.

The inverse quantization unit 204 inversely quantizes the quantized values 223, thereby generating frequency coefficients 224. The inverse orthogonal transformation unit 205 performs inverse frequency transform on the frequency coefficients 224, thereby generating prediction error data 225. The adder 206 adds the prediction error data 225 and the prediction image data 231, thereby generating the decoded image data 226. The decoded image data 226 is output from the image decoding apparatus 200 and, for example, is displayed.

The block memory 207 holds the decoded image data 226 as decoded image data 227 on a block-by-block basis. The frame memory 208 holds the decoded image data 226 as decoded image data 228 on a frame-by-frame basis.

The intra prediction unit 209 performs intra prediction to generate prediction image data 229 of a current block to be decoded. Specifically, the intra prediction unit 209 searches within the decoded image data 227 stored in the block memory 207, and estimates an image area which is most similar to the decoded image data 226.

The inter prediction unit 210 performs inter prediction using the per-frame decoded image data 228 stored in the frame memory 208, to generate prediction image data 230 of the current block.

The picture type determination unit 211 selects one of the prediction image data 229 and the prediction image data 230 and outputs the selected data as the prediction image data 231.

The frame memory control unit 213 manages the decoded image data 228 stored in the frame memory 208. Specifically, the frame memory control unit 213 performs memory management processes according to the frame memory control information 233. Specifically, the frame memory control unit 213 determines whether the decoded image data 128 is kept in the frame memory 208 or removed from the frame memory 208. Furthermore, the frame memory control unit 213 constructs reference lists to be used by the inter prediction unit 210.

[Decoding Process]

Next, a description is given as to an image decoding method which is performed by the image decoding apparatus 200 as mentioned above.

Figure 27:
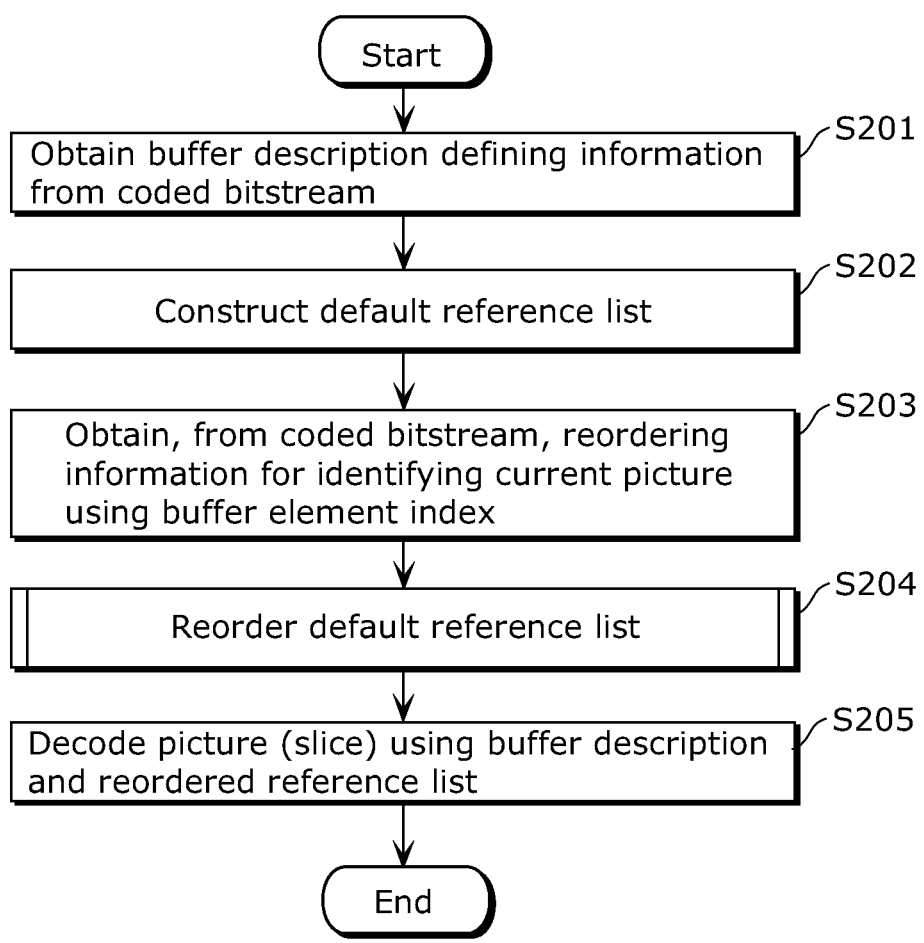
FIG. 27 is a flowchart of an image decoding method according to the first embodiment of the present disclosure.
Figure 28:
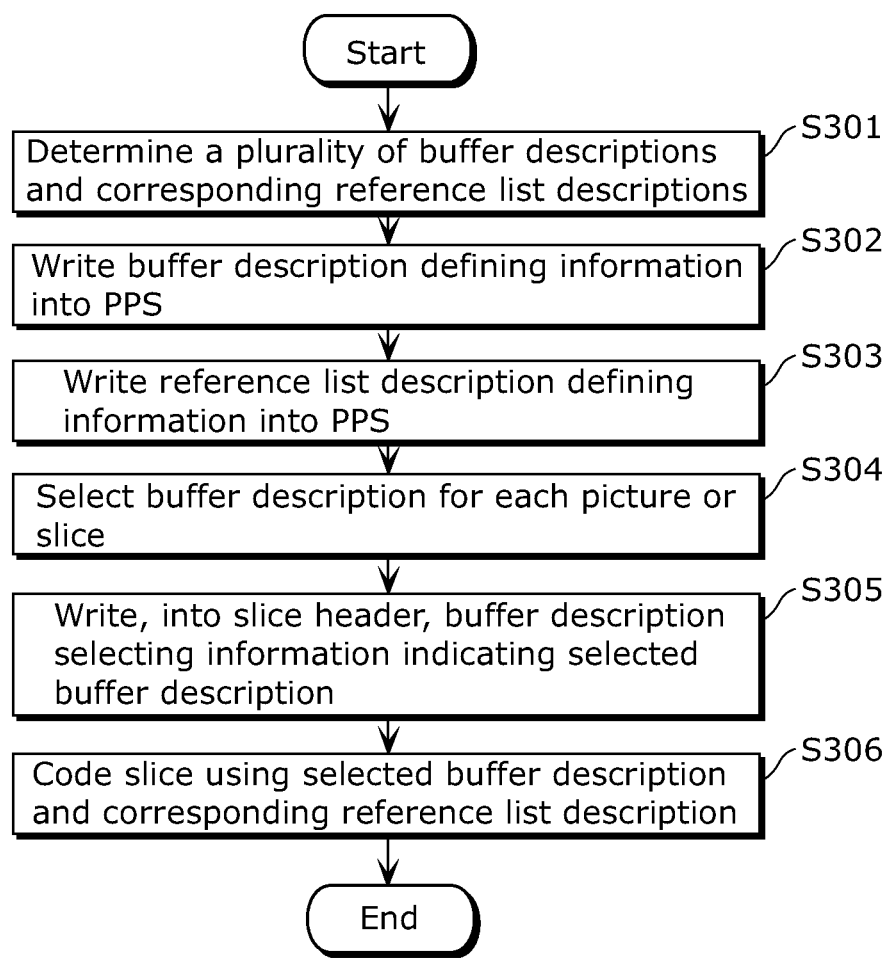
FIG. 28 is a flowchart of an image coding method according to the second embodiment of the present disclosure.

FIG. 27 is a flowchart of the image decoding method according to this embodiment.

Firstly, the image decoding apparatus 200 obtains, from the coded bitstream 232, buffer description defining information which defines buffer descriptions (S201).

Next, the image decoding apparatus 200 constructs a default reference list including all the reference pictures which are indicated in the buffer descriptions (S202).

Next, the image decoding apparatus 200 obtains, from the coded bitstream 232, reference list reordering information which indicates the details of reordering to be performed on the default reference list (S203).

Next, the image decoding apparatus 200 reorders, according to the obtained reference list reordering information, the pictures included in the default reference list (S204).

Next, the image decoding apparatus 200 decodes a current picture or slice using the buffer description and the reference list resulting from the above reordering (S205).

Here, in the reference list reordering information, a picture to be reordered is specified using an index which is used in other processing in the image coding method. Specifically, this index is a buffer element index within the buffer description.

The details of the reordering in Steps S202 and S204 are the same or alike as those in Steps S102 and S103 in the above-described image coding apparatus 100, for example.

[Effect of Decoding Method]

With the foregoing, the image decoding apparatus 200 according to this embodiment is capable of decoding a coded bitstream which is coded in the form of improved coding efficiency and reduced complexity of reference list descriptions.

Second Embodiment

In the image coding method according to this embodiment, the buffer description defining information and the reference list description defining information are written into the picture parameter set shared by a plurality of pictures. This allows a reduction in redundant information and thereby allows an improvement in coding efficiency in the image coding method as compared to the case where the buffer description defining information and the reference list description defining information are written into a slice header or the like.

[Coding Apparatus]

The block diagram of the image coding apparatus 100 according to this embodiment is the same or alike as that shown in FIG. 3 and therefore is not explained.

[Coding Process]

The following describes an image coding method which is performed by the image coding apparatus 100 according to this embodiment.

Firstly, the image coding apparatus 100 determines a plurality of buffer descriptions and the reference list descriptions corresponding to the plurality of buffer descriptions which are to be used over a plurality of pictures in a video sequence (S301).

Next, the image coding apparatus 100 writes, into PPS in the coded bitstream 132, the buffer description defining information which defines the determined buffer descriptions (S302).

Next, the image coding apparatus 100 writes, into PPS, the reference list description defining information for defining the plurality of reference list descriptions (S303).

Next, the image coding apparatus 100 selects, for each picture, one of the buffer descriptions which is to be used to code the picture (S304). It is to be noted that the image coding apparatus 100 may select one buffer description for each slice.

Next, the image coding apparatus 100 writes the buffer description selecting information which specifies the selected buffer description into a slice header corresponding to the current slice and included in the coded bitstream 132 (S305). In addition, one reference list description corresponding to the selected buffer description is selected.

Finally, the image coding apparatus 100 codes the current slice using the buffer description selected for the current slice and the reference list description corresponding to the buffer description (S306). Furthermore, the image coding apparatus 100 generates the coded bitstream 132 which includes the resulting coded data.

Although the above has explained an example in which the buffer description selecting information is written into a slice header, the buffer description selecting information may be written into a picture header or APS.

Furthermore, although the above has explained an example in which the buffer description defining information and the reference list description defining information are written into PPS, the buffer description defining information and the reference list description defining information are written into SPS or a slice header.

It is also possible that, as described in the above first embodiment, the reference list reordering information included in the reference list description defining information is specified using a buffer element index.

[Syntax Diagram]

The syntax diagram of the coded bitstream according to this embodiment is the same or alike as that shown in FIG. 15, for example.

[Effect of Coding Method]

With the foregoing, the image coding apparatus 100 according to this embodiment is capable of preventing redundant repetition of the same parameters for constructing the reference lists in the coded bitstream. This allows the image coding apparatus 100 to improve the coding efficiency of the parameters describing reference list construction. Furthermore, the image coding apparatus 100 is capable of achieving design harmonization of reference list description data units with the buffer description data units and with the hierarchically structured signaling units of a coded bitstream.

[Decoding Apparatus]

The block diagram of the image decoding apparatus 200 according to this embodiment is the same or alike as that shown in FIG. 26 and therefore is not explained.

[Decoding Process]

Next, a description is given as to an image decoding method which is performed by the image decoding apparatus 200 as mentioned above.

Figure 29:
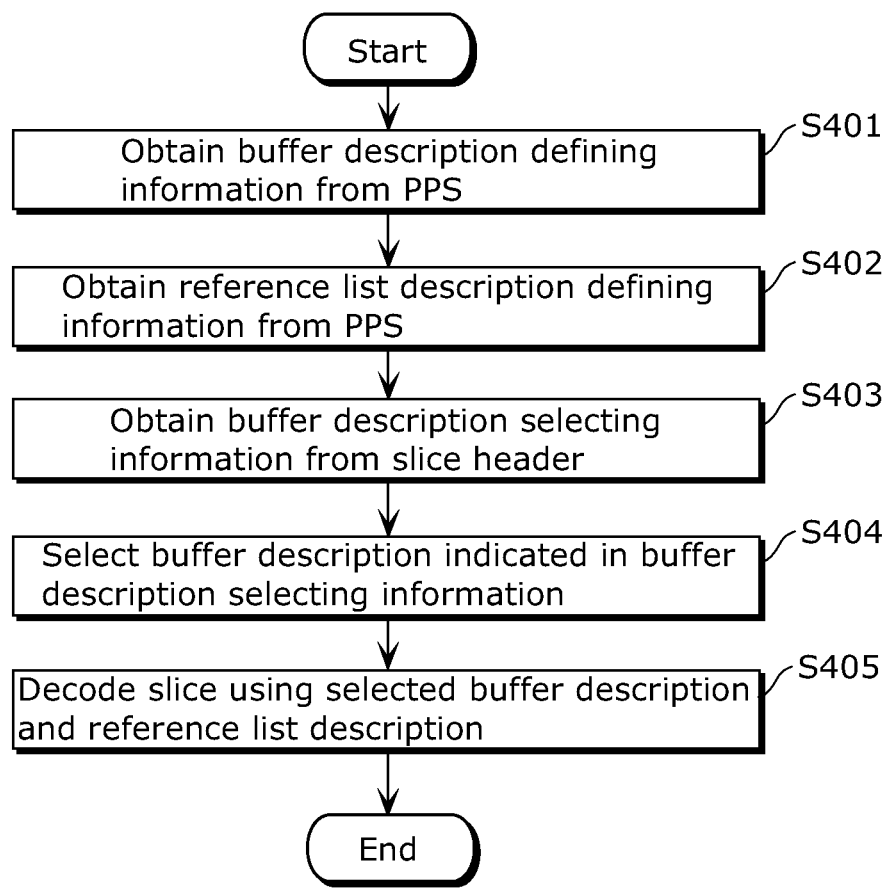
FIG. 29 is a flowchart of an image decoding method according to the second embodiment of the present disclosure.

FIG. 29 is a flowchart of the image decoding method according to this embodiment.

Firstly, the image decoding apparatus 200 obtains, from PPS in the coded bitstream 232, buffer description defining information which defines a plurality of buffer descriptions (S401). Next, the image decoding apparatus 200 obtains, from the above PPS, reference list description defining information which defines a plurality of reference list descriptions (S402). Here, the reference list descriptions correspond one-to-one with the buffer descriptions.

Next, the image decoding apparatus 200 obtains buffer description selecting information from a slice header in the coded bitstream 232 (S403). For the current slice, the image decoding apparatus 200 then selects, out of the buffer descriptions, one buffer description specified in the buffer description selecting information (S404). Furthermore, the image decoding apparatus 200 selects one reference list description corresponding to the selected buffer description.

Finally, the image decoding apparatus 200 decodes the current slice using the selected buffer description and the selected reference list description (S405).

Although the above has explained an example in which the buffer description selecting information is included in a slice header, the buffer description selecting information may be included in a picture header or APS.

[Effect of Decoding Method]

With the foregoing, the image decoding apparatus 200 according to this embodiment is capable of decoding a coded bitstream which is coded in the form of improved coding efficiency and harmonized design of reference list description data.

Although the image coding apparatus and the image decoding apparatus according to one or more aspects of the inventive concepts have been described above, the herein disclosed subject matter is to be considered descriptive and illustrative only.

For example, although the above describes an example in which SPS is included in the coded bitstream which includes slice data and the like, SPS may be transmitted from the image coding apparatus to the image decoding apparatus separately from the coded bitstream which includes the slice data and the like.

Respective processing units included in the image coding apparatus and the image decoding apparatus according to each of the above embodiments are typically implemented as a large scale integration (LSI) that is an integrated circuit. These processing units may be each provided on a single chip, and part or all of them may be formed into a single chip.

Moreover, ways to achieve integration are not limited to the LSI, and a special circuit or a general purpose processor and so forth can also achieve the integration. Field Programmable Gate Array (FPGA) that can be programmed after manufacturing LSIs, or a reconfigurable processor that allows re-configuration of the connection or configuration of an LSI can be used for the same purpose.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

Furthermore, the inventive concept may be implemented as the above software program and may also be implemented as a non-transitory computer-readable recording medium on which such a program is recorded. In addition, it goes without saying that such a program may be distributed via a communication network such as the Internet.

The numerals herein are all given to specifically illustrate the inventive concept and therefore do not limit it.

The segmentation of the functional blocks in each block diagram is an example, and some of the functional blocks may be implemented as one functional block while one functional block may be divided into plural parts, or part of the function of one functional block may be shifted to another function block. Furthermore, the functions of a plurality of functional blocks which have similar functions may be processed in parallel or in time-sliced fashion by single hardware or software.

The processing order of the steps included in the above image coding or decoding method are given to specifically illustrate the inventive concept and therefore may be any other order. Part of the above steps may be performed at the same time as (in parallel with) another step.

Third Embodiment

The processing described in each of embodiments can be simply implemented in an independent computer system, by recording, in a recording medium, a program for implementing the configurations of the moving picture coding method and the moving picture decoding method described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method and the moving picture decoding method described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

FIG. 29 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 29, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software.

Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 30:
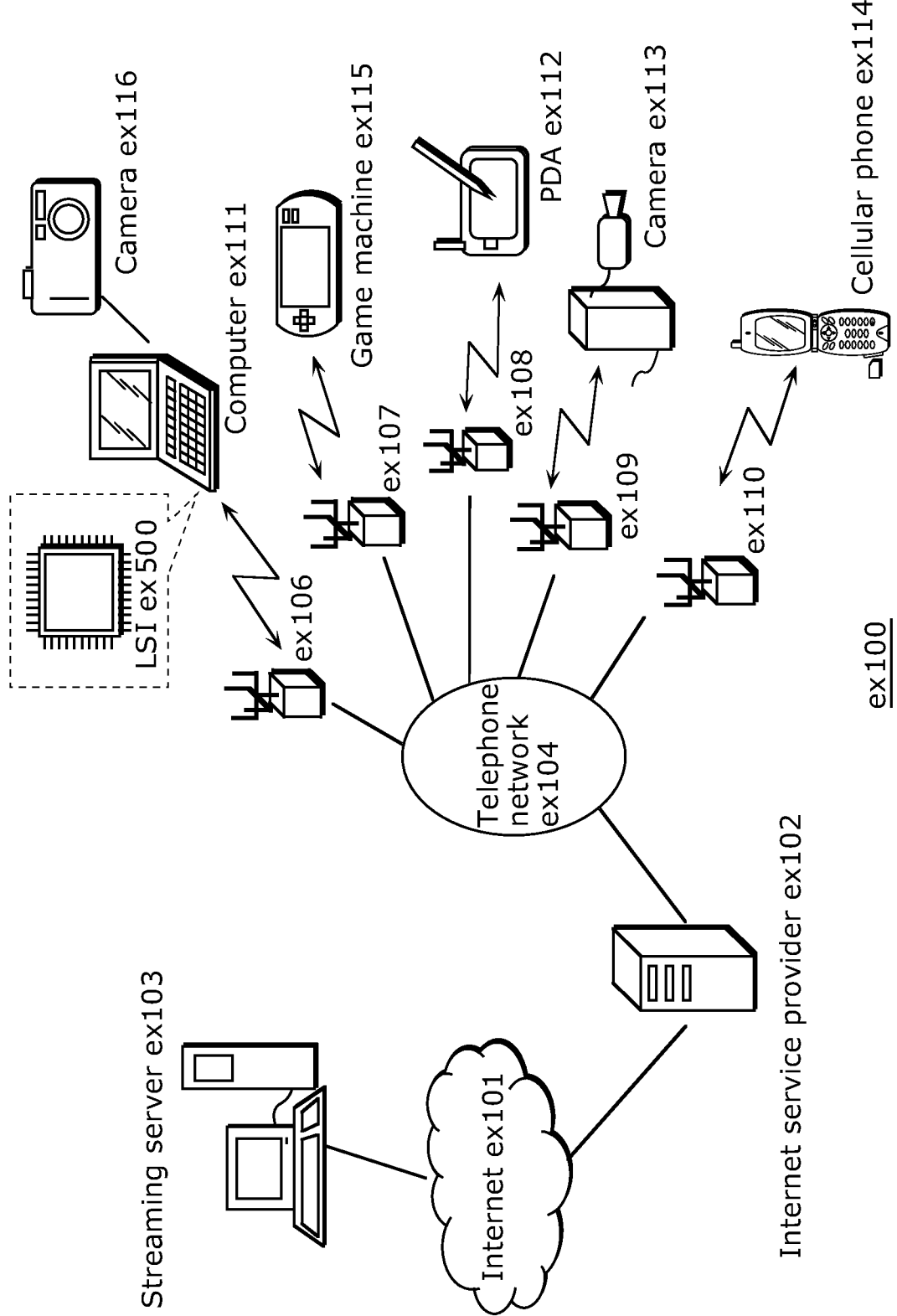
FIG. 30 shows an overall configuration of a content providing system for implementing content distribution services.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 30. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 31:
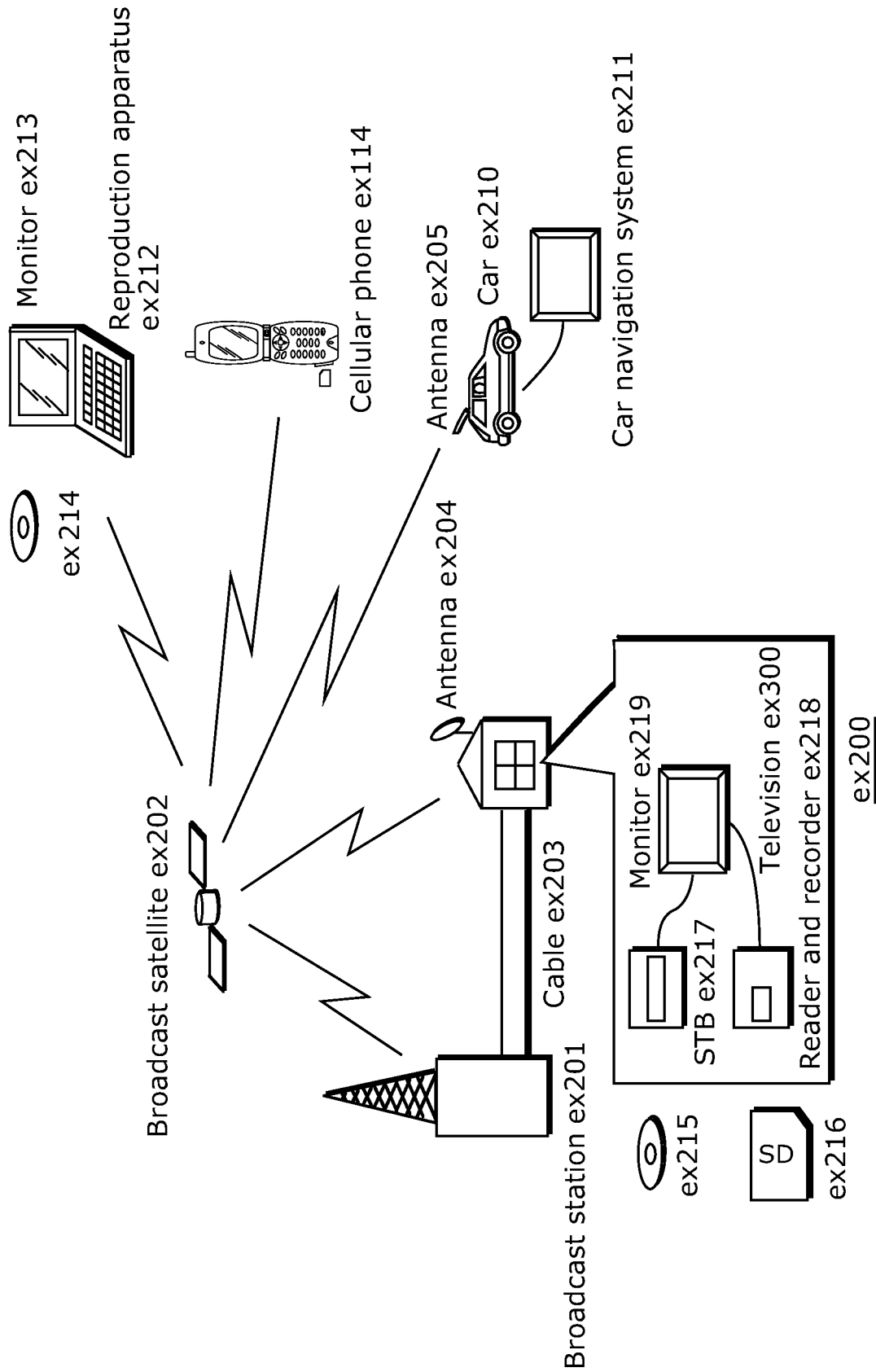
FIG. 31 shows an overall configuration of a digital broadcasting system.

FIG. 31 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 32:
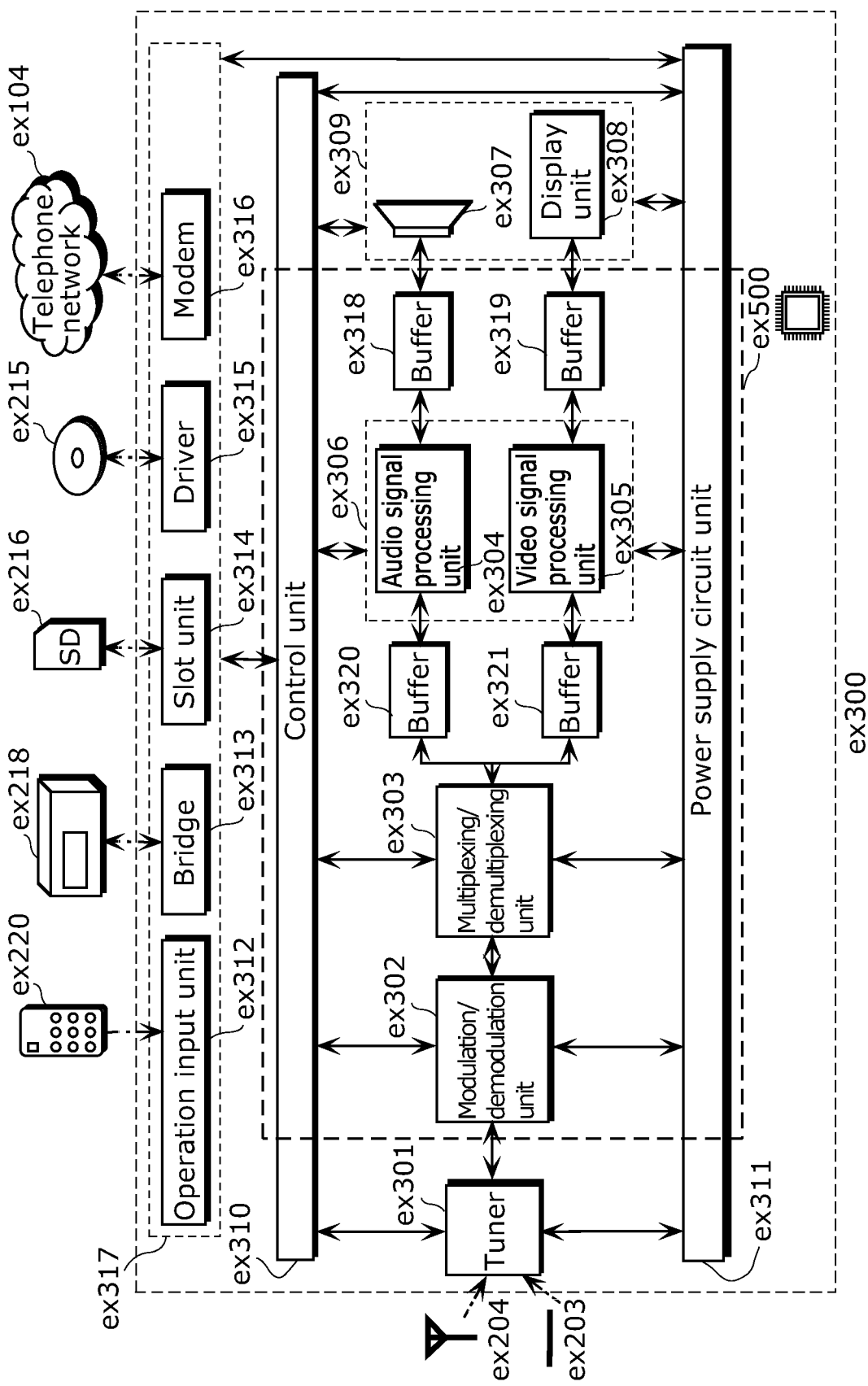
FIG. 32 shows a block diagram illustrating an example of a configuration of a television.

As an example, FIG. 32 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 33:
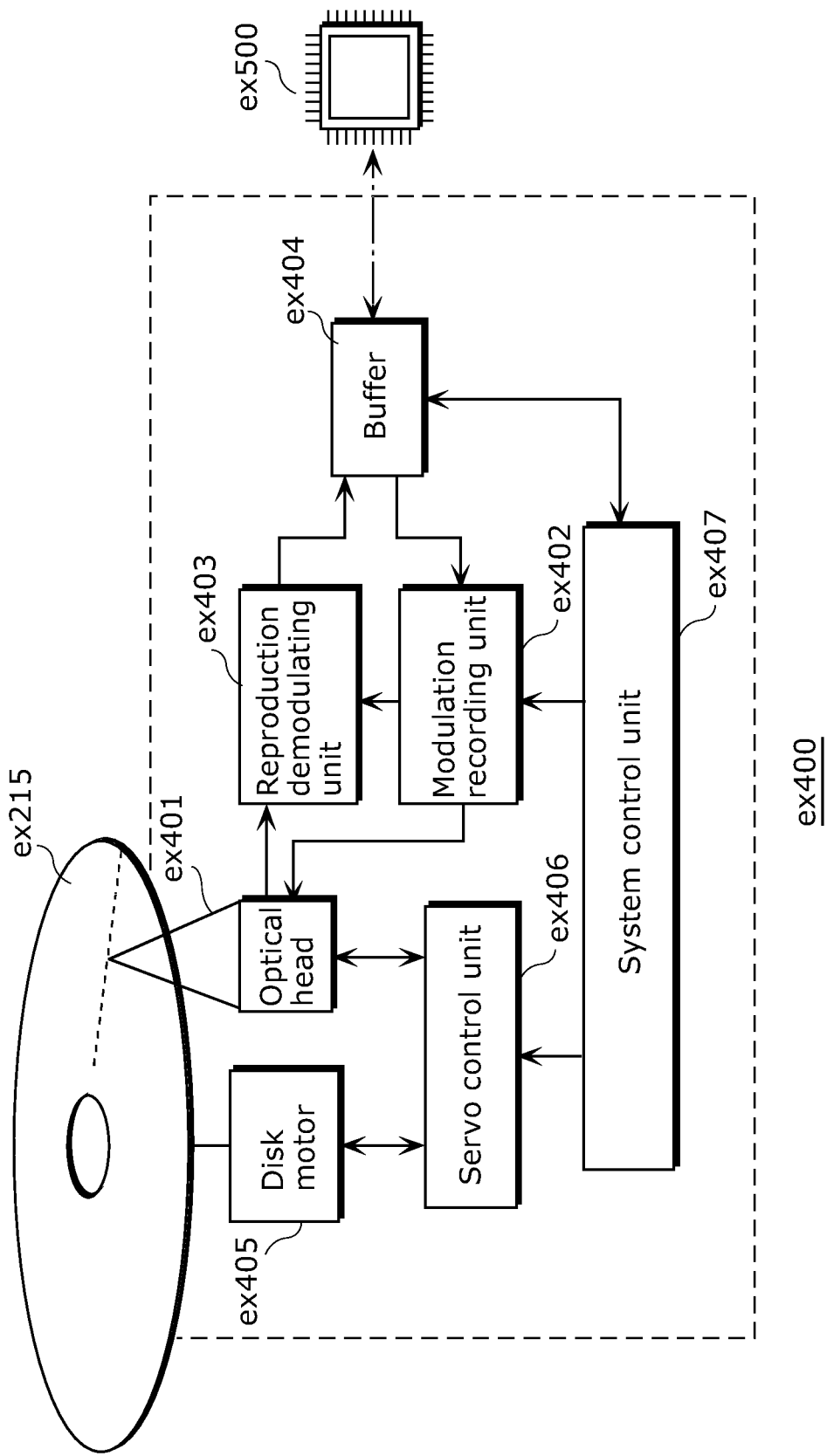
FIG. 33 shows a block diagram illustrating an example of a configuration of an information reproducing/recording unit that reads and writes information from and on a recording medium that is an optical disk.

FIG. 33 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 31. The same will be true for the configuration of the computer ex111, the cellular phone ex114, and others.

Figure 34:
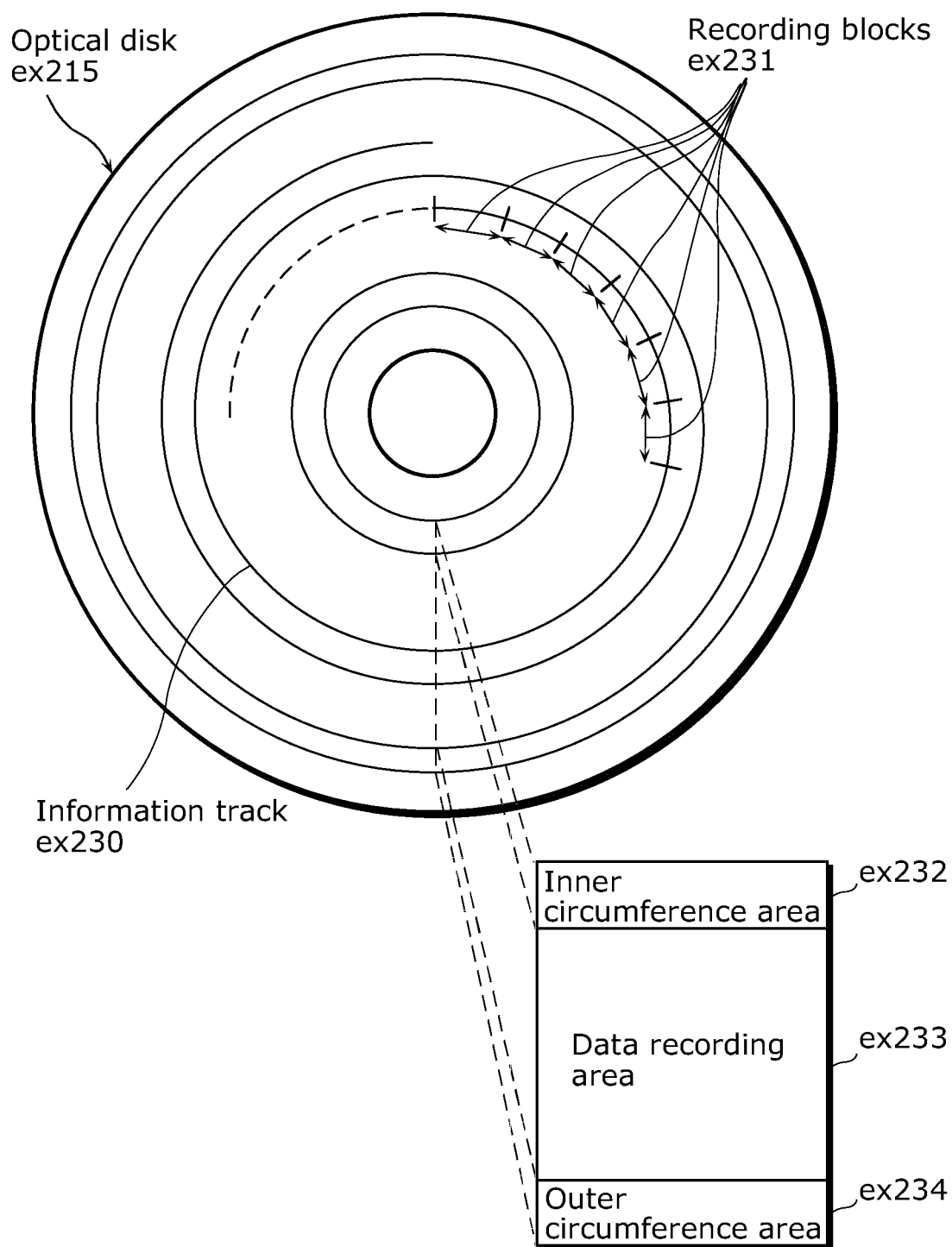
FIG. 34 shows an example of a configuration of a recording medium that is an optical disk.

FIG. 34A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 34B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the inventive concept is not limited to each of embodiments, and various modifications and revisions can be made in any of the embodiments in the present disclosure.

Fourth Embodiment

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 35A:
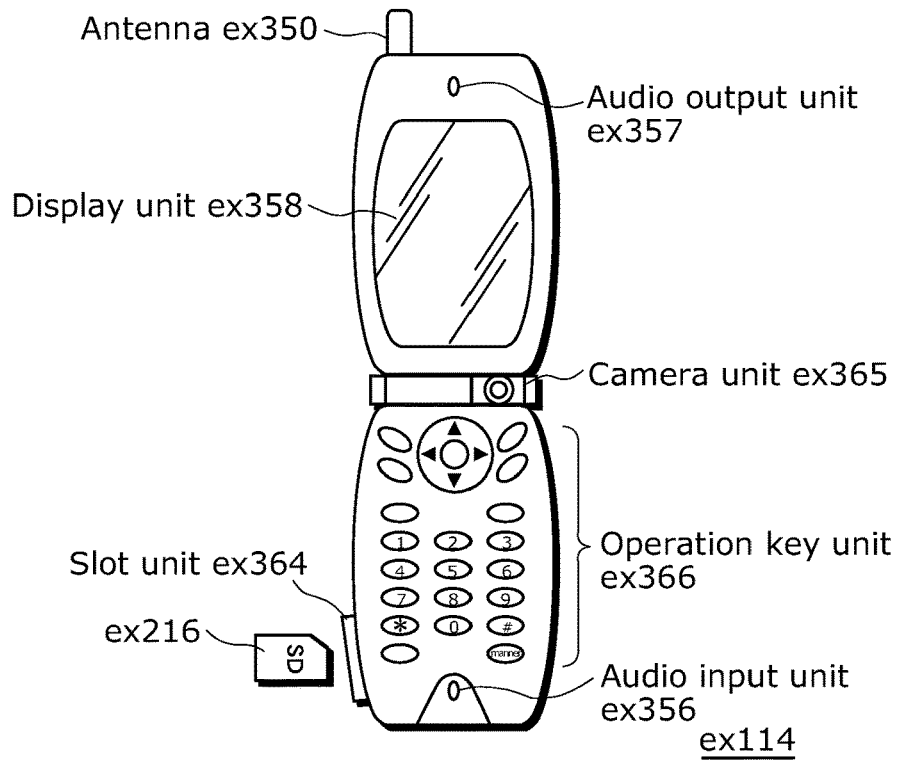
FIG. 35A shows an example of a cellular phone.
Figure 35B:
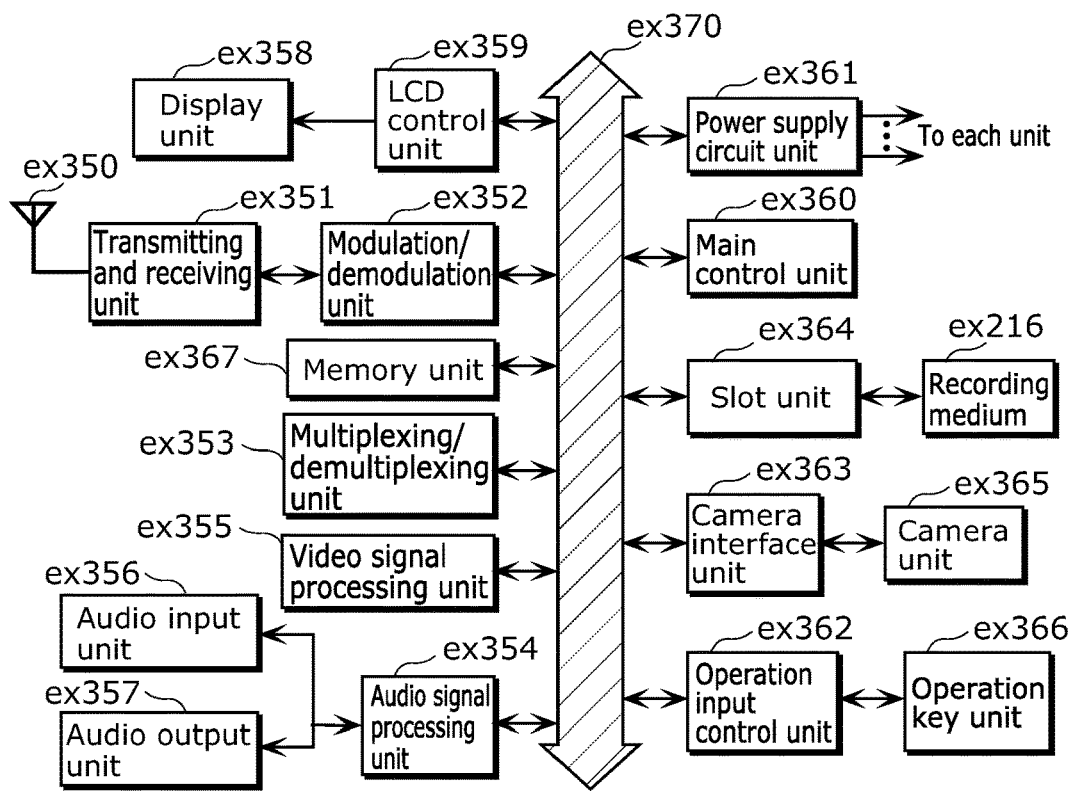
FIG. 35B is a block diagram showing an example of a configuration of a cellular phone.

FIG. 35 illustrates a structure of the multiplexed data. As illustrated in FIG. 35, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

FIG. 36 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 37:
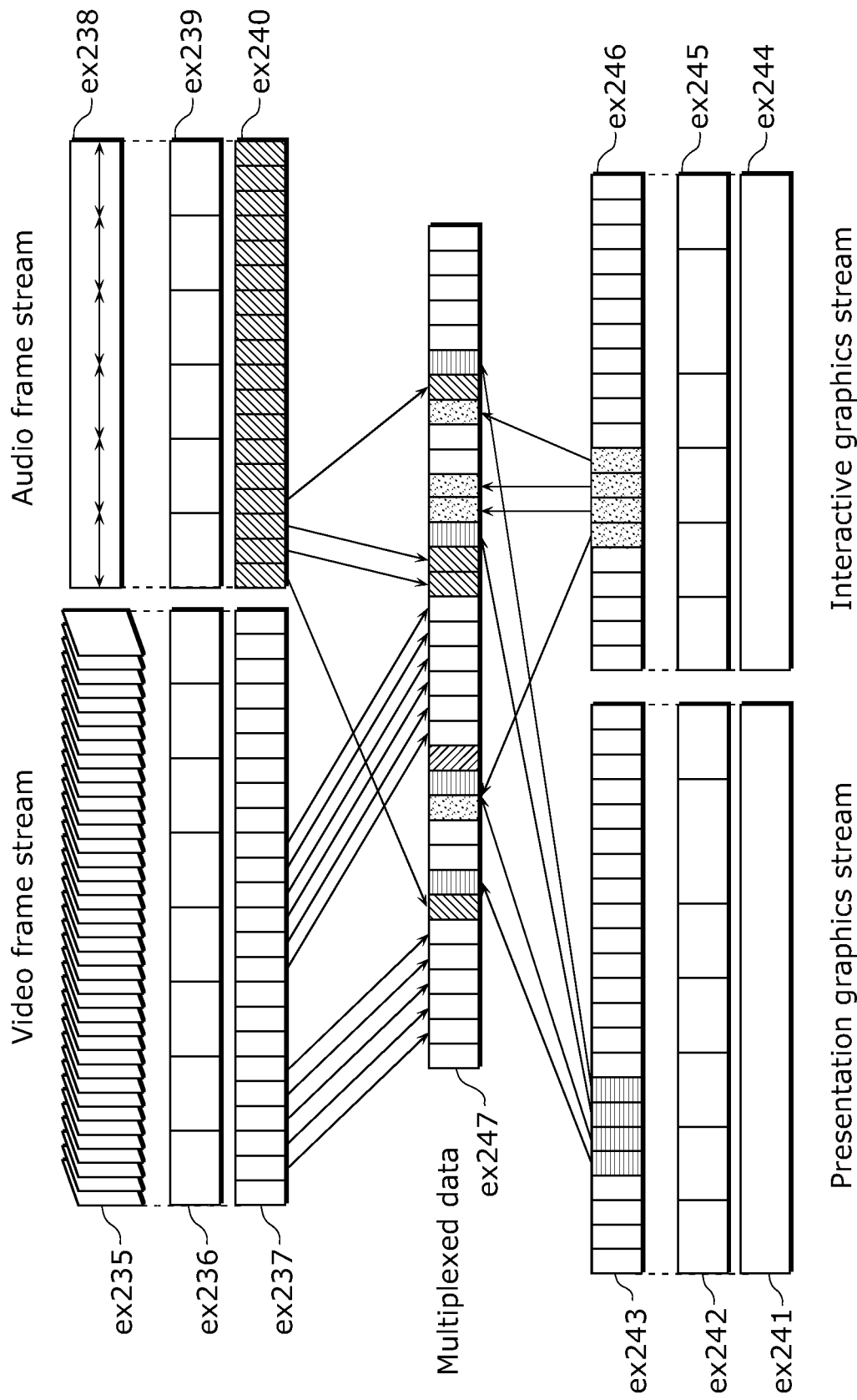
FIG. 37 schematically shows how each stream is multiplexed in multiplexed data.

FIG. 37 illustrates how a video stream is stored in a stream of PES packets in more detail. The first bar in FIG. 37 shows a video frame stream in a video stream. The second bar shows the stream of PES packets. As indicated by arrows denoted as yy1, yy2, yy3, and yy4 in FIG. 37, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 38:
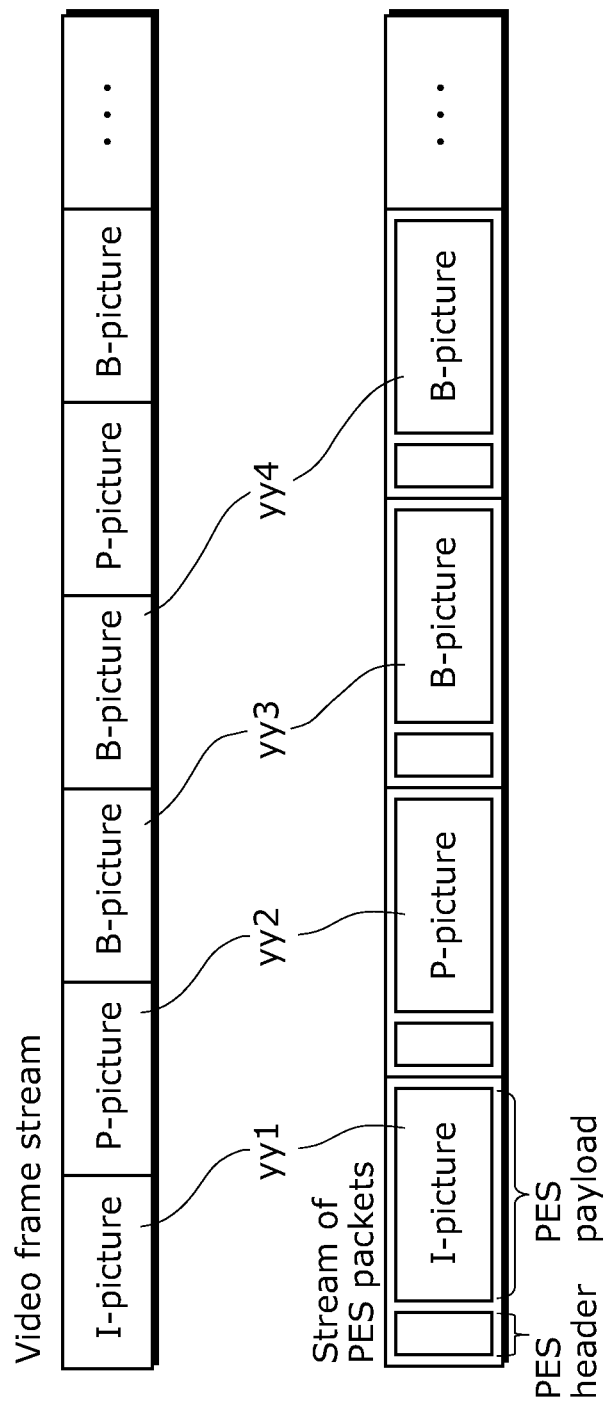
FIG. 38 shows how a video stream is stored in a stream of PES packets in more detail.

FIG. 38 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 38. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 39 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 40:
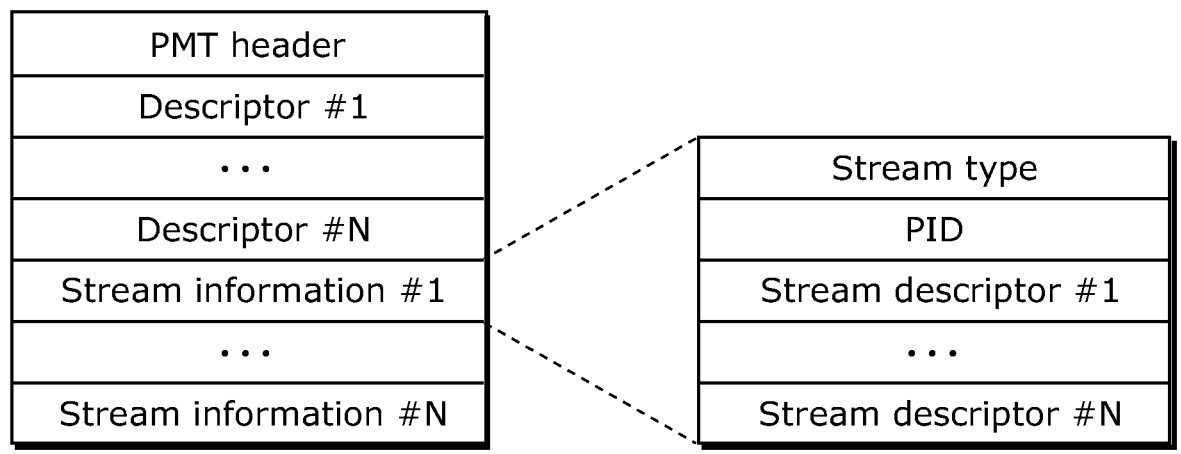
FIG. 40 shows a data structure of a PMT.

Each of the multiplexed data information files is management information of the multiplexed data as shown in FIG. 40. The multiplexed data information files are in one to one correspondence with the multiplexed data, and each of the files includes multiplexed data information, stream attribute information, and an entry map.

As illustrated in FIG. 40, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 41:
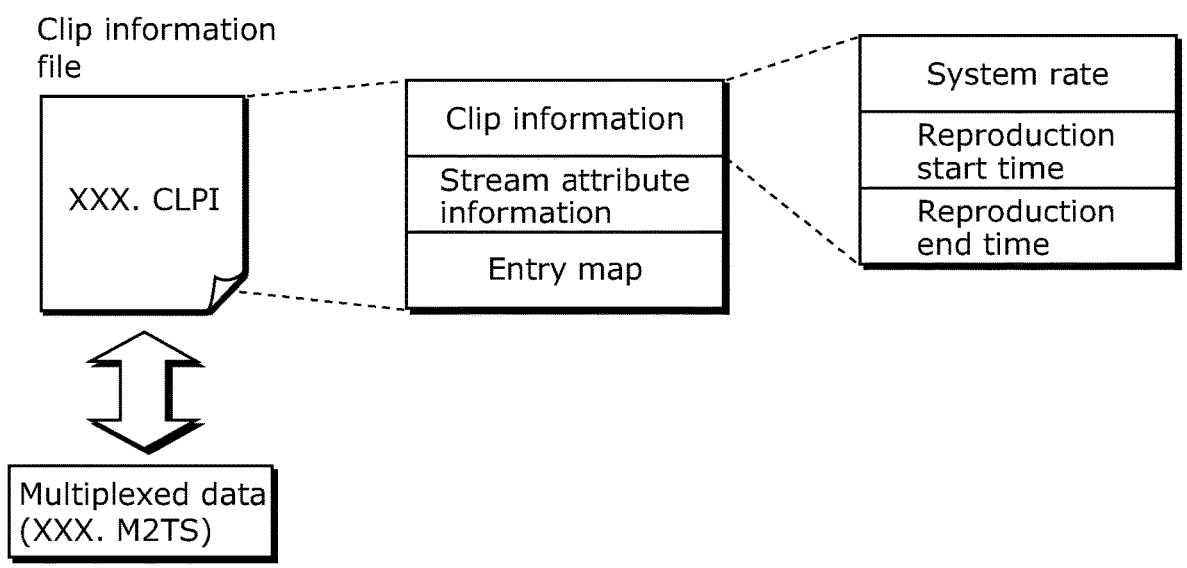
FIG. 41 shows an internal structure of multiplexed data information.

As shown in FIG. 41, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 42:
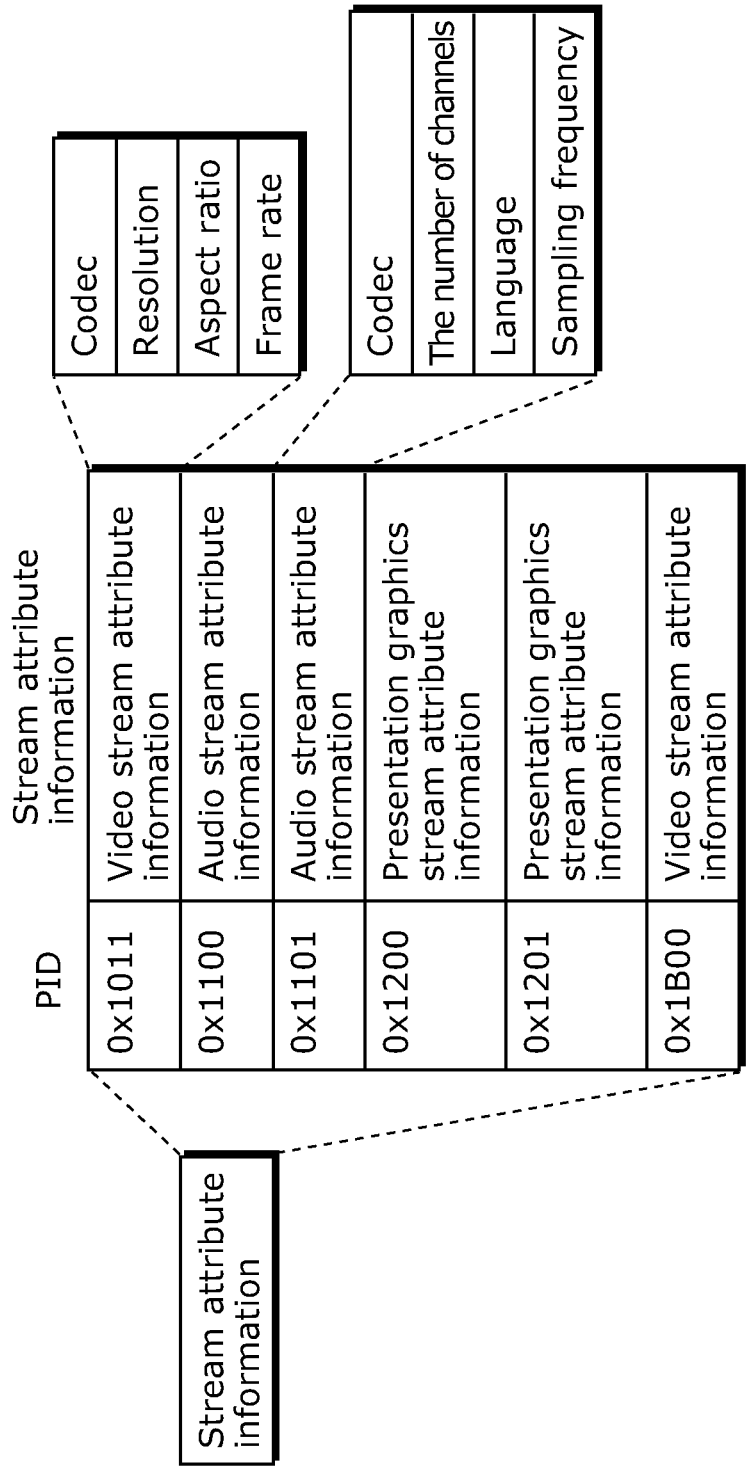
FIG. 42 shows an internal structure of stream attribute information.

Furthermore, FIG. 42 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Fifth Embodiment

Figure 43:
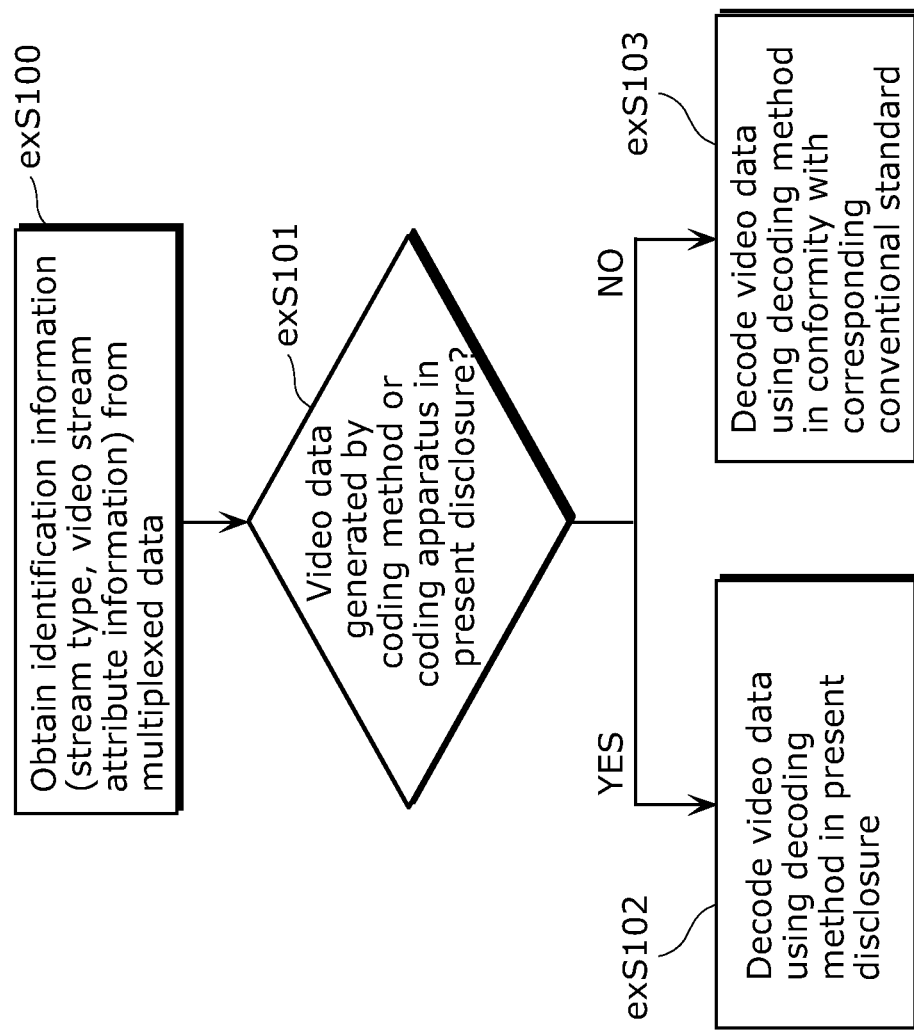
FIG. 43 shows steps for identifying video data.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 43 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Sixth Embodiment

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 44:
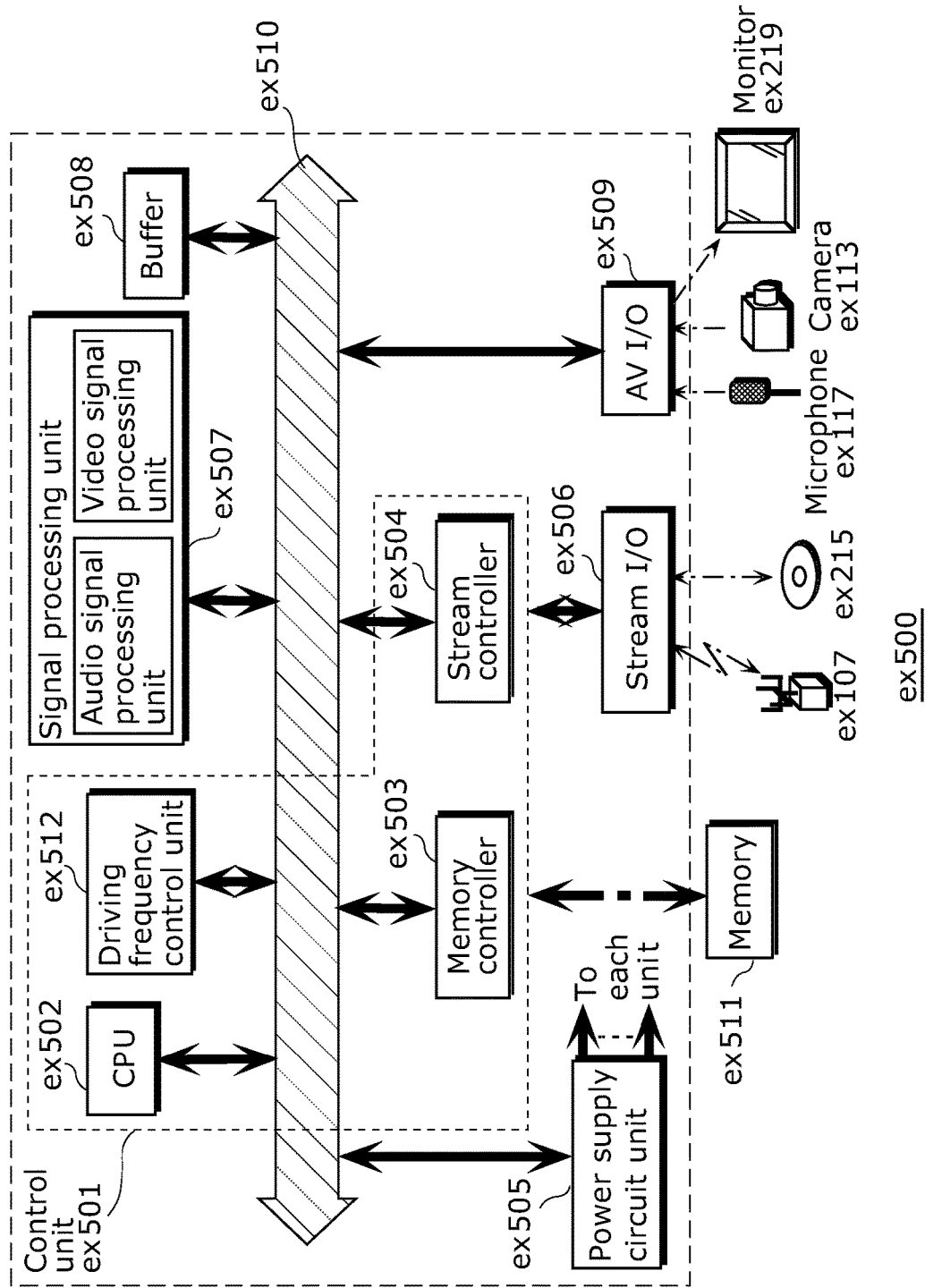
FIG. 44 is a block diagram showing an example of a configuration of an integrated circuit for implementing the moving picture coding method and the moving picture decoding method according to each of embodiments.

In order to solve the problem, the moving picture decoding apparatus, such as the television ex300 and the LSI ex500 is configured to determine to which standard the video data conforms, and switch between the driving frequencies according to the determined standard. FIG. 44 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figure 46:
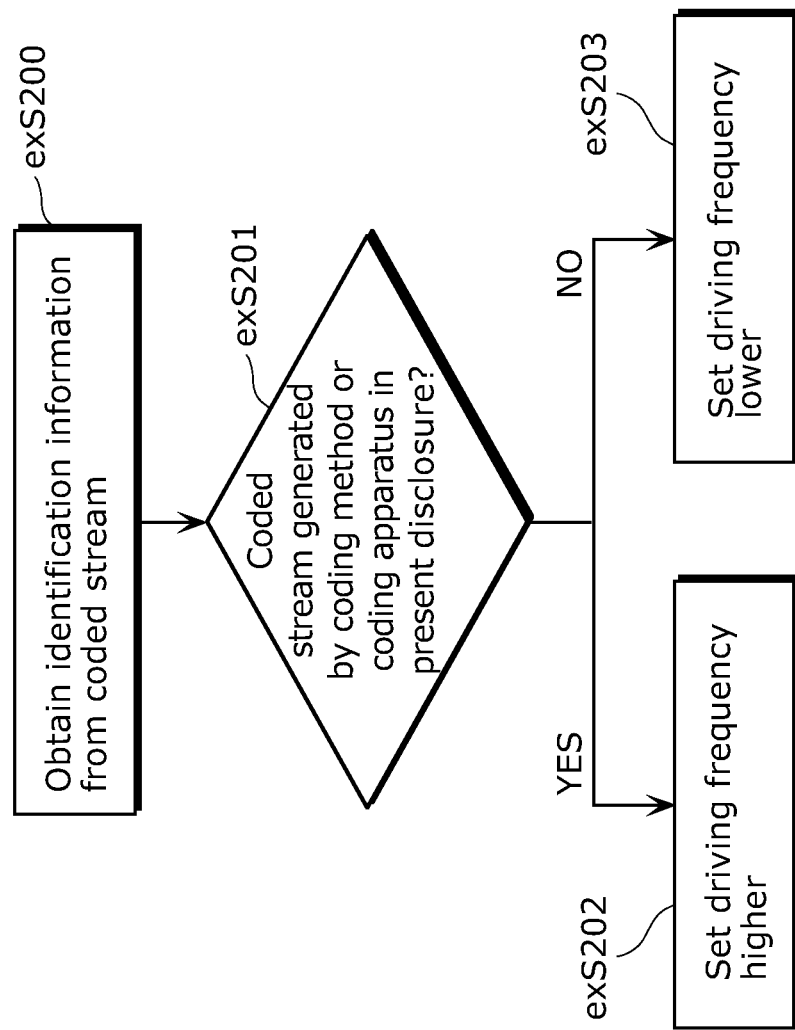
FIG. 46 shows steps for identifying video data and switching between driving frequencies.
Figure 48A:
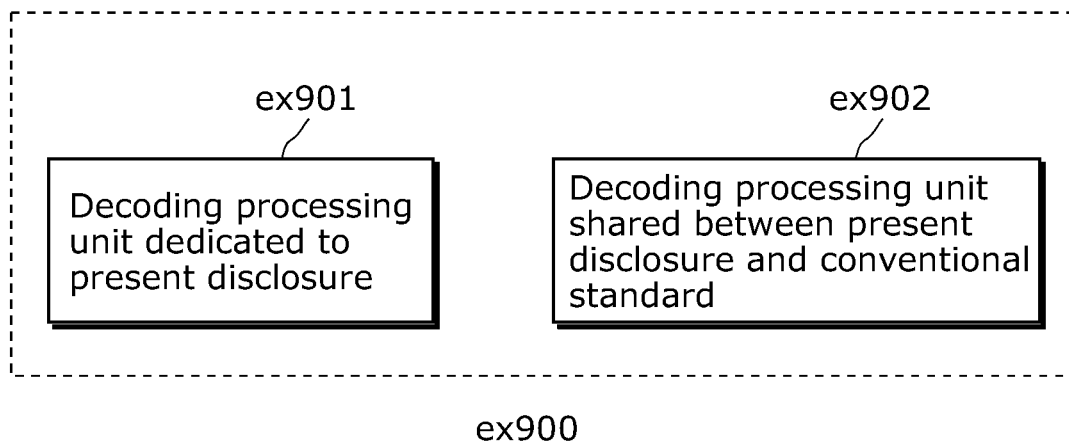
FIG. 48A is a diagram showing an example of a configuration for sharing a module of a signal processing unit.
Figure 48B:
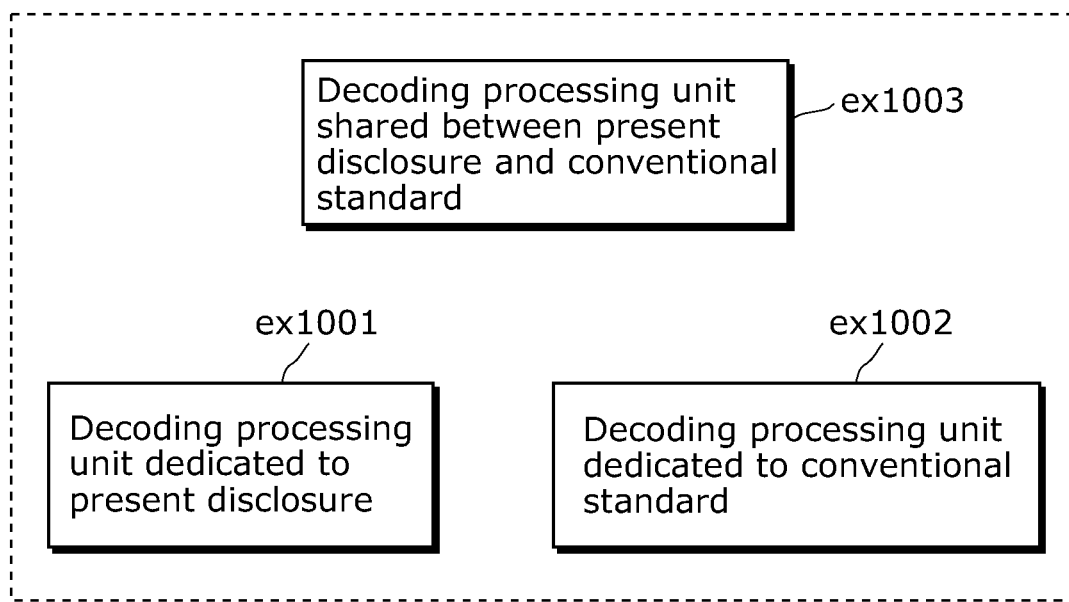
FIG. 48B is a diagram showing another example of a configuration for sharing a module of the signal processing unit.

More specifically, the driving frequency switching unit ex803 includes the CPU ex502 and the driving frequency control unit ex512 in FIG. 43. Here, each of the decoding processing unit ex801 that executes the moving picture decoding method described in each of embodiments and the decoding processing unit ex802 that conforms to the conventional standard corresponds to the signal processing unit ex507 in FIG. 43. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in the fourth embodiment is probably used for identifying the video data. The identification information is not limited to the one described in the fourth embodiment but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 46. The driving frequency can be selected by storing the look-up table in the buffer ex508 and in an internal memory of an LSI, and with reference to the look-up table by the CPU ex502.

Figure 45:
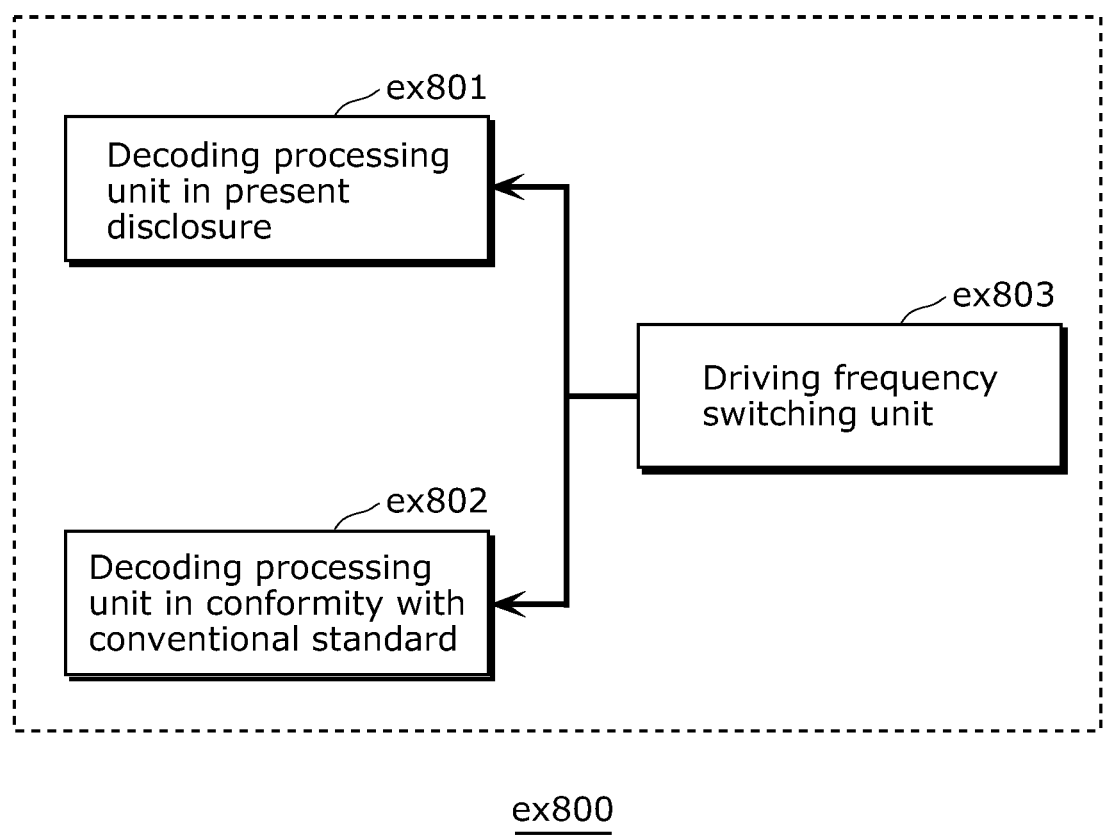
FIG. 45 shows a configuration for switching between driving frequencies.

FIG. 45 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Seventh Embodiment

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 47A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by frame memory control in particular, for example, the dedicated decoding processing unit ex901 is used for frame memory control. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 47B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although the image coding apparatus and the image decoding apparatus according to one or more aspects of the inventive concepts have been described above, the herein disclosed subject matter is to be considered descriptive and illustrative only. Those skilled in the art will readily appreciate that the appended Claims are of a scope intended to cover and encompass not only the particular embodiments disclosed, but also equivalent structures, methods, and/or uses which are obtained by making various modifications in the embodiments and by arbitrarily combining the structural elements in different embodiments, without materially departing from the principles and spirit of the inventive concept.

INDUSTRIAL APPLICABILITY

One or more exemplary embodiments disclosed herein are applicable to image coding methods, image decoding methods, image coding apparatuses, and image decoding apparatuses. The image coding method, the image decoding method, the image coding apparatus, and the image decoding apparatus consistent with one or more exemplary embodiments of the present disclosure can be used for information display devices and imaging devices with high resolution which include televisions, digital video recorders, car navigation systems, cellular phones, digital cameras, and digital video cameras.

The invention claimed is:

1. An image decoding method for decoding a coded bitstream, the image decoding method comprising:
   constructing a first reference list including a plurality of pictures, each of the pictures having an output order of a frame assigned thereto, each of the pictures being identified by one of a plurality of reference indexes, the reference indexes corresponding one to one with the pictures, each of the reference indexes having a different index value, the first reference list being constructed based on the output order of the frame assigned to each of the plurality of pictures;
   obtaining, from the coded bitstream, reference list reordering information for indicating details of reordering to be performed;
   reordering the pictures to generate a modified reference list including the pictures, the modified reference list being generated by assigning new indexes to the pictures using the reference indexes, the new indexes corresponding one to one with the pictures included in the modified reference list, each of the new indexes having a different index value; and
   decoding a current picture or slice using the new indexes and the modified reference list generated in the reordering,
   wherein each of the reference indexes (i) identifies one of the pictures included in the first reference picture list such that the reference indexes correspond one to one with the pictures included in the first reference list and (ii) is used in assigning the new indexes in the reordering.

2. The image decoding method of claim 1, wherein the modified reference picture list applies only to the current slice, and the modified reference picture lists does not apply to slices subsequent to the current slice.

3. An image decoding apparatus for decoding a coded bitstream, the image decoding apparatus comprising:
   a processor; and
   a memory having a computer program stored thereon, the computer program causing the processor to execute operations including:
      constructing a first reference list including a plurality of pictures, each of the pictures having an output order of a frame assigned thereto, each of the pictures being identified by one of a plurality of reference indexes, the reference indexes corresponding one to one with the pictures, each of the reference indexes having a different index value, the first reference list being constructed based on the output order of the frame assigned to each of the plurality of pictures;
      obtaining, from the coded bitstream, reference list reordering information for indicating details of reordering to be performed;
      reordering the pictures to generate a modified reference list including the pictures, the modified reference list being generated by assigning new indexes to the pictures using the reference indexes, the new indexes corresponding one to one with the pictures included in the modified reference list, each of the new indexes having a different index value; and
      decoding a current picture or slice using the new indexes and the modified reference list generated in the reordering,
   wherein each of the reference indexes (i) identifies one of the pictures included in the first reference picture list such that the reference indexes correspond one to one with the pictures included in the first reference list and (ii) is used in assigning the new indexes in the reordering.

4. A non-transitory computer-readable recording medium having stored thereon executable instructions, which when executed, cause a processor to perform an image decoding method for decoding a coded bitstream, the image decoding method including:
   constructing a first reference list including a plurality of pictures, each of the pictures having an output order of a frame assigned thereto, each of the pictures being identified by one of a plurality of reference indexes, the reference indexes corresponding one to one with the pictures, each of the reference indexes having a different index value, the first reference list being constructed based on the output order of the frame assigned to each of the plurality of pictures;
   obtaining, from the coded bitstream, reference list reordering information for indicating details of reordering to be performed;
   reordering the pictures to generate a modified reference list including the pictures, the modified reference list being generated by assigning new indexes to the pictures using the reference indexes, the new indexes corresponding one to one with the pictures included in the modified reference list, each of the new indexes having a different index value; and
   decoding a current picture or slice using the new indexes and the modified reference list generated in the reordering,
   wherein each of the reference indexes (i) identifies one of the pictures included in the first reference picture list such that the reference indexes correspond one to one with the pictures included in the first reference list and (ii) is used in assigning the new indexes in the reordering.

* * * * *